United States Patent
Nakazato

(10) Patent No.: US 6,599,039 B1
(45) Date of Patent: Jul. 29, 2003

(54) OPTICAL TRANSMISSION MONITORING APPARATUS, OPTICAL TRANSMISSION MONITORING METHOD, OPTICAL AMPLIFICATION SYSTEM, METHOD OF CONTROLLING OPTICAL AMPLIFICATION SYSTEM, AND OPTICAL TRANSMISSION SYSTEM

(75) Inventor: Koji Nakazato, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/562,923

(22) Filed: May 2, 2000

Related U.S. Application Data

(63) Continuation-in-part of application No. PCT/JP99/03857, filed on Jul. 16, 1999.

(30) Foreign Application Priority Data

Nov. 6, 1998 (JP) .......................................... 10-316523

(51) Int. Cl.[7] .......................... H04B 10/08; H04B 17/00
(52) U.S. Cl. ............................ 398/25; 398/34; 398/37; 398/30
(58) Field of Search ............................. 398/25, 34, 37, 398/30; 359/341

(56) References Cited

U.S. PATENT DOCUMENTS

| | | | | |
|---|---|---|---|---|
| 5,808,785 A | * | 9/1998 | Nakabayashi | 359/337.13 |
| 5,864,423 A | * | 1/1999 | Kosaka | 359/337.11 |
| 5,995,275 A | * | 11/1999 | Sugaya | 359/341.3 |
| 6,008,915 A | | 12/1999 | Zyskind | 359/110 |
| 6,008,935 A | * | 12/1999 | Fujita et al. | 359/341.4 |
| 6,064,515 A | * | 5/2000 | Yang | 359/341.33 |

FOREIGN PATENT DOCUMENTS

| | | |
|---|---|---|
| JP | 4-14917 | 1/1992 |
| JP | 9-153862 | 6/1997 |
| JP | 9-247104 | 9/1997 |
| JP | 10-13356 | 1/1998 |
| JP | 10-150433 | 6/1998 |
| JP | A-11-94701 | 4/1999 |
| JP | A-11-186962 | 7/1999 |

OTHER PUBLICATIONS

Seo Park et al., "Gain and power controlled EDFA for WDM optical networks"; pp. 236–237, 2nd Optoelectronics & Communications Conference (OECC '97) Technical Digest, Jul. 1997, Seoul, Korea.

Takashi Ono, "Fiber grating wavelength monitor for optical amplifier control and administration in WDM transmission systems"; pp. 118–119, First Optoelectronics & Communications Conference (OECC '96) Technical Digest, Jul. 1996, Makuhari Messe.

Takashi Yoshida, et al., "Control of Optical Output Level for WDM Optical Fiber Amplifier", IEICE (The Institute of Electronics, Information and Communication Engineers), Communication Society Conference 1996, p. 581.

Katsuhiro Shimano, et al. "Characteristics of EDFA With Automatic Level Control for change of number of the wavelengths and input Signal level", IEICE (The Institute of Electronics, Information and Communication Engineers), Communication Society Conference 1996, p. 577.

Fig. 1. Block Diagram of an Optical Fiber Amplifier with Wavelength Number Dtectability p. 581.

Fig. 1. Structure of a Light Amplifier with ALC p. 577.

\* cited by examiner

*Primary Examiner*—Leslie Pascal
*Assistant Examiner*—Shi K. Li
(74) *Attorney, Agent, or Firm*—McDermott, Will & Emery

(57) ABSTRACT

This invention relates to an optical transmission monitoring apparatus or the like which has a simple structure for identifying causes of variations in the power of WDM signals. The optical transmission monitoring apparatus includes a monitoring section for setting first and second wavelength bands in a monitor wavelength band, comparing variations in the optical powers of a plurality of types of light containing different light signals which are detected from the respective wavelength bands, and identifying causes of the variations in optical power in the optical transmission path.

23 Claims, 36 Drawing Sheets

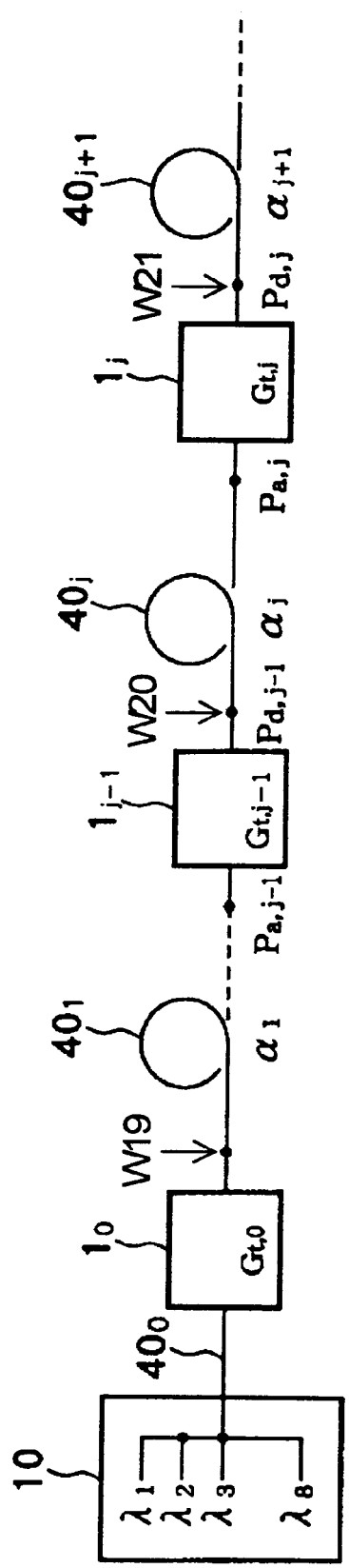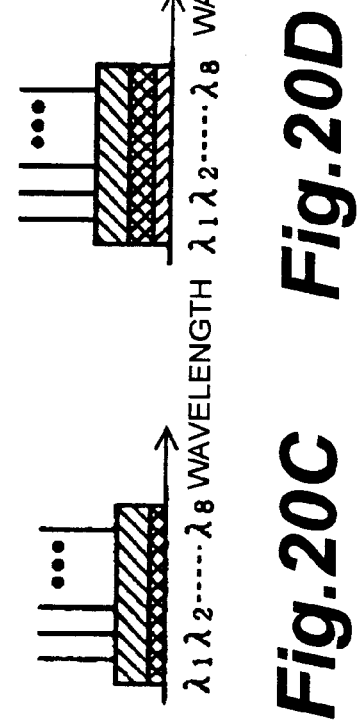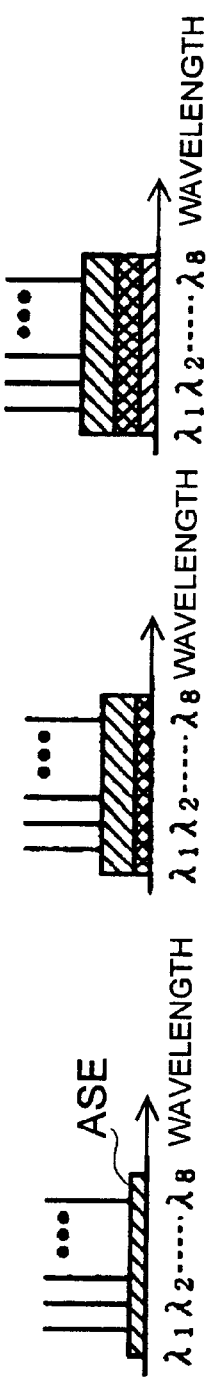

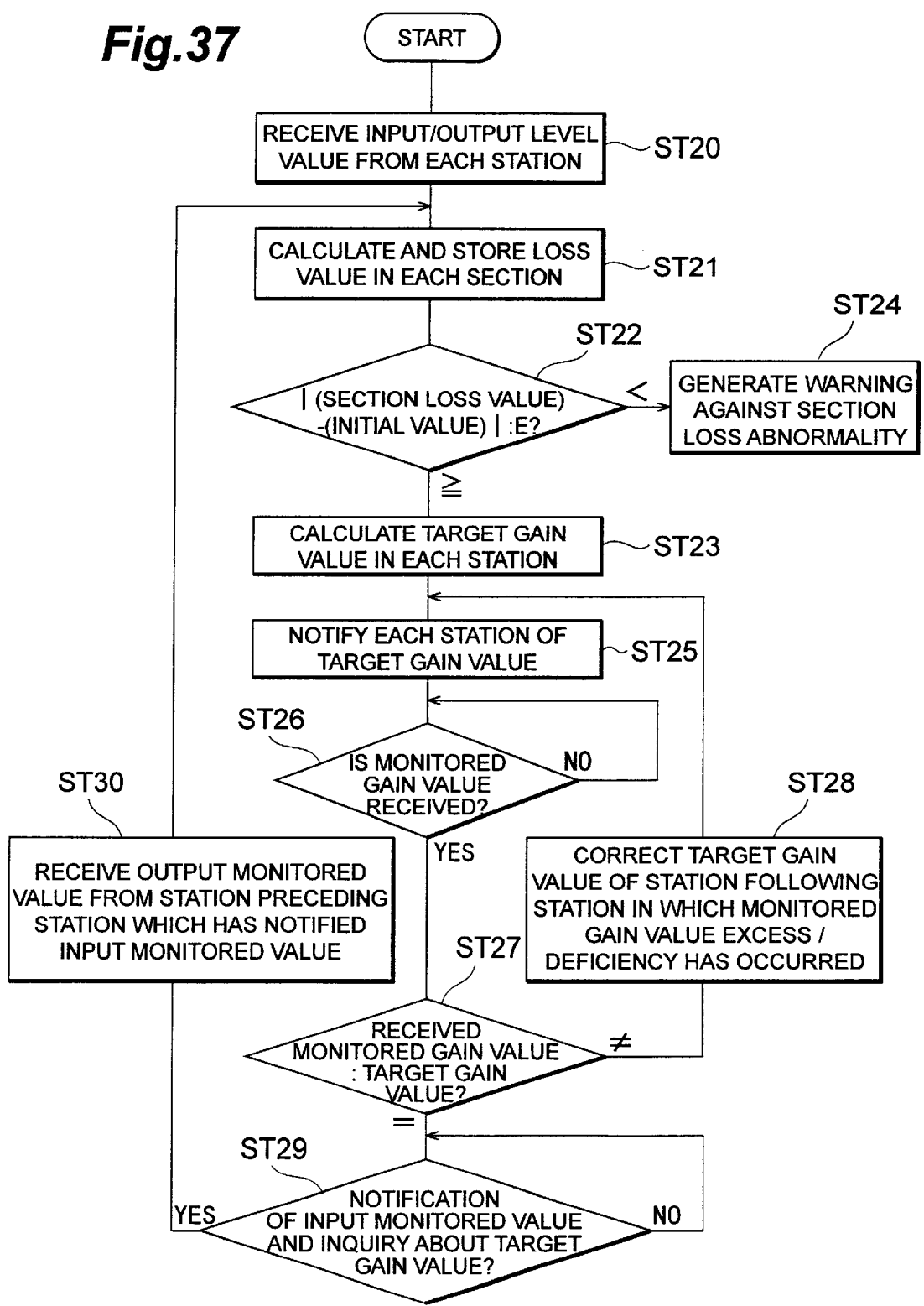

OPTICAL TRANSMISSION MONITORING APPARATUS, OPTICAL TRANSMISSION MONITORING METHOD, OPTICAL AMPLIFICATION SYSTEM, METHOD OF CONTROLLING OPTICAL AMPLIFICATION SYSTEM, AND OPTICAL TRANSMISSION SYSTEM

RELATED APPLICATIONS

This is a Continuation-In-Part application of International Patent application serial No. PCT/JP99/03857 filed on Jul. 16, 1999, now pending.

BACKGROUND OF THE INVENTION

1. Field of the Invention

The present invention relates to a monitoring apparatus for monitoring the transmission state in an optical transmission path through which light containing one or more light signals having different wavelengths propagates, a monitoring method, an optical amplification system including the monitoring apparatus, a method of controlling the optical amplification system, and an optical transmission system.

2. Related Background Art

An optical transmission system using a WDM (Wavelength Division Multiplexing) communication scheme includes an optical fiber transmission network through which WDM signals containing one or more light signals having different wavelengths propagates, and can perform large-capacity, high-speed communication. This optical transmission system includes an optical amplifier for amplifying WDM signals altogether, an optical ADM (Add-Drop Multiplexer) for dropping and adding some light signals contained in the WDM signals, and the like as well as an optical fiber transmission path as a transmission medium for light signals.

In the optical transmission system having the above structure, monitoring control of the optical amplifier is one of the important subjects. More specifically, the optical power of each amplified light (light signals) optically amplified by the optical amplifier is required to be controlled to a constant level in either of the following cases: a case wherein the number of light signals sent from the transmitter varies, a case wherein the number of light signals propagating a long an optical transmission path varies due to dropping/adding of light signals by the optical ADMs placed midway along the optical transmission path, and a case wherein a transmission loss in the optical transmission path or the like varies. In order to solve this problem, various proposals have been made.

For example, in "Control of Optical Output Level for WDM Optical Fiber Amplifier" (first prior art) proposed in the 1996 IEICE communication society conference B-1096, an acoustooptic filter whose passing wavelength characteristics change in accordance with a change in the frequency of ultrasonic waves is used as an optical transmission wavelength selection element. The acoustooptic filter is controlled by a sweep circuit, sweeps a band of 1,545 nm to 1,557 nm in a cycle of 400 µs, and converts WDM signals into a pulse string on the time axis. This pulse string is photoelectrically converted. A wave counter then detects the number of light signals contained in the WDM signals. Automatic level control (ALC) of the optical amplifier is performed on the basis of the information about the detected number of light signals. Note that the above acoustooptic filter is disclosed in "Wide Tunable Range and Low Sidelobe Level of Double-stage Polarization Independent Acoustooptic Tunable Filter" proposed in the 1996 IEICE general conference C-254.

According to the method proposed in "Characteristics of EDFA with Automatic Level Control for change of number of the wavelengths and input Signal level" proposed in the 1996 IEICE communication society conference B-1092 (second prior art), pilot light in the amplification band of an optical amplifier is dropped from an optical transmission path by a branching element placed on the output side of the optical amplifier, the optical power of the dropped pilot light is detected, and the optical amplifier is controlled to keep the optical power of this pilot light constant. As a technique similar to the second prior art, for example, the technique disclosed in Seo Yeon Park and Sang-Yung Shin, "Gain and power controlled EDFA and WDM optical networks", 2nd Optoelectronics & Communications Conference (OECC'97) Technical Digest, July 1997, Seoul KOREA is known.

In addition, according to Takashi Ono, "Fiber grating wavelength monitor for optical amplifier control and administration in WDM transmission systems", First Optoelectronics and Communications Conference (OECC'96) Technical Digest, July 1996, Makuhari Messe 17B3-2 (third prior art), part of WDM signals (some light signals) is dropped by a branching element connected to the output terminal of an optical amplifier and output as short pulses by an acoustooptic switch. Delays corresponding to the wavelengths of the respective light signals of the short pulses are given to the respective light signals through an optical circulator and optical fiber grating. The light signals having different wavelengths, to which the delays are given in this manner, are converted into pulses arranged along the time axis. The number of light signals contained in the WDM signals, operating wavelength band, the powers of the respective light signals are obtained from the number, positions, and optical powers of these pulses. In the third prior art, automatic level control (ALC) of the optical amplifier is performed on the basis of the obtained number of light signals contained in the WDM signals.

SUMMARY OF THE INVENTION

The present inventors found the following problems upon examination of the first and third prior arts. The first to third prior arts use special optical elements such as acoustooptic filters, acoustooptic switches, and optical circulators, and the second prior art uses pilot light. For this reason, these conventional systems need to have complicated arrangements, and become expensive systems.

In addition, since the first and third prior arts use acoustooptic filters and acoustooptic switches, variations in the power of a light signal of WDM signals which have specific wavelengths cannot be detected, although the number of light signals contained in the WDM signals can be detected. The second prior art using pilot light can neither detect the number of light signals contained in WDM signals nor detect variations in the power of light signals of the WDM signals which has a specific wavelength. The first to third prior arts cannot therefore discriminate whether a cause of a variation in the optical power of WDM signals is a variation in the optical power of a light signal having a specific wavelength or a loss variation in an optical transmission path. This problem is serious especially in an optical transmission system using an optical ADM.

The present invention has been made to solve the above problems, and has as its object to provide an optical transmission monitoring apparatus having a simple structure capable of identifying a cause of variations in the optical power of WDM signals, a monitoring method, an optical amplification system including the optical transmission monitoring apparatus, a method of controlling the optical amplification system, and an optical transmission system.

An optical transmission monitoring apparatus according to the present invention is an apparatus for monitoring a transmission state in an optical transmission path through which light belongs in a signal wavelength band and containing one or more light signals having different wavelengths propagates. This apparatus uses light in the signal wavelength band or light in a wavelength band different from the signal wavelength band as monitoring light signals.

More specifically, the optical transmission monitoring apparatus according to the present invention comprises first and second photodetectors and a monitoring section for monitoring a transmission state in an optical transmission path by using the detection results obtained by the first and second photodetectors.

The first photodetector detects at least one of the optical power of one or more monitoring light signals of light in the first wavelength band, which is included in a monitor wavelength band in which light propagating through an optical transmission path and containing one or more monitoring light signals having different wavelengths belongs, and the optical power of noise of the light in the first wavelength band. The second photodetector detects at least one of the optical power of one or more monitoring light signals of light in the second wavelength band included in a monitor wavelength band, and the optical power of noise of the light in the second wavelength band.

The above monitor wavelength band may be a wavelength band which differs from the signal wavelength band and partly overlaps the signal wavelength band. When the monitor wavelength band differs from the signal wavelength band, light propagating in an optical transmission path and belonging in the monitor wavelength band is dropped from the optical transmission path by a demultiplexer. The dropped light in the monitor wavelength band is guided to the optical transmission monitoring apparatus to be used for optical transmission monitoring. When the monitor wavelength band overlaps the signal wavelength band, light signals in the overlapping wavelength band can be used as monitoring light. By placing at least one demultiplexer in an optical transmission path, therefore, light belonging in the signal wavelength band and propagating through the optical transmission path is partly dropped. The dropped light is guided to the optical transmission monitoring apparatus to be used for optical transmission monitoring. In this manner, at least some light signals of the light signals dropped from the optical transmission path can be used as monitoring light signals.

In the above monitor wavelength band, the first and second wavelength bands may be different wavelengths. The first and second wavelength bands may partly overlap each other on condition that they do not coincide with each other. In the mode in which the first and second wavelength band overlap each other, the bandwidth of the first wavelength band is greater than that of the second wavelength band, and the second wavelength band is preferably included in the first wavelength band.

The above monitoring section also compares the variation amount of optical power per unit time in the first wavelength band which is detected by the first photodetector with the variation amount of optical power per unit time in the second wavelength band which is detected by the second photodetector. The monitoring section then identifies a cause of a optical power variation in the optical transmission path as a monitoring target on the basis of the obtained comparison result. More specifically, when the optical power variations in the first wavelength band exhibit a tendency similar to that of the optical power variations in the second wavelength band, transmission loss variations in the optical transmission path (when an optical amplifier is placed in the optical transmission path, gain variations in the optical amplifier are included) are determined. If the optical power variations in the first wavelength band exhibit a tendency different from that of the optical power variations in the second wavelength band, it is determined that the number of light signals propagating through the optical transmission path has increased/decreased. Since this monitoring section uses variations in optical power in both the first and second wavelength bands, light to be detected by the first and second photodetectors may be monitoring light in the monitor wavelength band (corresponding to light signals when the signal wavelength band coincides with the monitor wavelength band), noise such as amplified spontaneous emission (ASE), or light containing these light signals. According to another mode, the light signals to be detected by the first photodetector need not be identical to those detected by the second photodetector. Therefore, for example, the optical power of light signals (monitoring light signals) may be detected by the first photodetector, and the optical power of noise such as ASE excluding the light signals may be detected by the second photodetector. Variations in the optical powers of the detected light signals may be used to monitor the optical transmission path.

A change in the number of light signals can be monitored by the above arrangement when light signals are used as monitoring light signals, and the number of light signals as a group of monitoring light signals increases/decreases in either of the first and second wavelength bands in the monitor wavelength band. More specifically, when the numbers of light signals increase/decrease at the same ratio in the first and second wavelength bands in the monitor wavelength band, since optical powers vary in the same manner in both the wavelength bands, loss variations in the optical transmission path are erroneously detected. In an optical transmission monitoring apparatus designed to solve such a problem, light signals in a wavelength band other than the signal wavelength band are made to propagate as some monitoring light signals, and the optical powers of at least three types of light (containing different light signals) in the monitor wavelength band are detected. This makes it possible to monitor the transmission state in which the number of light signals has changed in the above manner.

In the above mode, light in the signal wavelength band corresponds to light in the first wavelength band of the monitor wavelength band, and light propagating through the optical transmission path independently of the light signal corresponds to light in the second wavelength band. The optical transmission monitoring apparatus further comprises a third detector for detecting at least the optical power of light containing noise in the first wavelength band. With this arrangement, the optical transmission monitoring apparatus detects the optical power of first light (may contain noise in the first wavelength band or monitoring light in the second wavelength band) containing at least monitoring light signals (light signals) in the first wavelength band by using the first detector, detects the optical power of second light containing at least monitoring light in the second wavelength band by using the second detector, and detects the optical power of third light containing at least noise in the first wavelength band by using the third detector. The monitoring section compares the variation amount of optical power of the first light per unit time which is obtained by the first detector with the variation amount of optical power of the second light per unit time which is obtained by the second detector, and the variation amount of optical power of the third light per unit time, obtained by the third detector, and identifies a cause of optical power variations in the optical transmission path on the basis of the comparison result.

An optical transmission monitoring apparatus according to the present invention may have an arrangement for monitoring an optical transmission state by using a light signal of 1-channel in the signal wavelength band as pilot light. In this case, light in the signal wavelength band corresponds to light in the monitor wavelength band, and a wavelength band in which pilot light of 1-channel belongs and which is included in the signal wavelength band corresponds to the second wavelength band. According to this arrangement, therefore, a monitor wavelength band is set such that the second wavelength band is included in the first wavelength band. The monitoring section compares the variation amount of optical power of light signals and noise as a monitoring light signal in the first wavelength band per unit time with the variation amount of optical power of pilot light as monitoring light in the second wavelength band per unit time, and identifies a cause of variations in optical power in the optical transmission path on the basis of the comparison result. Preferably, the optical transmission monitoring apparatus may further comprise a first system for detecting an abnormality in transmission of at least a light signal of 1-channel selected from light signals in a wavelength band of the second wavelength band which overlaps the first wavelength band, and a second system for reselecting light signals to be selected as monitoring light in the second wavelength band from light signals in a wavelength band of the signal wavelength band which over laps the first wavelength band. This is -because a channel as a monitoring target may fail due to some reason or its use may be stopped.

When an optical amplifier is placed in an optical transmission path, the optical transmission monitoring apparatus according to the present invention can also be used as a control apparatus for the optical amplifier. More specifically, the optical transmission monitoring apparatus is placed at a predetermined position on the optical transmission path which the amplified light outputted from the optical amplifier reaches. When the amplification characteristics of the optical amplifier depend on wavelength, the center wavelength of the first wavelength band and that of the second wavelength band are preferably set to coincide with a wavelength at which the gain becomes almost equal to the average gain of the optical amplifier in the signal wavelength band in order to minimize the influences of the wavelength dependency of the optical amplifier. In addition, the bandwidths of the first and second wavelength bands are preferably set on the basis of at least the difference between the amplification wavelength band of the optical amplifier and the monitor wavelength band or between the number of monitoring light signals belonging in the monitor wavelength band.

An optical transmission monitoring method according to the present invention is implemented by using the above optical transmission monitoring apparatus. More specifically, according to the monitoring method, the variation amount of at least one of the optical power of one or more monitoring light signals of light in a first wavelength band included in a monitor wavelength band, in which light propagating through the optical transmission path and containing one or more monitoring light signals having different wavelengths belongs, and the optical power of noise of the light in the first wavelength band is detected per unit time, and the variation amount of at least one of the optical power of one or more monitoring light signals of light in a second wavelength band included in the monitor wavelength band and the optical power of noise of the light in the second wavelength band is detected. In the monitoring method, the detected variation amount of optical power per unit time in the first wavelength band is compared with the detected variation amount of optical power per unit time in the second wavelength band, and a cause of variations in optical power in the optical transmission path is identified on the basis of the comparison result.

An optical amplification system according to the present invention comprises at least an optical amplifier for amplifying altogether light belonging in a signal wavelength band and propagating through an optical transmission path and an optical transmission monitoring apparatus placed at a predetermined position on the optical transmission path which amplified light outputted from the optical amplifier reaches. This optical transmission monitoring apparatus has the above structure. The optical amplification system may further comprise a variable attenuator which is placed at least at a position, on the optical transmission path, through which light signals in the signal wavelength band pass before reaching the optical transmission monitoring apparatus or a position through which light signals pass after passing through the optical transmission monitoring apparatus and attenuates the light signals by a predetermined amount. In this case, the monitoring section of the optical transmission monitoring apparatus adjusts the attenuation amount of the variable attenuator in accordance with the transmission state in the optical transmission path.

In a method of controlling an optical amplification system having such a structure as well, as described above, the variation amount of at least one of the optical power of one or more monitoring light signals of light in a first wavelength band included in a monitor wavelength band, in which light propagating through the optical transmission path and containing one or more monitoring light signals having different wavelengths belongs, and the optical power of noise of the light in the first wavelength band is detected per unit time, and the variation amount of at least one of the optical power of one or more monitoring light signals of light in a second wavelength band included in the monitor wavelength band and the optical power of noise of the light in the second wavelength band is detected per unit time. The detected variation amount of optical power per unit time in the first wavelength band is compared with the detected variation amount of optical power per unit time in the second wavelength band, and an increase/decrease in the number of light signals is determined on the basis of the comparison result. At least adjustment of the gain of the optical amplifier or adjustment of the variable attenuator is performed in accordance with the increase/decrease in the number of light signals on the basis of the determination result.

An optical transmission system according to the present invention comprises at least one or more repeater stations placed at predetermined positions on an optical transmission path through which light belonging in a signal wavelength band and containing one or more light signals having different wavelengths propagates. Each repeater station includes a section monitoring apparatus having the same structure as that of the above optical transmission monitoring apparatus.

Each repeater station may further comprise an optical amplifier for amplifying altogether light belonging in the signal wavelength band and propagating through the optical transmission path. In this arrangement, the monitoring section of the optical transmission monitoring apparatus adjusts the gain of the optical amplifier in accordance with the transmission state in the optical transmission path.

Each repeater station may further comprise a variable attenuator for attenuating light signals in the signal wavelength band by a predetermined amount. In this arrangement, the monitoring section of the optical transmission monitoring apparatus adjusts the variable attenuator in accordance with the transmission state in the optical transmission path. Each repeater station may comprises an optical input/output element such as an optical ADM for dropping some light signals from the light signals propagating through the optical transmission path and adding new light signals. In this optical transmission system, in particular, either of the first and second wavelength bands may include some of light signals to be dropped or added by the optical input element. This arrangement is preferable because no monitoring light signals need to be prepared independently of light signals.

According to this optical transmission system, each repeater station having the above structure may further comprise a system control section for monitoring optical power variations in the overall optical transmission system on the basis of the variation amount of optical power of some light signals separated from the light belonging in the monitor wavelength band and reaching the repeater station per unit time and the variation amount of optical power of some light signals separated from the light belonging in the monitor wavelength band and outputted from the repeater station per unit time. In this arrangement, this system control section corrects control performed by the monitoring section of the optical transmission monitoring apparatus in each repeater station on the basis of the variation amount of optical power of each of input/output light signals in each repeater station.

The present invention will be more fully understood from the detailed description given hereinbelow and the accompanying drawings, which are given byway of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 20A is a view showing the arrangement of the second embodiment of the optical transmission system to which the optical transmission monitoring apparatus according to the present invention is applied, and FIGS. 20B to 20D are views respectively showing optical spectra at portions W19 to W21 in a signal wavelength band (coinciding with a monitor wavelength band) in FIG. 20A;

FIGS. 36 and 37 are flow charts for explaining the monitoring operation of the transmission system according to the third embodiment.

DETAILED DESCRIPTION OF THE PREFERRED EMBODIMENTS

Figure 1A:
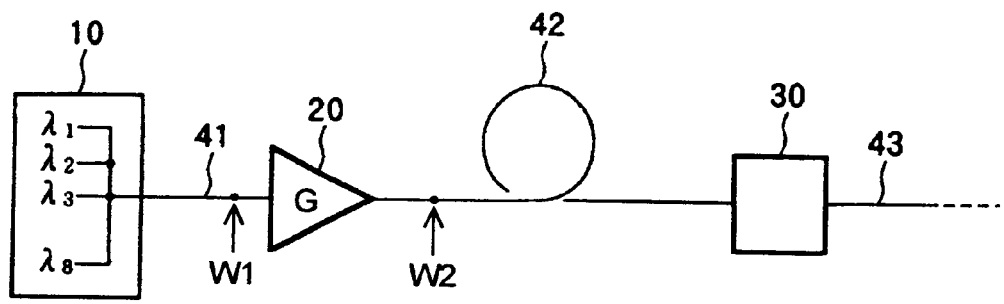
FIG. 1A is a view showing the arrangement of an optical transmission path system to which an optical transmission monitoring apparatus according to the present invention is applied.

Optical transmission monitoring apparatuses and the like according to the present invention will be described below with reference to FIGS. 1A to 4D, 5, 6, 7A to 7C, 8, 9A to 9E, 10, 11A and 11B, 12 and 13, 14A to 14E, 16A to 17E, 18, 19A to 21B, 22, 23A to 23H, 24, 25A to 25H, 26, 27A to 35H, 36, and 37. The same reference numerals denote the same parts throughout the drawings, and a repetitive description will be avoided. Although an 8-wave WDM signal will be mainly described below, the number of light signals contained in the WDM signals is not limited to eight.

Figure 1B:
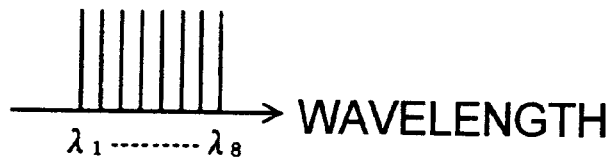
FIGS. 1B and 1C are views respectively showing optical spectra at portions W1 and W2 in a signal wavelength band in FIG. 1A.
Figure 1C:
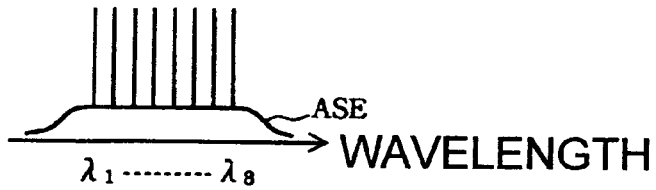

An optical transmission system to which an optical transmission monitoring apparatus according to the present invention is applied will be described first. FIG. 1A is a view showing the schematic arrangement of this optical transmission system. FIGS. 1B and 1C are views respectively showing optical spectra in a signal wavelength band (a WDM signal wavelength band as an operating wavelength band) at portions W1 and W2 in FIG. 1A. The optical transmission system shown in FIG. 1A includes a transmitter 10 for transmitting eight light signals ($\lambda 1$ to $\lambda 8$) having different wavelengths, an optical amplifier 20 for optically amplifying the eight light signals from the transmitter 10 altogether, and an optical transmission monitoring apparatus 30 for monitoring the eight light signals outputted from the optical amplifier 20. These constituent elements 10, 20, and 30 are optically connected to each other through optical fiber transmission paths 41 to 43.

At the portion W1 of this optical transmission system, the light transmitted from the transmitter 10 contains eight light signals ($\lambda 1$ to $\lambda 8$) but contains almost no ASE (Amplified Spontaneous Emission), as shown in FIG. 1B. The light signals passing through this W1 point reach the optical amplifier 20 through the optical fiber transmission path 41 and are optically amplified altogether. At the portion W2, the amplified light outputted from the optical amplifier 20 contains noise as well as the light signals ($\lambda 1$ to $\lambda 8$) optically amplified altogether. Part of the amplified light outputted from the optical amplifier 20 which have reached the optical transmission monitoring apparatus 30 through the optical fiber transmission path 42 further propagate through the optical fiber transmission path 43.

When light signals in the above signal wavelength band are to be used as monitoring light signals, the optical transmission monitoring apparatus 30 drops part (separated light signals) of input light in the signal wavelength band which contains eight light signals as monitoring light signals, and uses the separated light signals to monitor the transmission state of the optical transmission path. More specifically, optical power (the optical power of light signals, the optical power of noise, or the optical power of light containing them) in the first wavelength band included in a signal wavelength band (coinciding with a monitor wavelength band) and optical power (the optical power of light signals, the optical power of noise, or the optical power of light containing them) in the second wavelength band included in the signal wavelength band are respectively detected by different photodetectors. The variation amount of the optical power in the first wavelength band per unit time is compared with the variation amount of the optical power in the second wavelength band per unit time to monitor the transmission state of the optical transmission path including at least the transmitter 10 and optical amplifier 20 on the basis of the comparison result.

Note that the above monitor wavelength band and the first and second wavelength bands in the monitor wavelength band are variously set, as will be described later.

First Embodiment of Optical Transmission Monitoring Apparatus

Figure 2A:
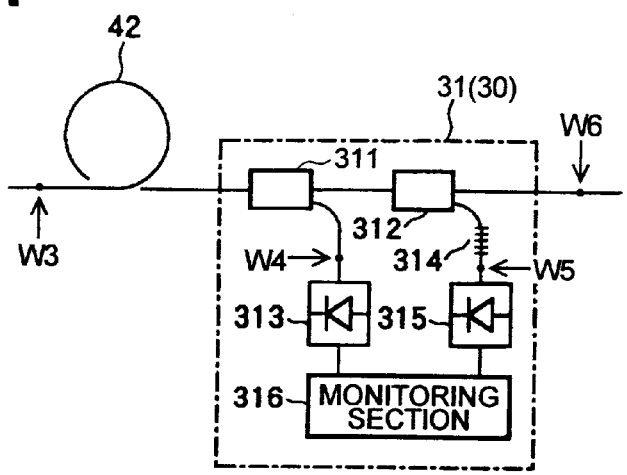
FIG. 2A is a view showing the arrangement of an optical transmission monitoring apparatus according to the first embodiment.

FIG. 2A is a view showing the arrangement of an optical transmission monitoring apparatus according to the first embodiment. FIGS. 2B to 2E are views respectively showing optical spectra in a signal wavelength band (coinciding with a monitor wavelength band) at portions W3 to W6 in FIG. 2A.

An optical transmission monitoring apparatus 31 in FIG. 2A (corresponding to the optical transmission monitoring apparatus 30 in FIG. 1A) is comprised of optical branching elements 311 and 312 arranged on an optical fiber transmission path 42, a photodetector 313 optically connected to the optical branching element 311, a bandpass filter 314 (optical fiber grating) having one end optically connected to the optical branching element 312, a photodetector 315 optically connected to the other end of the bandpass filter 314, and a monitoring section 316 that uses detection signals from the photodetectors 313 and 315.

Each of the optical branching elements 311 and 312 includes, for example, an optical fiber coupler and the like and separates some light signals of light in the signal wavelength band which has propagated through the optical fiber transmission path 42 and contains eight light signals ($\lambda 1$ to $\lambda 8$). The photodetector 313 includes, for example, a photodiode and the like and detects the optical power of each light component separated by the optical branching element 311. The optical fiber grating 314 is an optical component formed in the optical fiber by periodically changing the refractive index along the optical axis of the optical fiber. The optical fiber grating 314 is disposed between the optical branching element 312 and photodetector 315. The optical fiber grating 314 has the function of transmitting light in a wavelength band which contains four light signals ($\lambda 5$ to $\lambda 8$) of the light signals separated by the optical branching element 312. The photodetector 315 includes, for examples a photodetector and the like and detects the optical power of each light component separated by the optical fiber grating 314. The monitoring section 316 inputs data about the optical powers respectively detected by the photodetectors 313 and 315, and monitors the transmission state in the signal wavelength band on the basis of the result obtained by comparing the respective variation amounts of optical powers per unit time.

Note that the optical transmission path as the monitoring target includes at least a transmitter 10, an optical amplifier 20, and the optical fiber transmission path 42. The monitoring section 316 monitors the transmission state of this optical transmission path by identifying the cause of a variation in optical power in the optical transmission path. In particular, when light in the signal wavelength band as an operating wavelength band is to be used as monitoring light, an increase/decrease in the number of light signals propagating through the optical transmission path can be monitored.

Figure 2B:
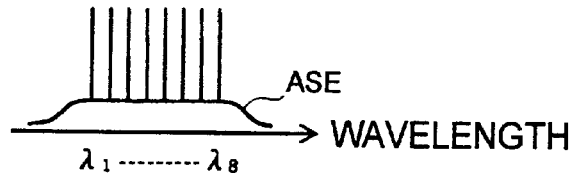
FIGS. 2B to 2E are views respectively showing optical spectra at portions W3 to W6 in a signal wavelength band (coinciding with a monitor wavelength band) in FIG. 2A.
Figure 2C:
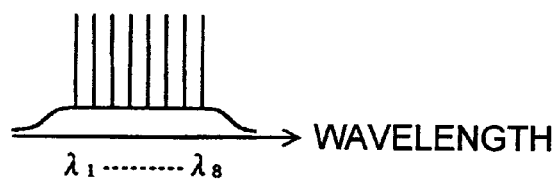
Figure 2D:
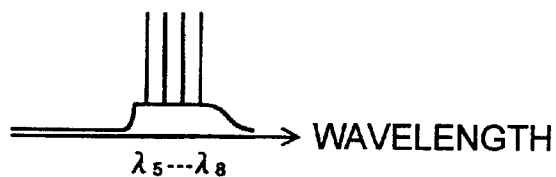
Figure 2E:
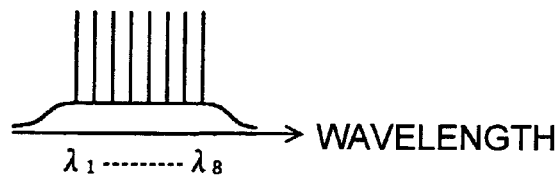

Light reaching the optical transmission monitoring apparatus 31 through the optical fiber transmission path 42 is outputted from the optical amplifier 20, and contains ASE as noise as well as eight light signals ($\lambda 1$ to $\lambda 8$) that are optically amplified altogether by the optical amplifier 20, as shown in FIG. 2B (ditto for FIG. 1C). Most of the light that has reached the optical transmission monitoring apparatus 31 is outputted from the optical transmission monitoring apparatus 31 through the optical branching elements 311 and 312. The spectrum of the light outputted from the optical transmission monitoring apparatus 31 coincides with the spectrum of the light (FIG. 2B) that has reached the optical transmission monitoring apparatus, as shown in FIG. 2E.

Some light signals of the light that has reached the optical transmission monitoring apparatus 31 are also separated by the optical branching element 311, and the optical power of each light component is detected by the photodetector 313. The light (in the first wavelength band) received by the photodetector 313 contains ASE as well as eight light signals ($\lambda 1$ to $\lambda 8$), as shown in FIG. 2C. The optical branching element 312 drops part of the light passing through the optical branching element 311. Of the dropped light, light in a wavelength band which contains four light signals ($\lambda 5$ to $\lambda 8$) reaches the photodetector 315 through the optical fiber grating 314. The photodetector 315 detects the optical power of the light passing through the optical fiber grating 314. The light (in the second wavelength band) received by the photodetector 315 contains ASE in the second wavelength band as well as the four light signals ($\lambda 5$ to $\lambda 8$), as shown in FIG. 2D. The monitoring section 316 compares the variation amount of optical power in the first wavelength band per unit time, detected by the photodetector 313, with the variation amount of optical power in the second wavelength band per unit time, detected by the photodetector 315, and monitors the transmission state in the signal wavelength band coinciding with the monitor wavelength band on the basis of the comparison result.

Figure 3A:
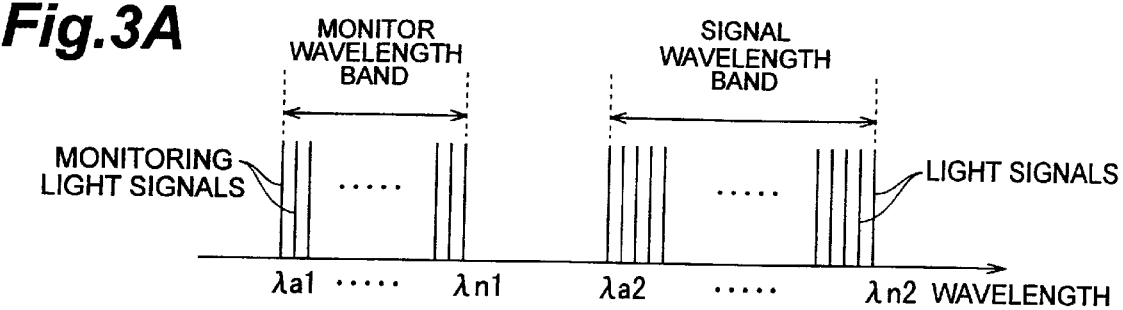
FIGS. 3A to 3E are conceptual views for explaining the relationship between a monitor wavelength band and signal wavelength band.
Figure 3B:
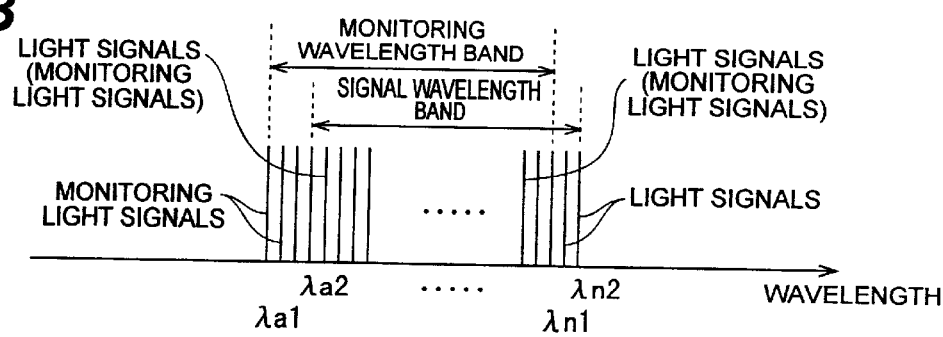

Note that monitoring of the above transmission state can also be realized by making monitoring light signals having wavelengths $\lambda_{a1}$ to $\lambda_{n1}$ propagate through the optical transmission path independently of the light in the signal wavelength band (including light signals $\lambda_{a2}$ to $\lambda_{n2}$), and monitoring variations in optical power in the monitoring region, as shown in, for example, FIG. 3A. In addition, as described above, since optical transmission monitoring is performed by monitoring variations in the optical power of light propagating through the optical transmission path, light in the signal wavelength band can be used as monitoring light. More specifically, as shown in FIG. 3B, if the monitor wavelength band and signal wavelength band at least partly overlap (or may coincide with each other), light (containing at least light signals or noise) in a wavelength band of the signal wavelength band which overlaps the monitor wavelength band can be used as the monitor wavelength band (containing at least monitoring light or noise).

Figure 3C:
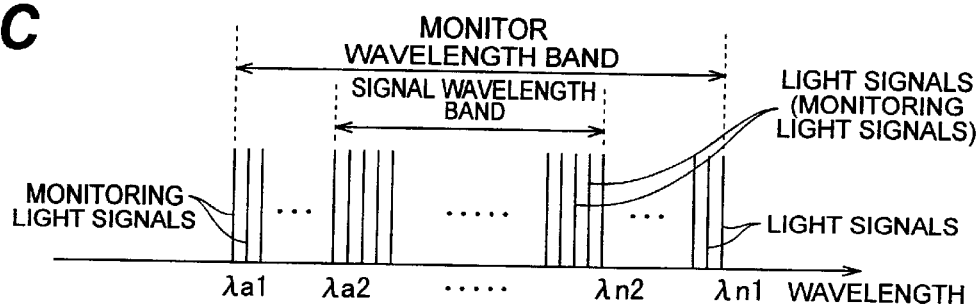
Figure 3D:
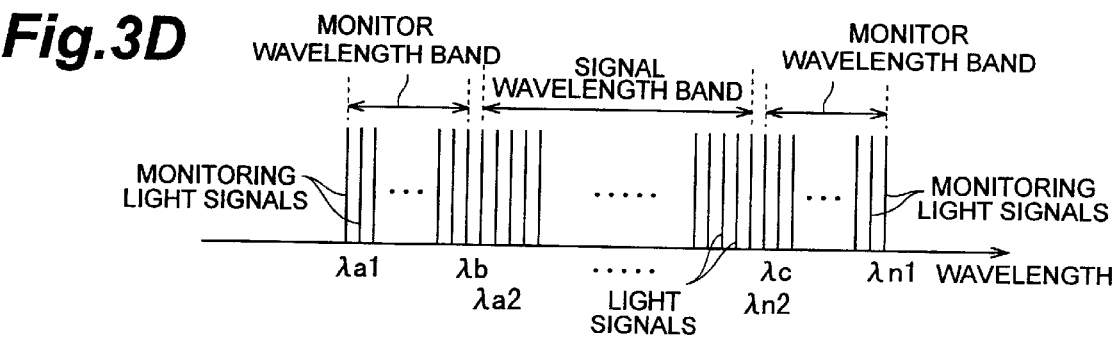
Figure 3E:
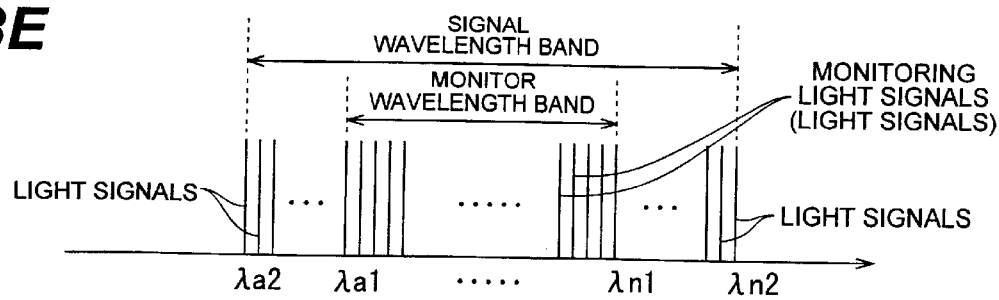

For example, the modes in which a monitor wavelength band and signal wavelength band overlap include the mode in which a signal wavelength band is set to be included in a monitor wavelength band, as shown in FIG. 3C, and the mode in which a monitor wavelength band is included in a signal wavelength band, as shown in FIG. 3E. The modes in which a monitor wavelength band is set as a wavelength band different from a signal wavelength band includes the mode in which a monitor wavelength band is constituted by a plurality of wavelength bands, as shown in, for example, FIG. 3D.

Figure 4A:
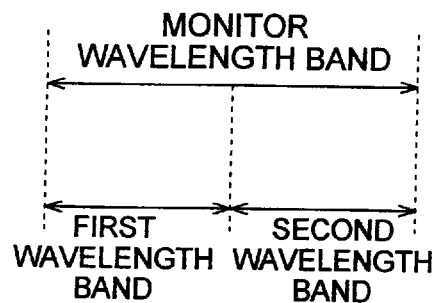
FIGS. 4A to 4D are conceptual views for explaining the relationship between the first and second wavelength bands in the monitor wavelength band.
Figure 4B:
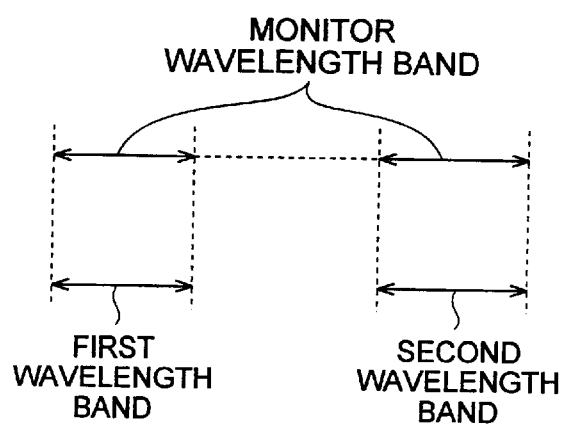
Figure 4C:
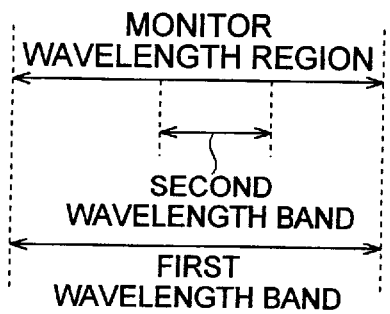
Figure 4D:
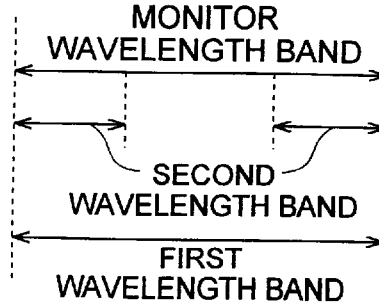

The first wavelength band that defines light to be received by the photodetector 313 and the second wavelength band that defines light to be received by the photodetector 315 can be set in various modes like those shown in FIGS. 4A to 4D on the condition that these wavelength bands do not coincide with each other. More specifically, the first and second wavelength bands can be set such that they are different wavelength bands, and one or more light signals of eight light signals to be received are contained in one of the first and second wavelength bands and is not contained in the other wavelength band (see FIG. 4A). In addition, since a monitor wavelength band can be constituted by a plurality of wavelength bands, as shown in FIG. 3D, the first and second wavelength bands can be separately set, as shown in FIG. 4B. Note that the first and second wavelength bands can be set in the mode in which at least parts of the wavelength bands overlap as well as the mode in which the wavelength bands do not overlap each other as shown in FIG. 4A. In this case, in order to prevent the first and second wavelength bands from overlapping, the second wavelength band may be set to be narrower than the first wavelength band so that the second wavelength band is included in the first wavelength band (see FIGS. 4C and 4D). When the first and second wavelength bands are to overlap each other, the second wavelength band may be constituted by a plurality of wavelength bands, as shown in FIG. 4D.

Figure 5:
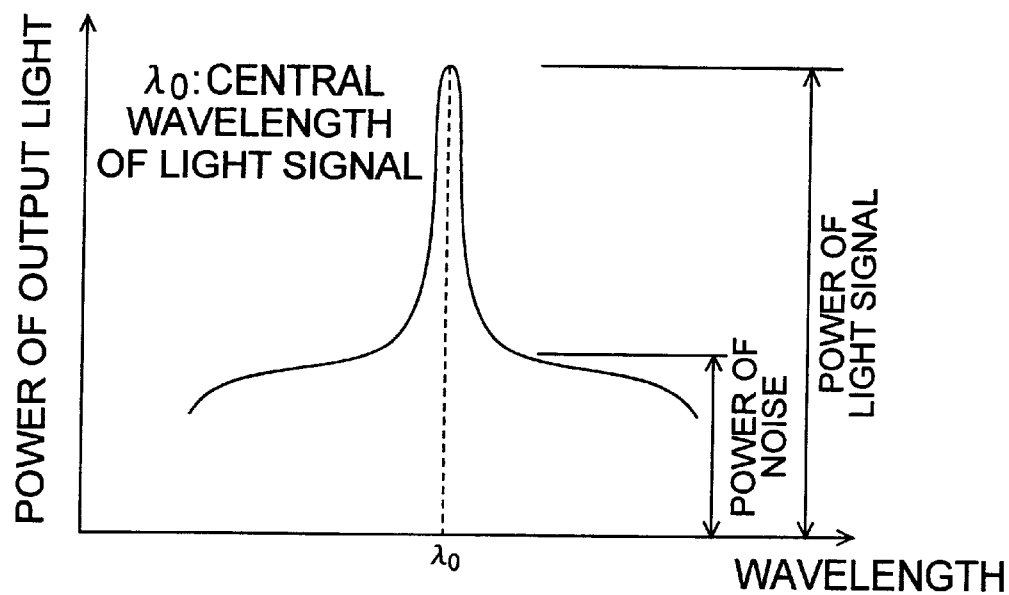
FIG. 5 is a conceptual view for explaining the optical powers of light signals and noise belonging in a predetermined wavelength band.

Light containing the light signal having a wavelength $\lambda 0$ as a center wavelength generally contains noise such as ASE and a light signal, as shown in FIG. 5. In the optical transmission monitoring apparatus according to the present invention, since the transmission state of the above optical transmission path is monitored by giving attention to variations in optical power in each of the first and second wavelength bands, the optical powers of all the light signals in the first wavelength band need not always be compared with the optical powers of all the light signals in the second wavelength band. For example, the transmission state of the optical transmission path can be monitored by comparing the optical power of light signals in the first wavelength band with that of light signals in the second wavelength band, the optical power of noise such as ASE in the first wavelength band with that of noise in the second wavelength band, the optical power of light signals in the first wavelength band with that of noise in the second wavelength band, or the optical power of noise in the first wavelength band with that of light signals in the second wavelength band.

Figure 6:
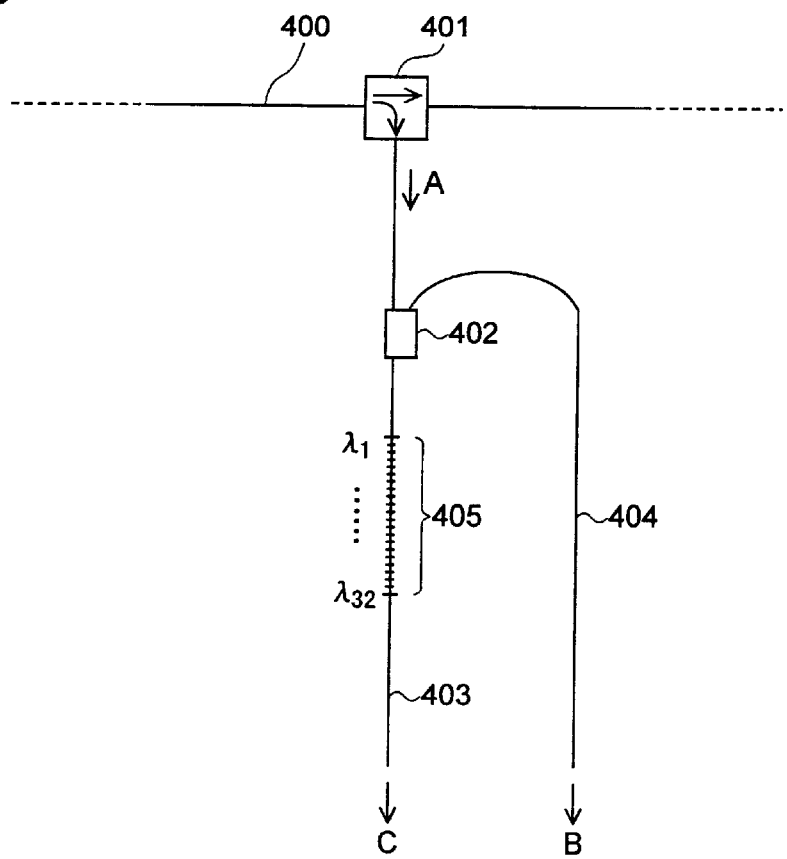
FIG. 6 is a view showing the structure of an apparatus for separating light in the predetermined wavelength band into light signals (monitoring light signals) and noise.

Light in a predetermined wavelength band can be separated into light signals and noise by the optical apparatus shown in FIG. 6. The apparatus in FIG. 6 is comprised of an optical branching element 401 for branching and dropping part of light propagating through an optical transmission path 400 and an optical fiber coupler 402 for branching light A separated by the optical branching element 401 and containing light signals $\lambda 1$ to $\lambda 32$ into light propagating through an optical fiber transmission path 403 and light propagating through an optical fiber transmission path 404. Note that a chirped grating 405 for reflecting the light signals having the wavelengths $\lambda 1$ to $\lambda 32$ is formed in the optical fiber transmission path 403.

Figure 7A:
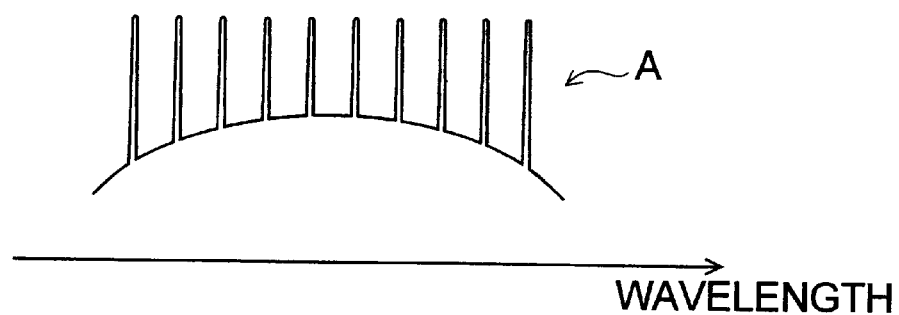
FIG. 7A is a view showing the optical spectrum of incident light input to the apparatus in FIG. 6, and FIGS. 7B and 7C are views respectively showing the optical spectra of the light signals and noise separated by the apparatus in FIG. 6.
Figure 7B:
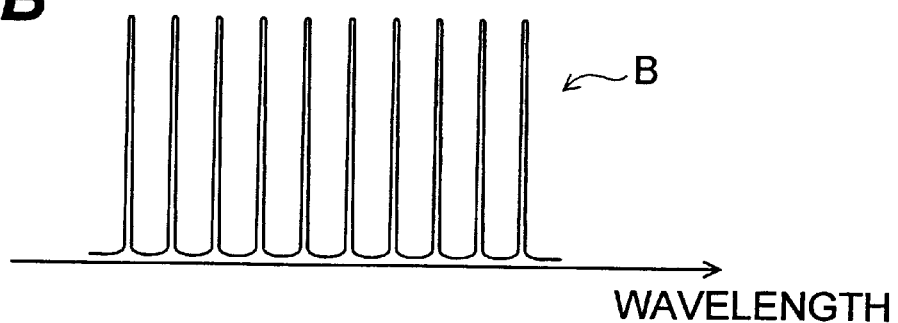
Figure 7C:
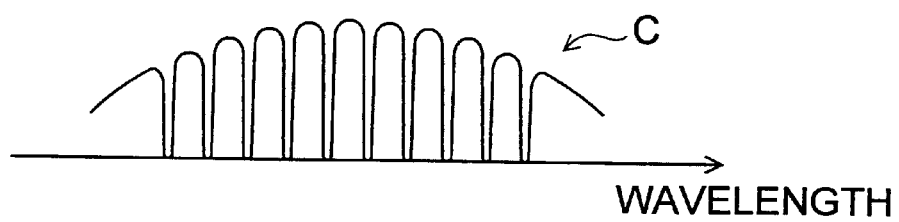

FIG. 7A shows the spectrum of the light A received by the apparatus shown in FIG. 6. FIG. 7B shows the spectrum of the light B reflected by the optical fiber grating 405 and propagating through the optical fiber transmission path 404 through the coupler 402. FIG. 7C shows the spectrum of noise containing no light signal and passing through the optical fiber grating 405.

Figure 8:
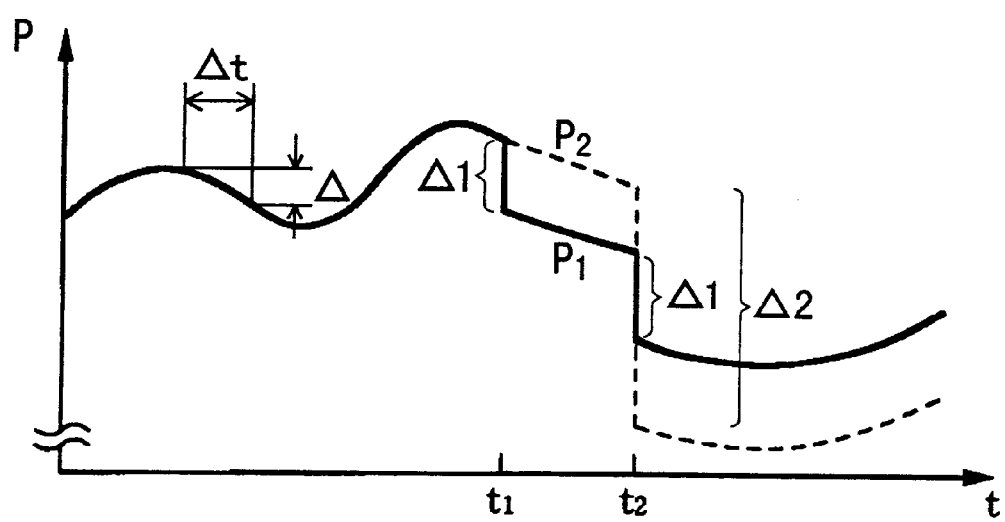
FIG. 8 is a graph for explaining an optical transmission monitoring method using the optical transmission monitoring apparatus according to the first embodiment (FIG. 2A)

FIG. 8 is a graph for explaining an optical transmission monitoring method in the optical transmission monitoring apparatus according to the first embodiment. Referring to FIG. 8, the solid line represents changes in optical power P1 in the first wavelength band, which are detected by the photodetector 313; and the dashed line, changes in optical power P2 in the second wavelength band, which are detected by the photodetector 315. For the sake of easy comparison, the optical power P2 in the second wavelength band is plotted in FIG. 8 to be twice the actual power. The monitoring section 316 of the optical transmission monitoring apparatus 31 compares variation amounts Δ (change rates) of the optical powers P1 and P2 per unit time Δt, and determines the transmission state on the basis of the comparison result as follows.

Since the change rates of the optical powers P1 and P2 in the first and second wavelength bands almost coincide with each other in the time ranges of t<t1, t1<t<t2, and t2<t, it is obvious that the number of light signals propagating through the optical fiber transmission path 42 has not changed. The monitoring section 316 therefore determines that variations in the optical power of light signals have been caused by transmission loss variations in an optical transmission path including the optical fiber transmission path 42 and located upstream of the optical transmission monitoring apparatus 31 or variations in the output level of an optical amplifier and the like on the upstream side.

At times t1 and t2, it is apparent that a variation amount Δ1 of the optical power P1 in the first wavelength band differs from a variation amount Δ2 of the optical power P2 in the second wavelength band. The monitoring section 316 therefore determines that the number of light signals propagating the optical fiber transmission path 42 has changed.

Second Embodiment of Optical Transmission Monitoring Apparatus

Figure 9A:
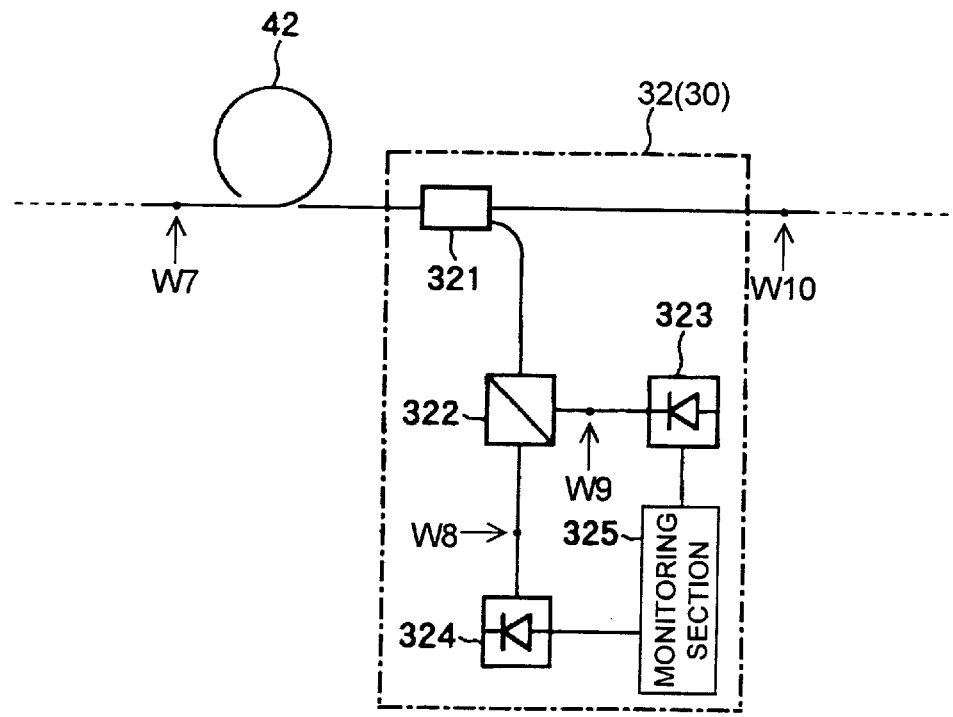
FIG. 9A is a view showing the arrangement of an optical transmission monitoring apparatus according to the second embodiment.

FIG. 9A is a view showing the arrangement of an optical transmission monitoring apparatus according to the second embodiment. FIGS. 9B to 9E are views respectively showing optical spectra in a signal wavelength band (coinciding with a monitor wavelength band) at portions W7 to W10 in FIG. 9A.

This optical transmission monitoring apparatus 32 (corresponding to the optical transmission monitoring apparatus 30 in FIG. 1A) includes at least an optical branching element 321 placed on an optical fiber transmission path 42, a demultiplexing filter 322 optically connected to the optical branching element 321, photodetectors 323 and 324 optically connected to the demultiplexing filter 322, and a monitoring section 325 for inputting data about the optical powers detected by the photodetectors 323 and 324.

The optical branching element 321 branches and drops part of light (see FIG. 9B) in the signal wavelength band which propagates through the optical fiber transmission path 42 and contains eight light signals ($\lambda 1$ to $\lambda 8$). The demultiplexing filter 322 includes, for example, a dichroic mirror and the like, and demultiplexes the light dropped by the optical branching element 321 into light (see FIG. 9D) in the first wavelength band which contains four light signals ($\lambda 1$ to $\lambda 4$) and light (see FIG. 9C) in the second wavelength band which contains the remaining four light signals ($\lambda 5$ to $\lambda 8$). The photodetector 323 includes, for example, a photodiode and the like, and detects optical power in the second wavelength band including the four light signals ($\lambda 5$ to $\lambda 8$) which are outputted from the demultiplexing filter 322. The photodetector 324 also includes, for example, a photodiode and the like, and detects optical power in the first wavelength band including the four light signals ($\lambda 1$ to $\lambda 4$) which are outputted from the demultiplexing filter 322. The monitoring section 325 compares the variation amounts of optical power per unit time which are respectively detected by the photodetectors 323 and 324, and monitors the transmission state in the signal wavelength band on the basis of the comparison result.

Figure 9B:
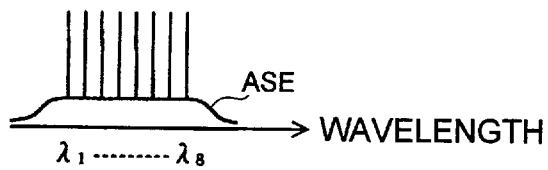
FIGS. 9B to 9E are views respectively showing optical spectra at portions W7 to W10 in a signal wavelength band (coinciding with a monitor wavelength band) in FIG. 9A.
Figure 9C:
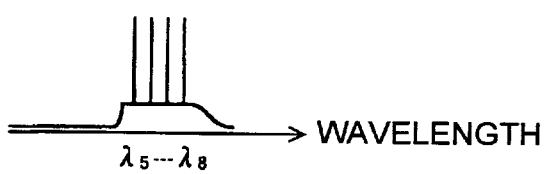
Figure 9D:
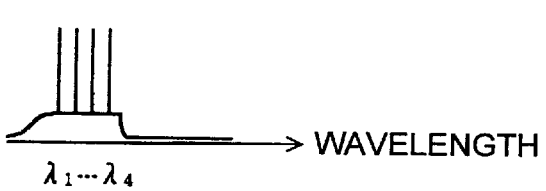
Figure 9E:
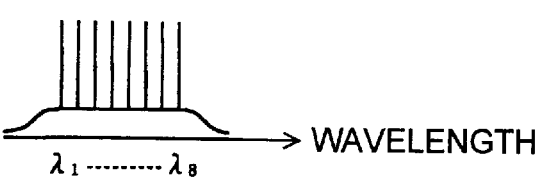

Light reaching the optical transmission monitoring apparatus 32 through the optical fiber transmission path 42 is light outputted from an optical amplifier 20, and contains noise such as ASE as well as eight light signals ($\lambda 1$ to $\lambda 8$) optically amplified altogether by the optical amplifier 20, as shown in FIG. 9B (ditto for FIG. 1C). Most of the light that has reached the optical transmission monitoring apparatus 32 passes through the optical branching element 321 and is outputted from the optical transmission monitoring apparatus 32. As shown in FIG. 9E, the spectrum of the light outputted from the optical transmission monitoring apparatus 32 is the same as that shown in FIG. 9B.

Part of the light that has reached the optical transmission monitoring apparatus 32 is branched and dropped by the optical branching element 321 and demultiplexed into light in the first wavelength band which contains four light signals ($\lambda 1$ to $\lambda 4$) and light in the second wavelength band which contains four light signals ($\lambda 5$ to $\lambda 8$) by the demultiplexing filter 322. The photodetector 323 detects the optical power of the light in the second wavelength band which is outputted from the demultiplexing filter 322. As shown in FIG. 9C, the light in the second wavelength band which is received by the photodetector 323 contain s ASE as noise as well as the four light signals ($\lambda 5$ to $\lambda 8$). The photodetector 324 detects the optical power of the light in the first wavelength band which contains the four remaining light signals ($\lambda 1$ to $\lambda 4$) outputted from the demultiplexing filter 322. As shown in FIG. 9D, the light in the first wavelength band which is received by the photodetector 324 contains ASE as noise as well as the four light signals ($\lambda 1$ to $\lambda 4$). The monitoring section 325 compares the variation amount of optical power in the second wave length band per unit time, detected by the photodetector 323, with the variation amount of optical power in the first wavelength band per unit time, detected by the photodetector 324, and monitors the transmission state in the signal wavelength band on the ba sis of the comparison result.

Figure 10:
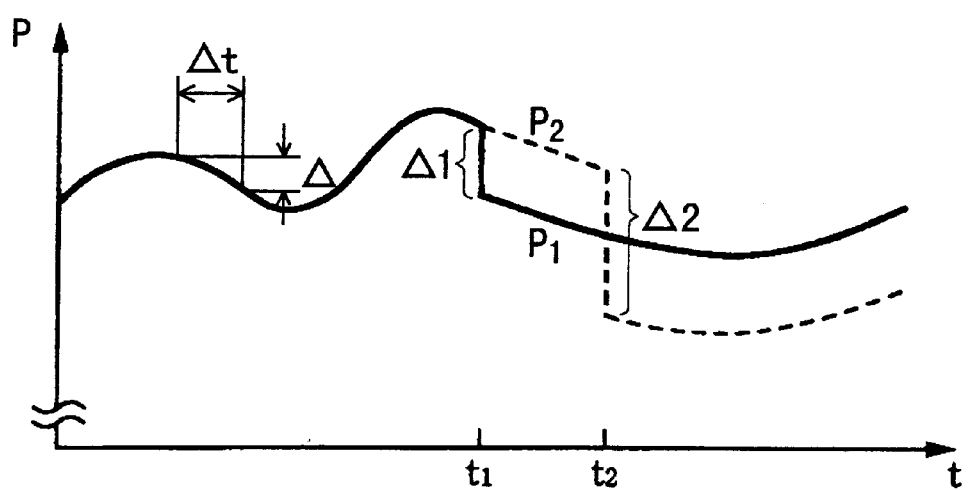
FIG. 10 is a graph for explaining an optical transmission monitoring method using the optical transmission monitoring apparatus according to the second embodiment (FIG. 9A)

FIG. 10 is a graph for explaining an optical transmission monitoring method in the optical transmission monitoring apparatus according to the second embodiment. Referring to FIG. 10, the solid line represents changes in optical power P1 in the first wavelength band, which are detected by the photodetector 323; and the dashed line, changes in optical power P2 in the second wavelength band, which are detected by the photodetector 324. The optical power P2 in the second wavelength band is plotted to be twice the actual power. The monitoring section 325 of the optical transmission monitoring apparatus 31 compares variation amounts $\Delta$ (change rates) of the optical powers P1 and P2 per unit time $\Delta t$, and determines the transmission state on the basis of the comparison result as follows.

Since the change rates of the optical powers P1 and P2 in the first and second wavelength bands almost coincide with each other in the time ranges of t<t1, t1<t<t2, and t2<t, it is obvious that the number of light signals propagating through the optical fiber transmission path 42 has not changed. The monitoring section 325 therefore determines that variations in the optical power of light signals have been caused by transmission loss variations in an optical transmission path including the optical fiber transmission path 42 and located upstream of the optical transmission monitoring apparatus 32 or variations in the output level of an optical amplifier and the like on the upstream side.

At times t1 and t2, it is apparent that a variation amount $\Delta 1$ of the optical power P1 in the first wavelength band differs from a variation amount $\Delta 2$ of the optical power P2 in the second wavelength band. The monitoring section 325 therefore determines that the number of light signals propagating the optical fiber transmission path 42 has changed.

(Optical Amplification System)

Figure 11A:
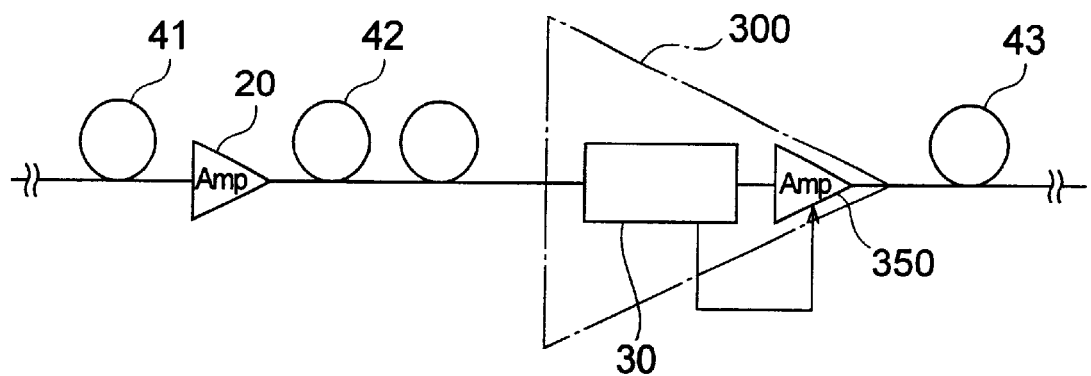
FIGS. 11A and 11B are views each showing the schematic arrangement of an optical transmission amplification system according to the present invention.
Figure 11B:
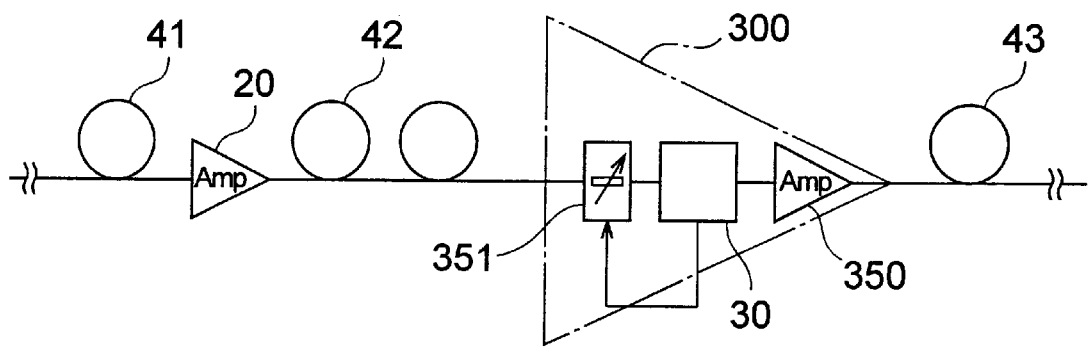
Figure 12:
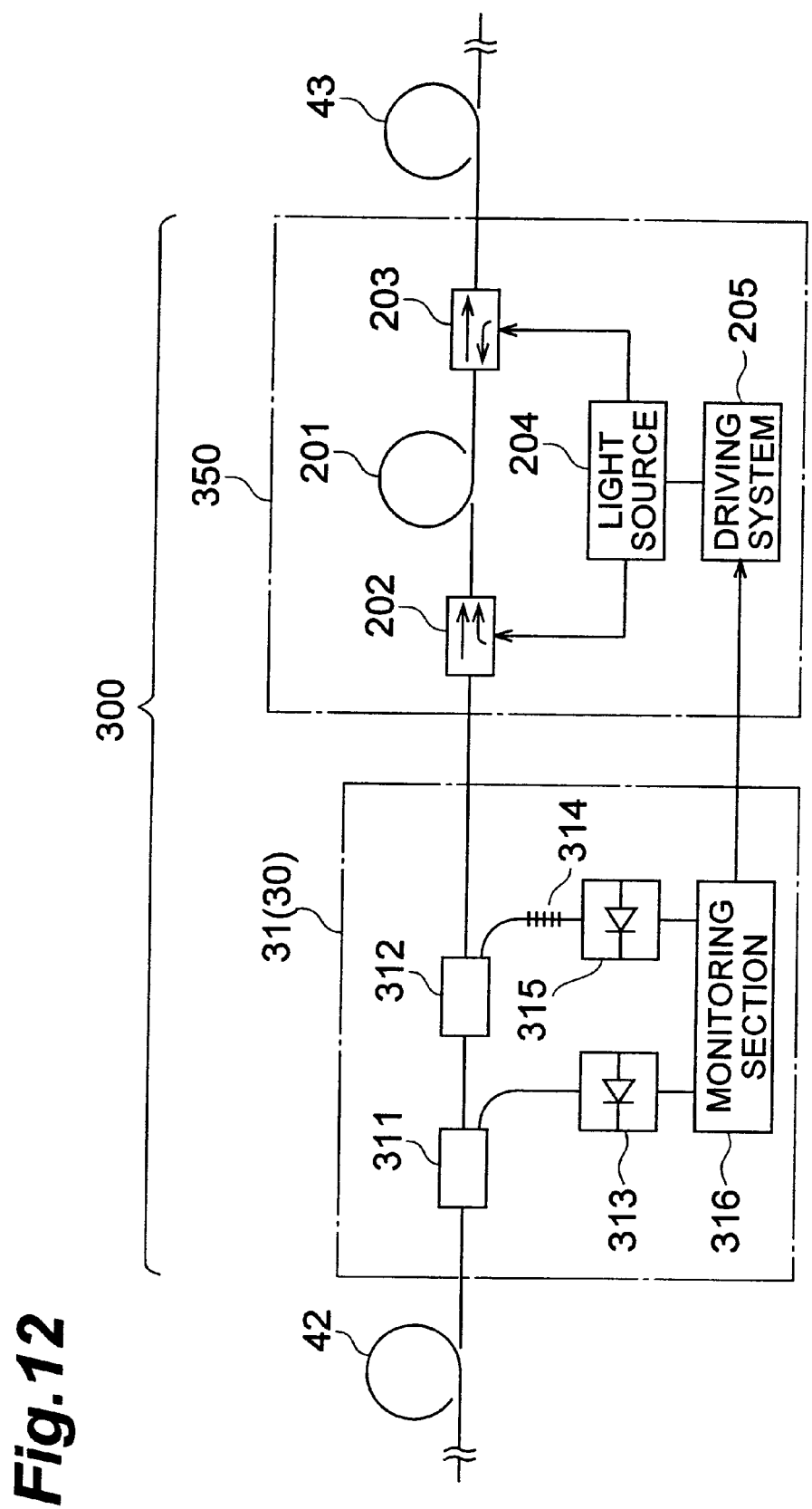
FIG. 12 is a view showing the detailed arrangement of the optical amplification system in FIG. 11A.
Figure 13:
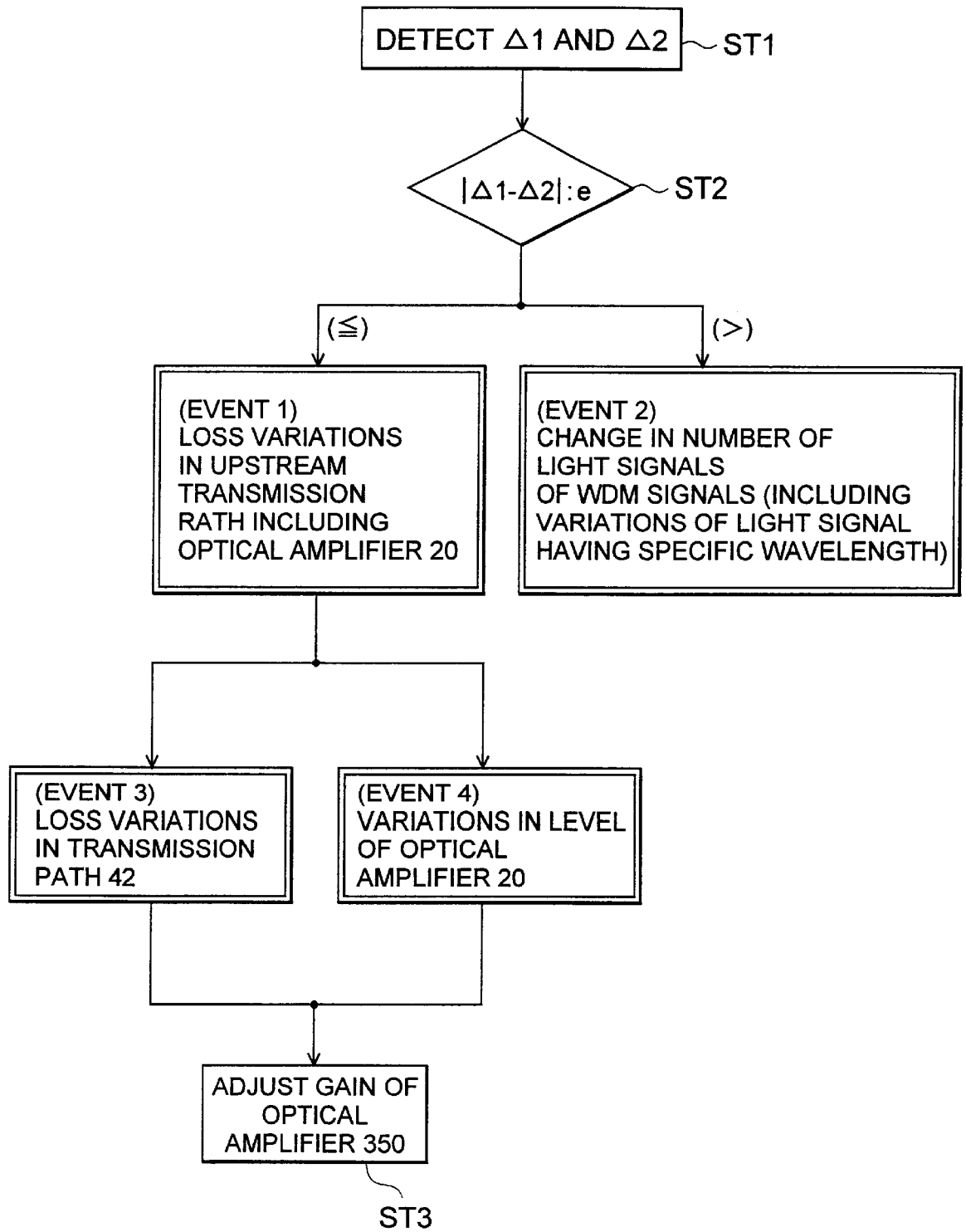
FIG. 13 is a flow chart for explaining a method of controlling the optical amplification system in FIG. 12.

FIGS. 11A and 11B are views showing the schematic arrangements of optical amplification systems according to the present invention. FIG. 12 is a view showing the detailed arrangement of the optical amplification system in FIG. 11A. FIG. 13 is a flow chart for explaining a method of controlling the optical amplification system in FIG. 12.

The first embodiment of an optical amplification system 300 shown in FIG. 11A includes an optical amplifier 350 and an optical transmission monitoring apparatus 30 for adjusting the gain of the optical amplifier 350. The optical amplification system 300 according to the first embodiment is designed such that the optical transmission monitoring apparatus 30 monitors the transmission state on the upstream side and adjusts the output of the optical amplifier 350 in accordance with the transmission state. An optical amplification system 300 in FIG. 11B includes an optical transmission monitoring apparatus 30 for monitoring the transmission state on the upstream side, an optical amplifier 350 for optically amplifying light passing through the optical transmission monitoring apparatus 30 altogether, and a variable attenuator 351 disposed to face the optical amplifier 350 across the optical transmission monitoring apparatus 30. The optical amplification system 300 according to the second embodiment is designed such that the optical transmission monitoring apparatus 30 monitors the optical transmission state on the upstream side and adjusts the attenuation amount of the variable attenuator 351 so as to control the optical power of input light to the optical amplifier 350 in accordance with the optical transmission state.

FIG. 12 shows the detailed arrangement of the optical amplification system 300 in FIG. 11A, and more specifically, the arrangement of the system using the optical transmission monitoring apparatus 31 according to the first embodiment described above (FIG. 2A) as the optical transmission monitoring apparatus 30.

Referring to FIG. 12, the optical transmission monitoring apparatus 31 of the optical amplification system 300 includes optical branching elements 311 and 312, an optical fiber grating 314 as a bandpass filter, photodetectors 313 and 315, and a monitoring section 316, as described above.

The optical amplifier 350 located downstream of the optical transmission monitoring apparatus 31 includes an Er-doped amplification optical fiber 201, a pumping source 204 for supplying pumping light to the amplification optical fiber 201, an optical isolator 202 for guiding light signals propagating through an optical fiber transmission path 41 to the amplification.optical fiber 201 and guiding pumping light from the pumping source 204 to the amplification optical fiber 201, an optical isolator 203 for guiding optically amplified light signals to an optical fiber transmission path 42 and guiding pumping light from the pumping source 204 to the amplification optical fiber 201, and a driving system 205 for the pumping source. Note that the monitoring section 316 of the optical transmission monitoring apparatus 31 adjusts the gain of the optical amplifier 20 by controlling the driving system 205 in accordance with the transmission state of monitored light signals.

The operation of the optical amplification system 300 according to the present invention will be described next, with particular emphasis on the operation of the optical transmission monitoring apparatus 31, with reference to the flow chart shown in 13. Assume that the monitor wavelength band monitored by the optical transmission monitoring apparatus 31 coincides with the signal wavelength band in the following description. Assume also that the first wavelength band in the monitor wavelength band coincides with the entire monitor wavelength band (including light signals λ1 to λ8), and the photodetector 313 detects the optical power in the first wavelength band. Assume further that the second wavelength band is a wavelength band including four light signals (λ5 to λ8), and the photodetector 315 detects the optical power in the second wavelength band.

Electrical signals corresponding to the optical powers in the first and second wavelength bands which are respectively detected by the photodetectors 313 and 315 are sequentially input to the monitoring section 316. The monitoring section 316 calculates a variation amount Δ1 of optical power in the first wavelength band per unit time and a variation amount Δ2 of optical power in the second wavelength band per unit time from the respective input electrical signals (step ST1).

The monitoring section 316 then checks whether a different |Δ1−Δ2| between the obtained variation amounts Δ1 and Δ2 is equal to or less than an allowable value e (step ST2).

It is known that the number of light signals propagating through an optical transmission path is proportional to the signal level (optical power) in general, and the signal level decreases by about 3 dB with a decrease in the number of signals from 16 ch to 8 ch in WDM transmission. However, in a transmission loss in the optical transmission path, signal level variations of about 3 dB occur. When, therefore, only the signal level of light input to the optical transmission monitoring apparatus 31 is monitored, it cannot be determined in practice whether the signal level variations are caused by an increase/decrease in the number of light signals or are simple loss variations in the optical transmission path. According to the present invention, two different wavelength bands are prepared as wavelength bands to be monitored, and the two wavelength bands are independently monitored to monitor the transmission state. More specifically, as described above, since a transmission loss in an optical transmission path generally occurs throughout a signal wavelength band (a transmission loss has no wavelength dependency), no big difference is caused between loss variations in the two wavelength bands. When, therefore, the monitoring section 316 determines that the difference |Δ1−Δ2| between the variation amounts of the respective optical powers detected by the photodetectors 313 and 315 is equal to or less than the allowable value e, loss variations in the optical transmission path on the upstream side of the optical transmission monitoring apparatus 31 can be determined (event 1). When the signal level of output light from the optical amplifier 20 located on the upstream side is monitored, it can be checked whether optical power variations (loss variations) in the optical transmission path are amplification level variations in the optical amplifier 20 (event 4) or loss variations in the transmission path 42 (event 3). When the optical power variations are determined as loss variations in this manner, the monitoring section 316 adjusts the gain of the optical amplifier 350 on the downstream side to realize ALC operation by adjusting the gain the loss variations (step ST3). The monitoring section 316 performs gain adjustment by controlling the driving system 205 of the optical amplifier in accordance with the variation amount difference obtained in step ST2. More specifically, the monitoring section 316 outputs an electrical signal for driving control to the driving system 205. The driving system 205 applies a driving voltage to the pumping source 204 in accordance with the supplied electrical signal. By adjusting the driving voltage in this manner, the optical power of pumping light outputted from the pumping source 204 is adjusted. This makes it possible to adjust the gain of the optical amplifier 20. That is, the gain of the optical amplifier 350 is adjusted by adjusting the power of pumping light supplied to the amplification optical fiber 201.

When it is determined in step ST2 that the difference between the variation amounts of the respective optical powers detected by the photodetectors 313 and 315 exceeds the allowable value e, it can be determined that the numbers of components in the two different wavelength bands prepared as monitor wavelength bands have varied differently (event 2). When it is determined that the difference between the variation amounts of the respective optical powers detected by the photodetectors 313 and 315 exceeds the allowable value e, the gain of the optical amplifier 350 is not adjusted. (Third Embodiment of Optical Transmission Monitoring Apparatus)

Figure 14A:
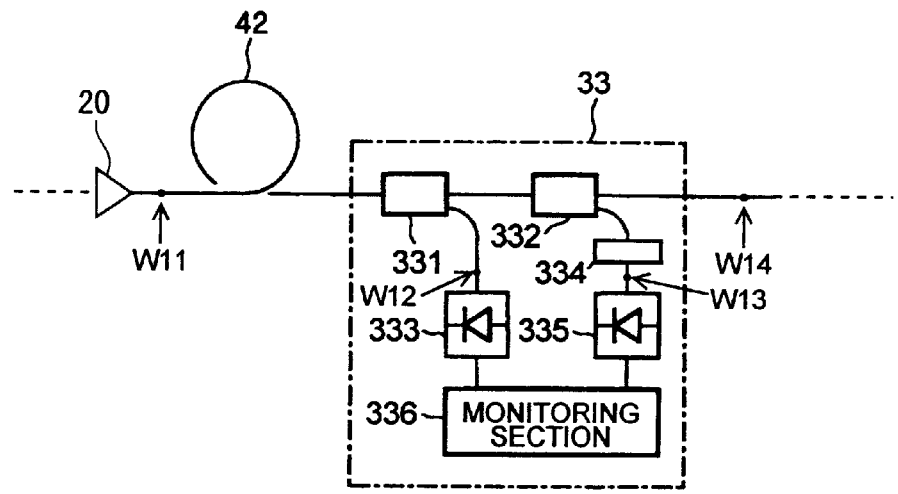
FIG. 14A is a view showing the arrangement of an optical transmission monitoring apparatus according to the third embodiment.

An optical transmission monitoring apparatus according to the third embodiment will be described next. FIG. 14A is a view showing the arrangement of the optical transmission monitoring apparatus according to the third embodiment. FIGS. 14B to 14E are views respectively showing optical spectra in a signal wavelength band (coinciding with a monitor wavelength band) at portions W11 to W14 in FIG. 14A.

An optical transmission monitoring apparatus 33 according to the third embodiment includes optical branching elements 331 and 332 arranged on an optical fiber transmission path 42, a photodetector 333 optically connected to the optical branching element 331, a bandpass filter 334 having one end optically connected to the optical branching element 332, a photodetector 335 optically connected to the other end of the bandpass filter 334, and a monitoring section 336 that uses detection signals from the photodetectors 333 and 335.

Each of the optical branching elements 331 and 332 includes, for example, a photocoupler and the like, and separates part of light in the signal wavelength band which propagates through the optical fiber transmission path 42 and contains eight light signals (λ1 to λ8). The photodetector 333 includes, for example, a photodiode and the like and detects the optical power of the light separated by the optical branching element 331. The bandpass filter 334 is disposed between the optical branching element 332 and photodetector 335 and has the function of transmitting light in a wavelength band including four light signals (λ3 to λ6) of the light signals separated by the optical branching element 332. The photodetector 335 includes, for example, a photodiode and the like, and detects the optical power of light transmitting through the bandpass filter 334. the monitoring section 336 receives data about the optical powers respectively detected by the photodetectors 333 and 335, and monitors the transmission state in the signal wavelength band on the basis of the result obtained by comparing the variation amounts of the respective optical powers per unit time.

Figure 14B:
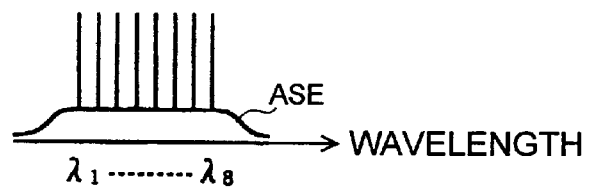
FIGS. 14B to 14E are views respectively showing optical spectra at portions W11 to W14 in a signal wavelength band in FIG. 14A.
Figure 14C:
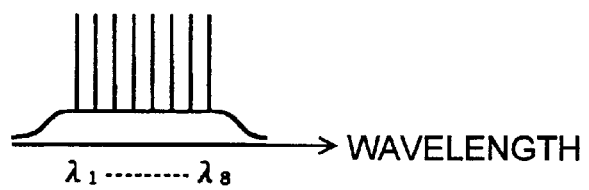
Figure 14D:
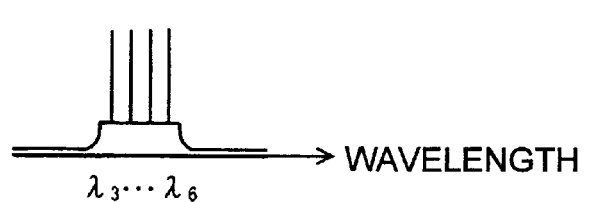
Figure 14E:
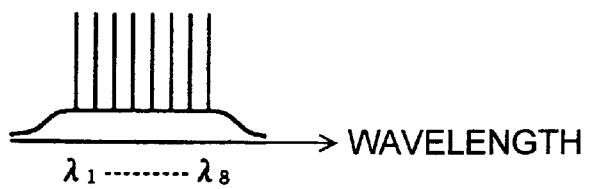

In the third embodiment, the monitor wavelength band coincides with the signal wavelength band. Light reaching the optical transmission monitoring apparatus 33 through the optical fiber transmission path 42 is light outputted from the optical amplifier 20, and contains ASE as noise as well as eight light signals λ1 to λ8) optically amplified by an optical amplifier 20 altogether, as shown in FIG. 14B (ditto for FIG. 1C). Most of the light that has reached the optical transmission monitoring apparatus 33 passes through the optical branching elements 331 and 332 and is outputted from the optical transmission monitoring apparatus 33. As shown in FIG. 14E, the spectrum of the light outputted from the optical transmission monitoring apparatus 33 coincides with the spectrum of light (FIG. 14B) reaching the optical transmission monitoring apparatus 33.

Part of the light reaching the optical transmission monitoring apparatus 33 is separated by the optical branching element 331. The photodetector 333 then detects the optical power of the light. The light (in the first wavelength band) received by the photodetector 333 contains ASE as well as eight light signals (λ4 to λ8), as shown in FIG. 14C. Part of the light reaching the optical transmission monitoring apparatus 33 is also separated by the optical branching element 332. Of this light, light in a wavelength band including four light signals (λ3 to λ6) reaches the photodetector 335 through the bandpass filter 334. The photodetector 335 detects the optical power of the light that has passed through the bandpass filter 334. The light (in the second wavelength band) received by the photodetector 335 contains not only four light signals (λ3 to λ6) but also ASE noise in the wavelength band of these light signals, as shown in FIG. 14D. A monitoring section 336 compares the variation amount of optical power in the first wavelength band per unit time, detected by the photodetector 333, with the variation amount of optical power in the second wavelength band per unit time, detected by the photodetector 335, and monitors the transmission state of the signal wavelength band coinciding with the monitor wavelength band on the basis of the comparison result.

This optical transmission monitoring mode is the same as that described with reference to FIG. 8.

In general, the optical amplifier 20 is required to be free from gain deviations with respect to light signals. In this case, upon reception of WDM signals with little differences between the respective light signals, the optical amplifier 20 evenly amplifies the respective light signals and outputs the amplified light to the optical fiber transmission path 42. In the optical amplifier 20, automatic level control (ALC) is performed to maintain the respective light signals contained in the output amplified light at a constant value. This automatic level control is performed by setting a new gain when it is determined that the optical power in the signal wavelength band (coinciding with the monitor wavelength band) varies due to transmission loss variations or the like in the optical fiber transmission path 42. When a new gain is set in this manner, a new gain deviation is caused. As a consequence, the gains for the respective light signals may differ from each other (the wavelength dependency of the optical amplifier 20). In this case, even if light signals having uniform optical power are input to the optical amplifier 20, the optical amplifier 20 outputs amplified light (WDM signal) with different gains for the respective light signals.

Figure 15:
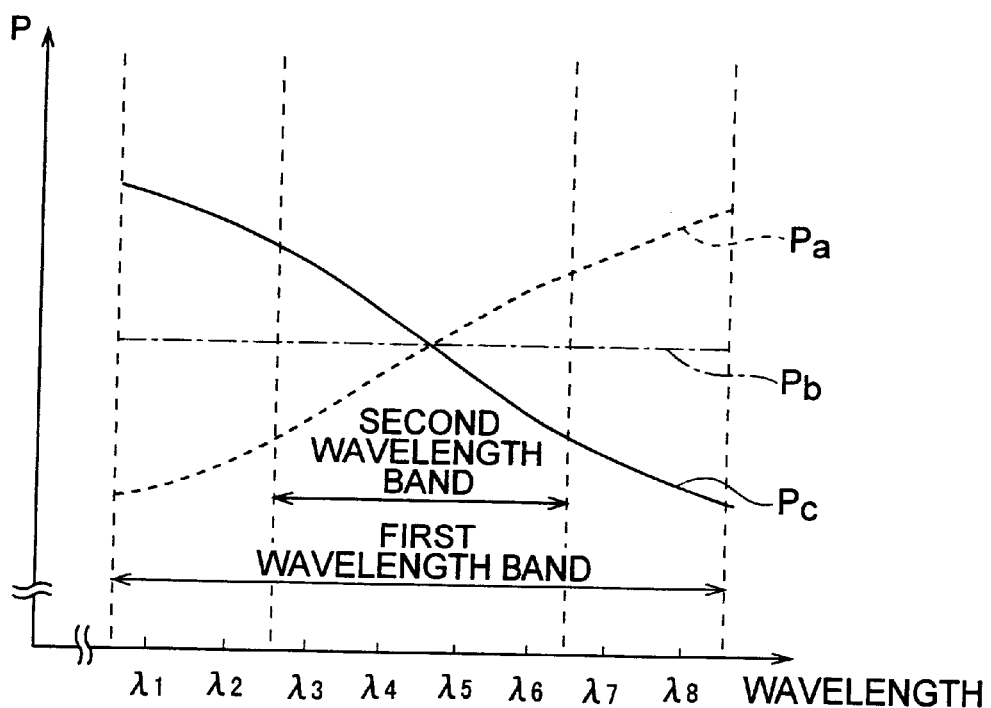
FIG. 15 is a view showing the spectra of output light signals from an optical amplifier.

FIG. 15 is a graph showing the spectrum of output light from the optical amplifier. As shown in FIG. 15, as the input optical power varies, the spectrum of output light from the optical amplifier 20 varies. It is, however, apparent that the gain at a wavelength near the center of the signal wavelength band in which light is optically amplified by the optical amplifier 20 altogether is substantially equal to the average gain of the optical amplifier 20 in the signal wavelength band. For this reason, in the optical transmission monitoring apparatus 33 according to the third embodiment, the first and second wavelength bands are set to be centered on the wavelength corresponding to the gain substantially equal to the average gain of the optical amplifier 20 in the signal wavelength band (monitor wavelength band).

The function of the optical transmission monitoring apparatus 33 according to the third embodiment will be described below in comparison with the optical transmission monitoring apparatus 31 according to the first embodiment (FIG. 2A). FIGS. 16A to 16E are views for explaining the function of the optical transmission monitoring apparatus 33 according to the third embodiment, and respectively show the spectra of light outputted from the optical amplifier 20.

Figure 16A:
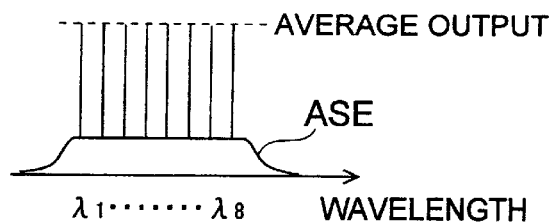
FIGS. 16A to 16E are views for explaining the function of the optical transmission monitoring apparatus according to the third embodiment (FIG. 14A)
Figure 16B:
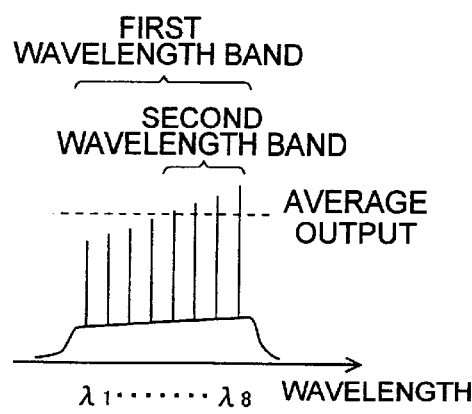
Figure 16C:
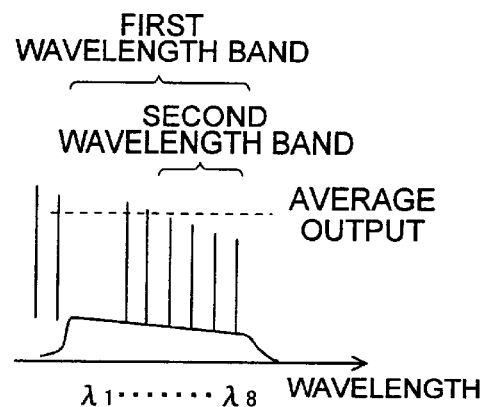

When the optical amplifier 20 has no gain deviations, the change rate of optical power P1 of light belonging in the first wavelength band is almost equal to the change rate of optical power P2 of light belonging in the second wavelength band (see FIG. 16A). In this case, therefore, both the optical transmission monitoring apparatus 31 according to the first embodiment and the optical transmission monitoring apparatus 33 according to the third embodiment can discriminate a case wherein the number of light signals (monitoring light signals) propagating through the optical fiber transmission path 42 have varied and a case wherein transmission loss variations or the like in the optical fiber transmission path 42 have occurred.

In the optical transmission monitoring apparatus 31 according to the first embodiment, the change rate of the optical power P1 in the first wavelength band (λ1 to λ8) differs from the change rate of the optical power P2 in the second wavelength band (λ5 to λ8) (see FIGS. 16B and 16C) in both the case wherein the number of light signals propagating through the optical fiber transmission path 42 has varied and the case wherein a gain deviation has been caused in the optical amplifier 20 by transmission loss variations or the like in the upstream transmission path. The optical transmission monitoring apparatus 31 according to the first embodiment cannot therefore discriminate the above two cases.

Figure 16D:
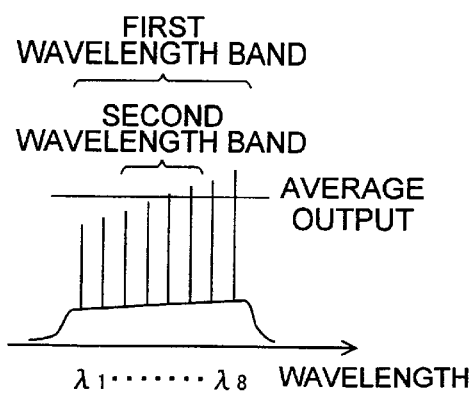
Figure 16E:
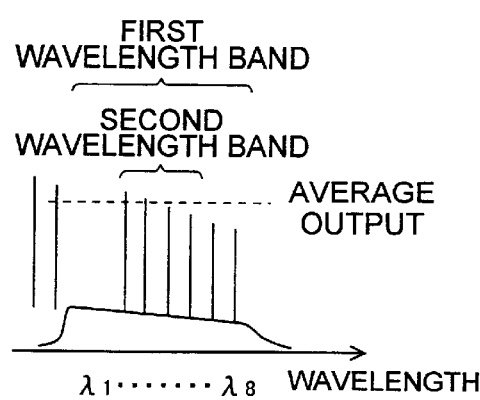

In contrast to this, in the optical transmission monitoring apparatus 33 according to the third embodiment, since the first and second wavelength bands are set to be centered on the wavelength corresponding to a gain almost equal to the average gain of the optical amplifier 20 in the signal wavelength band (monitor wavelength band), even if a gain deviation occurs in the optical amplifier 20, the change rate of the optical power P1 in the first wavelength band (λ1 to λ8) becomes almost equal to the change rate of the optical power P2 in the second wavelength band (λ3 to λ6) (see FIGS. 16D and 16E). Therefore, the optical transmission monitoring apparatus 33 according to the third embodiment can always discriminate the case wherein the number of light signals propagating through the optical fiber transmission path 42 has varied and the case wherein transmission loss variations or the like have occurred in the upstream transmission path.

In addition, since the signal wavelength band substantially coinciding with the average gain of the optical amplifier 20 changes as the signal wavelength band or the number of light signals of WDM signals changes, the first and second wavelength bands are preferably set in accordance with the width of the signal wavelength band and the number of light signals of WDM signals in the third embodiment.

Figure 17A:
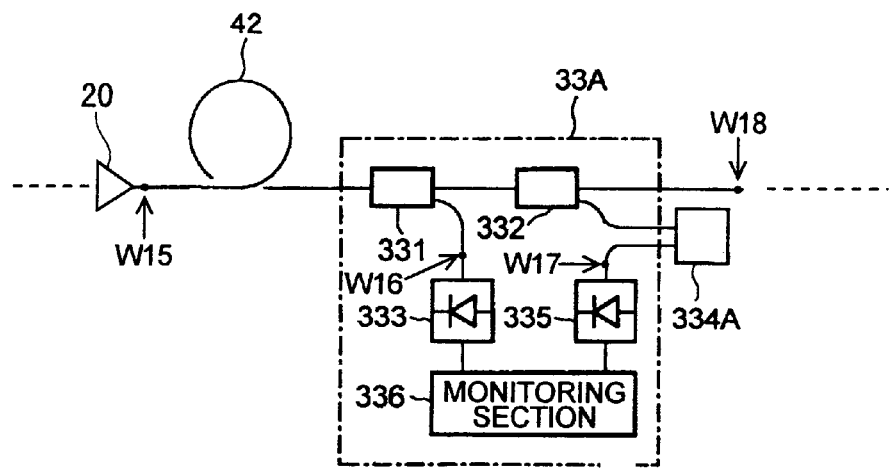
FIG. 17A is a view showing the arrangement of the first modification of the optical transmission monitoring apparatus according to the third embodiment.

FIG. 17A shows the arrangement of a modification of the optical transmission monitoring apparatus according to the third embodiment. FIGS. 17B to 17E are views respectively showing the optical spectra at portions W15 to W18 in FIG. 17A. This modification includes a wavelength selection element 334A independently of an optical transmission monitoring apparatus body 33A. This wavelength selection element 334A is detachably disposed between an optical branching element 332 and photodetector 335 of the optical transmission monitoring apparatus body 33A, and can be replaced with another one in accordance with the number of light signals or the width of a signal wavelength band.

When a bandpass filter is used as the wavelength selection element 334A, the apparatus of the first modification has substantially the same arrangement as that of the optical transmission monitoring apparatus 33 shown in FIG. 14A. When an optical fiber grating is used as the wavelength selection element 334A, light (in the second wavelength band) received by the photodetector 335 contains not only four light signals having wavelengths $\lambda 1$, $\lambda 2$, $\lambda 7$, and $\lambda 8$ but also ASE in the wavelength band of these light signals, as shown in FIG. 17D. As described above, in addition to the same function and effect as those of the apparatus shown in FIG. 14A, the optical transmission monitoring apparatus having the arrangement shown in FIG. 17A has the effect of optimally setting a selection wavelength band for the optical transmission monitoring apparatus without disconnecting the main line of the optical transmission path.

Figure 17B:
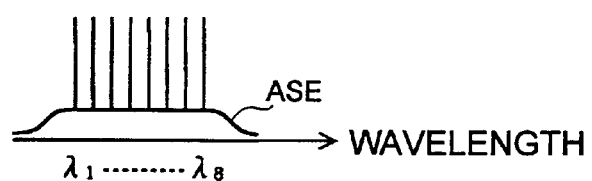
FIGS. 17B to 17E are views respectively showing the optical spectra of light signals at portions W15 to W18 in a signal wavelength band (coinciding with a monitor wavelength band) in FIG. 17A.
Figure 17C:
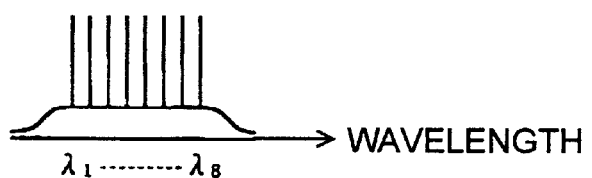
Figure 17D:
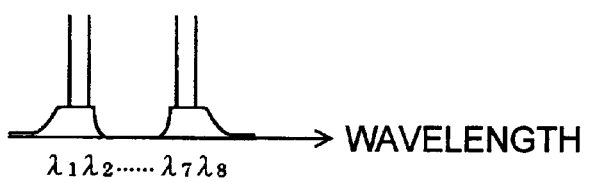
Figure 17E:
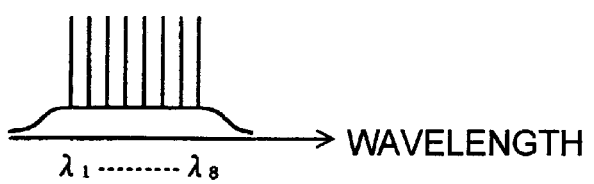

In the optical transmission system to which this modification is applied, light outputted from an optical amplifier 20 also contains ASE as well as light signals (used as monitoring light signals in this embodiment as well), as shown in FIG. 17B. In the optical transmission monitoring apparatus body 33A, a photodetector 333 detects light having a spectrum like the one shown in FIG. 17C, and outputs light like the one shown in FIG. 17B (see FIG. 17E).

First Embodiment of Optical Transmission System

Figure 18:
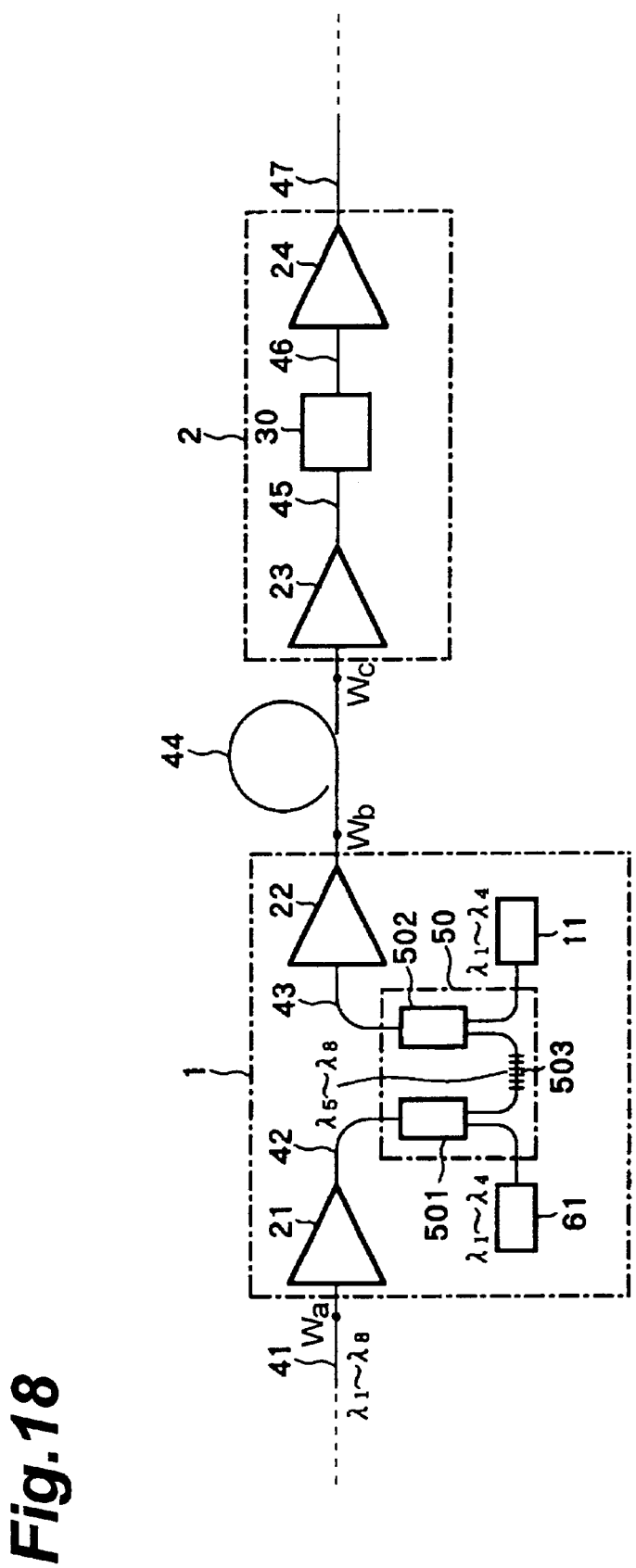
FIG. 18 is a view showing the arrangement of the first embodiment of an optical transmission system to which an optical transmission monitoring apparatus according to the present invention is applied.

The first embodiment of the optical transmission system to which the optical transmission monitoring apparatus according to the present invention is applied will be described next. FIG. 18 is a view showing the arrangement of part of the optical transmission system to which the optical transmission monitoring apparatus according to the present invention is applied. FIGS. 19A to 19H are views respectively showing optical spectra at the respective portions in the optical transmission system shown in FIG. 18.

The optical transmission system according to the first embodiment shown in FIG. 18 is comprised of an optical amplifier 21, optical ADM 50, optical amplifier 22, optical amplifier 23, optical transmission monitoring apparatus 30, and optical amplifier 24 which are sequentially cascaded through optical fiber transmission paths 41 to 47. In this case, a first repeater station 1 is constituted by the optical amplifiers 21 and 22, the optical ADM 50, a receiver 61, and a transmitter 11. A second repeater station 2 is constituted by the optical amplifiers 23 and 24 and optical transmission monitoring apparatus 30. Each of the first and second repeater stations 1 and 2 includes two optical amplifiers. Referring to FIG. 18, a point Wa is near the input terminal of the optical amplifier 21 of the first repeater station 1; a point Wb, near the output terminal of the optical amplifier 22 of the first repeater station 1; and a point Wc, near the input terminal of the optical amplifier 23 of the second repeater station 2.

Each of the optical amplifiers 21 to 24 is an optical component for amplifying input light and outputting the amplified light. When WDM signals having a plurality of wavelengths is input to each optical amplifier, the amplifier optically amplifies the signal altogether. The optical transmission monitoring apparatus 30 is disposed between the optical amplifier 23 and optical amplifier 24. The optical ADM 50 is disposed between the optical amplifier 21 and optical amplifier 22 and optically connected to the output terminal of the optical amplifier 21 and the input terminal of the optical amplifier 22. The optical ADM 50 is also optically connected to the receiver 61 and transmitter 11.

The optical ADM 50 is comprised of photocouplers 501 and 502 and optical fiber grating 503. The photocoupler 501 demultiplexes eight light signals ($\lambda 1$ to $\lambda 8$) that have reached from the optical amplifier 21 through the optical fiber transmission path 42, and outputs four light signals ($\lambda 1$ to $\lambda 4$) to the receiver 61. In addition, the photocoupler 501 outputs the four remaining light signals ($\lambda 5$ to $\lambda 8$) to the optical fiber grating 503. The optical fiber grating 503 transmits the four light signals ($\lambda 5$ to $\lambda 8$) from the photocoupler 501, and cuts off the four light signals ($\lambda 1$ to $\lambda 4$). The photocoupler 502 multiplexes the four light signals ($\lambda 5$ to $\lambda 8$) from the optical fiber grating 503 and the new four light signals ($\lambda 1$ to $\lambda 4$) outputted from the transmitter 11. This composite light is guided to the optical amplifier 22 through the optical fiber transmission path 43.

In this optical transmission system, the eight light signals ($\lambda 1$ to $\lambda 8$) input to the optical amplifier 21 through the optical fiber transmission path 41 are optically amplified by the optical amplifier 21 altogether and guided to the optical ADM 50 through the optical fiber transmission path 42. Of the eight light signals ($\lambda 1$ to $\lambda 8$) that have reached the optical ADM 50, four light signals ($\lambda 1$ to $\lambda 4$) are received by the receiver 61 through the photocoupler 501. The four remaining light signals ($\lambda 5$ to $\lambda 8$) are input to the photocoupler 502 through the photocoupler 501 and optical fiber grating 503. The photocoupler 502 then multiplexes the four light signals ($\lambda 5$ to $\lambda 8$) and the four light signals ($\lambda 1$ to $\lambda 4$) newly outputted from the transmitter 11.

The eight light signals ($\lambda 1$ to $\lambda 8$) outputted from the photocoupler 502 of the optical ADM 50 propagate through the optical fiber transmission path 43 and are optically amplified by the optical amplifier 22 altogether. The amplified light signals propagate through the optical fiber transmission path 44 and are further amplified by the optical amplifier 23. The eight light signals ($\lambda 1$ to $\lambda 8$) outputted from the optical amplifier 23 are input to the optical transmission monitoring apparatus 30 through the optical fiber transmission path 45. The optical transmission monitoring apparatus 30 then monitors the optical transmission state on the upstream side by using this input light. Meanwhile, the eight light signals ($\lambda 1$ to $\lambda 8$) excluding light used for monitoring pass through the optical transmission monitoring apparatus 30 and the optical fiber transmission path 46 and are optically amplified by the optical amplifier 24 altogether. The amplified light signals are output to the optical fiber transmission path 47.

Figure 19A:
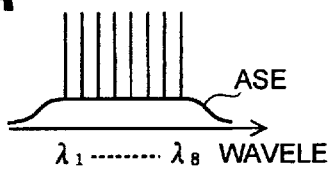
FIGS. 19A to 19H are views respectively showing optical, spectra at portions in the optical transmission system in FIG. 18.
Figure 19B:
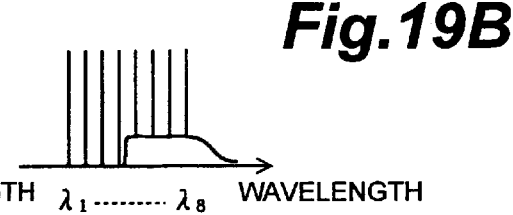
Figure 19C:
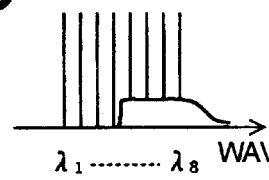

As shown in FIG. 19A, the light that has reached the input point Wa of the first repeater station 1 contains eight light signals ($\lambda 1$ to $\lambda 8$) having almost equal power levels and ASE belonging in the overall signal wavelength band. When this optical transmission system functions normally, the light at the output point Wb of the first repeater station 1 contains eight light signals ($\lambda 1$ to $\lambda 8$) having almost equal levels and ASE in the region defined by the wavelengths $\lambda 5$ to $\lambda 8$. The reason why ASE in the region defined by the wavelengths $\lambda 1$ to $\lambda 4$ is not contained is that the light in this wavelength band is transmitted from the photocoupler 501 of the optical ADM 50 to the receiver 61 and cut off by the optical fiber grating 503. Likewise, the light that has reached the second repeater station 2 contains eight light signals ($\lambda 1$ to $\lambda 8$) having almost equal levels and ASE in the region defined by the wavelengths $\lambda 1$ to $\lambda 4$, as shown in FIG. 19C.

Figure 19D:
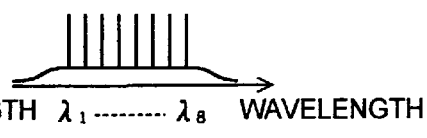
Figure 19E:
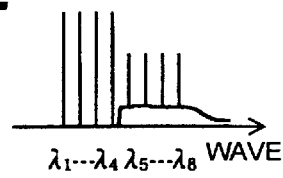
Figure 19F:
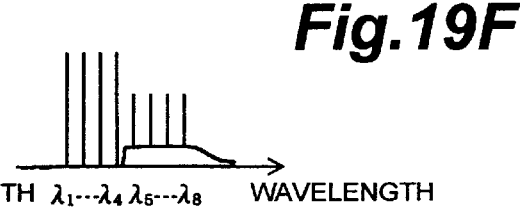

When the transmission loss on the upstream side of the point Wa increases, the light that has reached the point Wa contains eight light signals ($\lambda 1$ to $\lambda 8$) having almost equal power levels and ASE belonging in the overall signal wavelength band, as shown in FIG. 19D. However, the overall optical power in this case is lower than that in the normal case (see FIG. 19A). As shown in FIG. 19E, the light at the point Wb is constituted by only four light signals (λ1 to λ4) having the same optical power as that in the normal case (see FIG. 19B) in the wavelength band defined by the wavelengths λ1 to λ4. In the region defined by the wavelengths λ5 to λ8, however, the optical power becomes lower than that in the normal case (see FIG. 19B) for the following reason. The optical power of light in the wavelength band defined by the wavelengths λ5 to λ8, which light passes through the optical ADM 50, decreases owing to the influence of an increase in transmission loss on the upstream side of the point Wa. In contrast to this, light in the wavelength band defined by the wavelengths λ1 to λ4, which light is inserted by the optical ADM 50, does not receive the influence of the transmission loss. Likewise, as shown in FIG. 19F, the light that has reached the point Wc is constituted by only four light signals (λ1 to λ4) having the same optical power as that in the normal case (see FIG. 19C) in the region defined by the wavelengths λ1 to λ4. In the region defined by the wavelengths λ5 to λ8, the optical power decreases as compared with the optical power (see FIG. 19C) in the normal case.

Figure 19G:
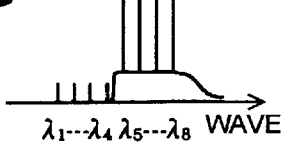
Figure 19H:
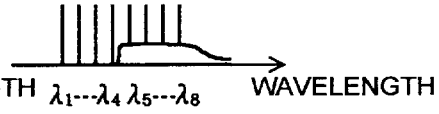

Assume that the optical power of four light signals (λ1 to λ4) to be outputted from the transmitter 11 and multiplexed by the photocoupler 502 of the optical ADM 50 decreases due to a failure in the transmitter 11 or photocoupler 502. In this case, as shown in FIG. 19G, the optical powers of the light at the point Wb and the light reaching the point Wc are low as compared with the optical power in the normal case (see FIGS. 19B and 19C) in the region defined by the wavelengths λ1 to λ4. In the region defined by the wavelengths λ5 to λ8, the light contains four light signals (λ1 to λ4) having the same optical power as that in the normal case (see FIGS. 19B and 19C) and ASE. When the transmission loss increases in the interval between the points Wb and Wc, the optical power of the light that has reached the point Wb decreases as compared with the optical power in the normal case (FIG. 19C), as shown in FIG. 19H.

As described above, when the transmission loss increases on the upstream side of the point Wa, the optical power of four light signals (λ1 to λ4) to be inserted by the optical ADM 50 decreases. In addition, with an increase in transmission loss in the interval between the points Wb and Wc, even if all the optical powers of light signals that have reached the point Wc are substantially equal to each other, the change rate of optical power of light in the region defined by the wavelengths λ1 to λ4 differs from the change rate of optical power of light in the region defined by the wavelengths λ5 to λ8.

In other words, when the transmission loss increases on the upstream side of the point Wa, a change in the optical power of light, of the light that has reached the point Wc, which is in the region defined by the wavelengths λ5 to λ8 is larger than a change in optical power in the region defined by the wavelengths λ1 to λ4 (see FIG. 19F). When the optical power of four light signals (λ1 to λ4) to be inserted by the optical ADM 50 decreases, a change in the optical power of light, of the light that has reached the point Wc, which is in the region defined by the wavelengths λ1 to λ4 is larger than a change in optical power in the region defined by the wavelengths λ5 to λ8 (see FIG. 19G). When the transmission loss increases in the interval between the points Wb and Wc, a change in the optical power of light, of the light that has reached the point Wc, which is in the region defined by the wavelengths λ1 to λ4 is almost equal to a change in optical power in the region defined by the wavelengths λ5 to λ8 (see FIG. 19H).

The optical transmission monitoring apparatus 30 installed in the second repeater station 2 therefore compares a change in optical power in the region defined by the wavelengths λ1 to λ4 with a change in optical power in the region defined by the wavelengths λ5 to λ8, and can determine on the basis of the comparison result whether the transmission loss has increased in a specific area in the optical transmission system, four light signals (λ1 to λ4) are normally inserted by the optical ADM 50, or the number of light signals has varied. The optical transmission monitoring apparatus 30 controls the gains of the optical amplifiers 23 and 24 on the basis of this monitoring result.

Second Embodiment of Optical Transmission System

Figure 21A:
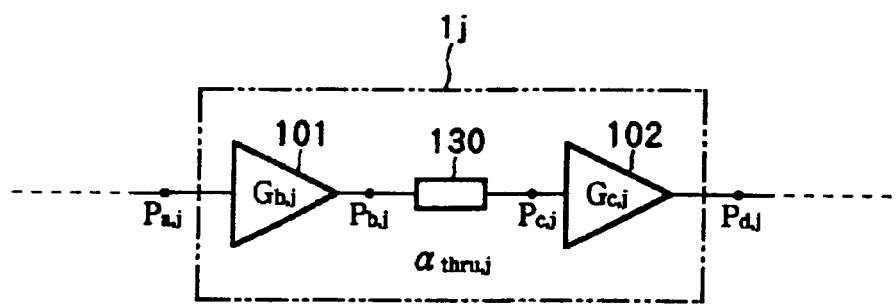
FIGS. 21A to 21B are views each showing the arrangement of a repeater station placed in an optical transmission path.
Figure 21B:
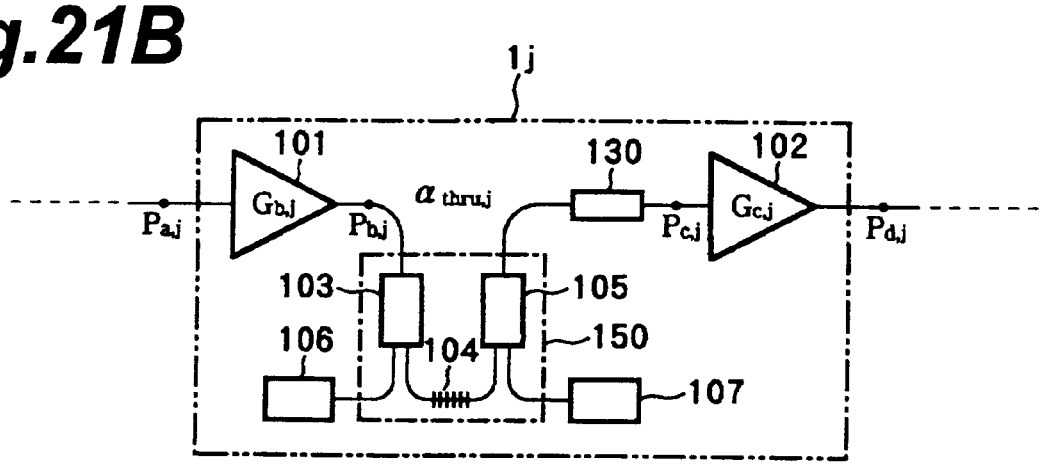

The second embodiment of the optical transmission system to which the optical transmission monitoring apparatus according to the present invention is applied will be described next. FIG. 20A is a view showing the arrangement of the optical transmission system to which the optical transmission monitoring apparatus according to the present invention is applied. FIGS. 20B to 20D are views showing optical spectra at portions W19 to W21 in FIG. 20A. Each of FIGS. 21A and 21B shows the arrangement of each repeater station in FIG. 20A.

In the optical transmission system shown in FIG. 20A, a transmitter 10 and repeater stations $1_j$ are cascaded to each other through optical fiber transmission paths $40j$, and each repeater station $1_j$ includes at least an optical amplifier (j=0, 1, 2, ...). The transmitter 10 and a repeater station $1_0$ are connected to each other through an optical fiber transmission path $40_0$. A repeater station $1_{j-1}$ and the repeater station $1_j$ are connected to each other through the optical fiber transmission path $40_j$ (j=0, 1, 2, 3, ...). Let $\alpha_j$ be the transmission loss in each optical fiber transmission path $40_j$, $G_{t,j}$ be the optical amplification factor of each repeater station $1_j$, $Pa,_j$ be the optical power of input light to the input terminal of each repeater station $1_j$, and $P_{d,j}$ be the optical power of output light from the output terminal of each repeater station $1_j$. Without consideration of ASE, these parameters have the relations represented by equations (1) and (2) given below:

$$\alpha_j = P_{a,j}/P_{d,j-1} \tag{1}$$

$$G_{t,j} = P_{d,j}/P_{a,j} \tag{2}$$

In practice, however, ASE is outputted from each repeater station (see FIG. 20B). This ASE is optically amplified by the repeater station on the following stage, and new ASE produced in this repeater station is added to the amplified ASE (see FIG. 20B). The resultant ASE is further optically amplified by the repeater station on the following stage, and new ASE produced in this repeater station is added to the amplified ASE (see FIG. 20D). In consideration of the production of such ASE, the relation represented by equation (3) below is established among the above parameters instead of the one represented by equation (2):

$$P_{d,j} = G_{t,j} \cdot (K + P_{a,j}) \tag{3}$$

where K is a value that is proportional to the optical amplification bandwidth and noise index of the optical amplifier in each repeater station and dependent on the optical power of input light.

FIG. 21A shows a case wherein an optical amplifier 101, optical transmission monitoring apparatus 130, and optical amplifier 102 are cascaded to each other to constitute the repeater station $1_j$. Let $P_{b,j}$ be the optical power at the output terminal of the optical amplifier 101 on the preceding stage, and $P_{c,j}$ be the optical power at the input terminal of the optical amplifier 102 on the following stage. In addition, let $\alpha_{thru,j}$ be the transmission loss in the transmission path from the output terminal of the optical amplifier 101 on the preceding stage to the input terminal of the optical amplifier 102 on the following stage, $G_{b,j}$ be the optical amplification factor of the optical amplifier 101 on the preceding stage, and $G_{c,j}$ be the optical amplification factor of the optical amplifier 102 on the following stage. In this case, the optical amplification factor $G_{t,j}$ of each repeater station $1_j$ is given by equation (4) below:

$$G_{t,j} = G_{b,j} \cdot \alpha_{thru,j} \cdot G_{t,j} \tag{4}$$

FIG. 21B shows a case wherein the optical amplifier 101, an optical ADM 150, the optical transmission monitoring apparatus 130, and the optical amplifier 102 are cascaded to each other to constitute the repeater station $1_j$. In this case, the optical ADM 150 includes photocouplers 103 and 105 and optical fiber grating 104. The repeater station $1_j$ includes a receiver 106 and transmitter 107 connected to the optical ADM 150. Let $P_{b,j}$ be the optical power at the output terminal of the optical amplifier 101 on the preceding stage, and $P_{c,j}$ be the optical power at the input terminal of the optical amplifier 102 on the following stage. In addition, let $\alpha_{thru,j}$ be the transmission loss in the transmission path extending from the output terminal of the optical amplifier 101 on the preceding stage to the input terminal of the optical amplifier 102 on the following stage, sequentially passing through the photocoupler 103, optical fiber grating 104, and photocoupler 105, $G_{b,j}$ be the optical amplification factor of the optical amplifier 101 on the preceding stage, and $G_{c,j}$ be the optical amplification factor of the optical amplifier 102 on the following stage. In this case as well, the optical amplification factor $G_{t,j}$ of each repeater station $1_j$ is represented by equation (4) above.

In each of the repeater stations shown in FIGS. 21A and 21B, the optical transmission monitoring apparatus 130 detects optical powers in the first and second wavelength bands which are different-wavelength bands in the signal wavelength band, compares a change in optical power in the first wavelength band with that in the second wavelength band, and monitors the optical transmission state on the upstream side on the basis of the comparison result. When the optical ADM 150 is provided in the repeater station $1_j$ as shown in FIG. 21B, one of the first and second wavelength bands is preferably a wavelength band including light signals to be dropped or added by the optical ADM 150.

In each of the repeater stations shown in FIGS. 21A and 21B, the optical transmission monitoring apparatus 130 detects variations in the transmission loss $\alpha_j$ in the optical fiber transmission path $40_j$ and variations in the number of light signals propagating through the optical fiber transmission path $40_j$. All the optical powers of WDM signals transmitted by this optical transmission system are kept equal to each other at the output terminals of the respective repeater stations $1_j$ by setting the reciprocal of the transmission loss $\alpha_j$ in the preceding optical fiber transmission path $40_j$ as the optical amplification factor $G_{t,j}$ of each repeater station $1_j$. The target optical power of output light from each repeater station $1_j$ is set by adding the optical power of ASE produced in each repeater station $1_j$ to the product of the optical power $P_{a,j}$ of input light and the optical amplification factor $G_{t,j}$.

The detailed arrangements and operations of the optical transmission system according to the second embodiment will be described next with reference to FIGS. 22 and 23A to 23H (first), FIGS. 24 and 25A to 25H (second), and FIGS. 26 and 27A to 27H (third).

Figure 22:
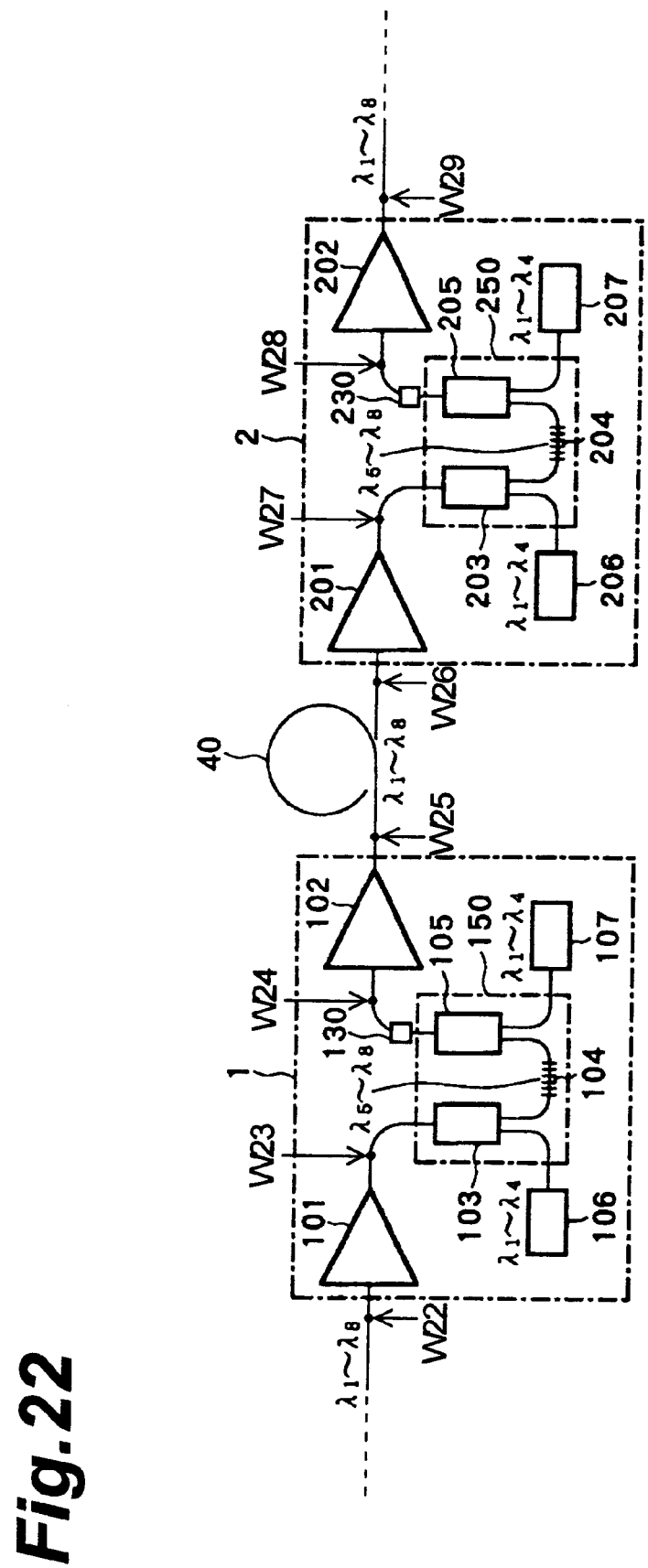
FIG. 22 is a view showing the detailed arrangement (first) of the optical transmission system (second embodiment) in FIG. 20A.
Figure 23A:
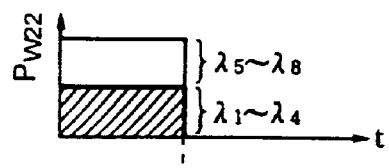
FIGS. 23A to 23H are graphs showing changes in optical power over time at portions W22 to W29 in FIG. 22.
Figure 23B:
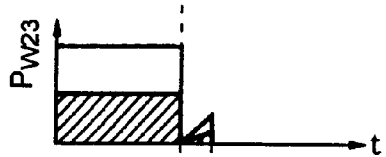
Figure 23C:
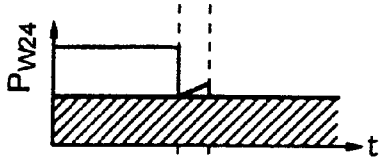
Figure 23D:
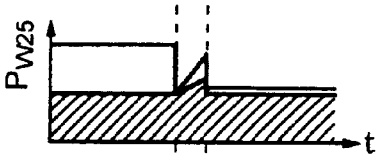
Figure 23E:
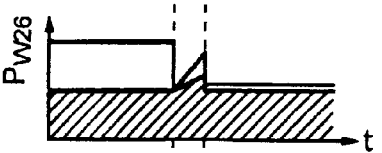
Figure 23F:
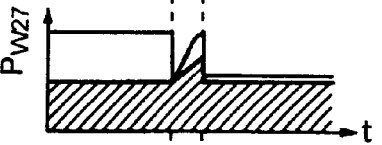
Figure 23G:
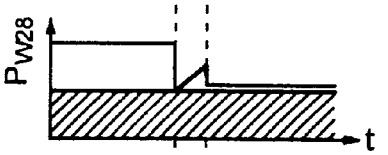
Figure 23H:
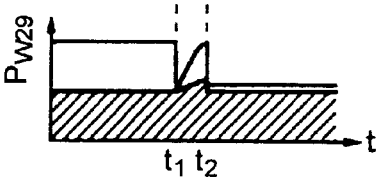
Figure 24:
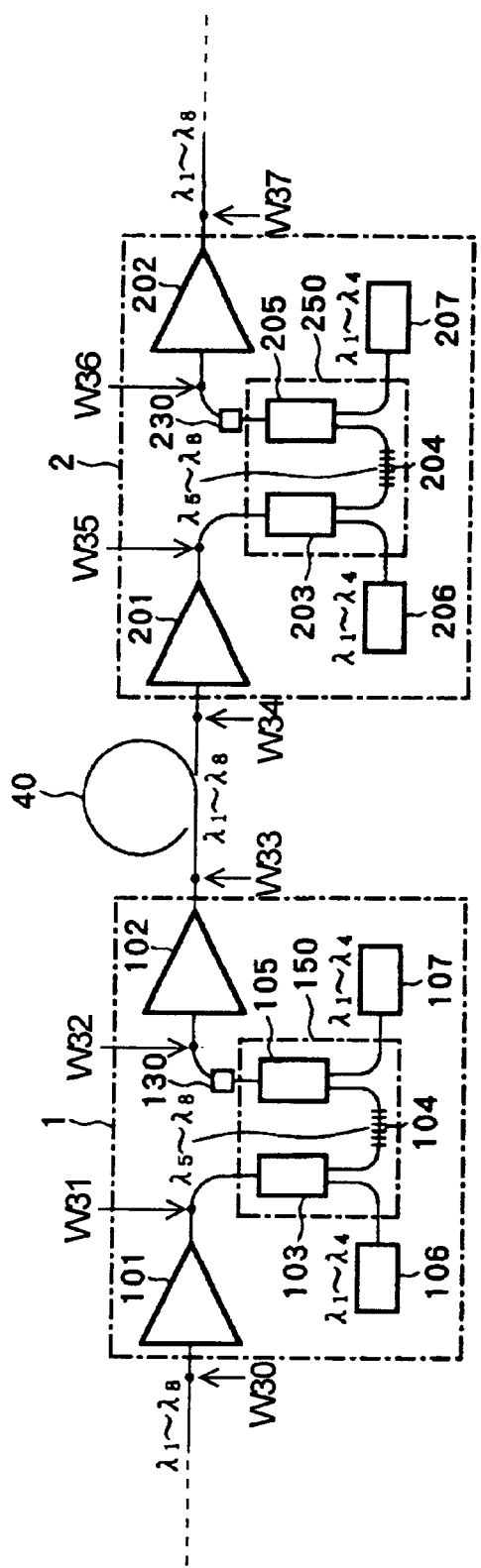
FIG. 24 is a view showing the detailed arrangement (second) of the optical transmission system (second embodiment) in FIG. 20A.
Figure 25A:
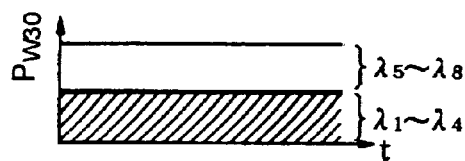
FIGS. 25A to 25H are graphs showing changes in optical power over time at portions W30 to W37 in FIG. 24.
Figure 25B:
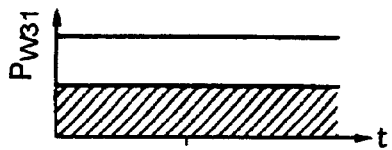
Figure 25C:
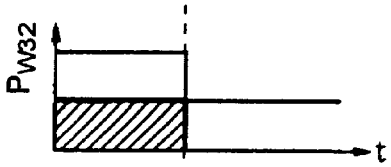
Figure 25D:
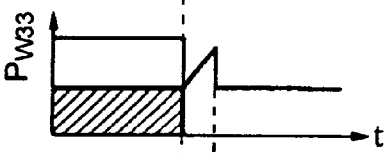
Figure 25E:
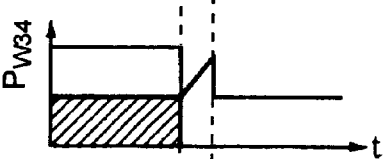
Figure 25F:
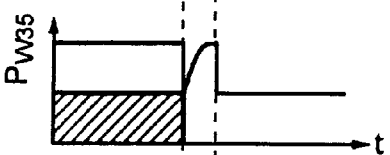
Figure 25G:
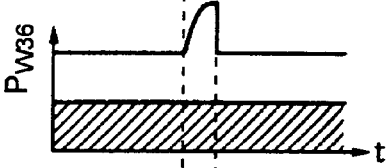
Figure 25H:
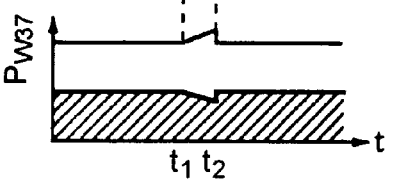

Each of FIGS. 22 and 24 shows an optical transmission system in which repeater stations 1 and 2, each having the arrangement shown in FIG. 21B, are connected to each other through an optical fiber transmission path 40. FIGS. 23A to 23H respectively show changes in the following optical powers over time in the arrangement in FIG. 22: optical power $P_{w22}$ at a point W22 near the input terminal of the repeater station 1 on the preceding stage, optical power $P_{w23}$ at a point W23 near the output terminal of the optical amplifier 101 on the preceding stage in the repeater station 1 on the preceding stage, optical power $P_{w24}$ at a point W24 near the input terminal of the optical amplifier 102 on the following stage in the repeater station 1 on the preceding stage, optical power $P_{w25}$ at a point W25 near the output terminal of the repeater station 1 on the preceding stage, optical power $P_{w26}$ at a point W26 near the input terminal of the repeater station 2 on the following stage, optical power $P_{w27}$ at a point W27 near the output terminal of an optical amplifier 201 on the preceding stage in the repeater station 2 on the following stage, optical power $P_{w28}$ at a point W28 near the input terminal of an optical amplifier 202 on the following stage in the repeater station 2 on the following stage, and optical power $P_{w29}$ at a point W29 near the output terminal of the repeater station 2 on the following stage. Likewise, FIGS. 25A to 25H respectively show changes in optical powers $P_{w30}$ to $P_{w37}$ over time at points W30 to W37 in FIG. 24.

Referring to FIGS. 23A to 23H and 25A to 25H showing changes in optical powers over time, each hatched portion represents the optical power in the region defined by four light signals ($\lambda 1$ to $\lambda 4$) to be dropped or added by each of optical ADMs 150 and 250 in the respective repeater stations. In the optical transmission system shown in FIG. 22, optical transmission monitoring apparatuses 130 and 230 are respectively provided at the point W24 in the repeater station 1 on the preceding stage and the point W28 in the repeater station 2 on the following stage. In the optical transmission system shown in FIG. 24, the optical transmission monitoring apparatuses 130 and 230 are respectively provided at the point W32 in the repeater station 1 on the preceding stage and the point W36 in the repeater station 2 on the following stage.

The optical transmission system shown in FIG. 22 will be described below, assuming that the optical power of eight light signals ($\lambda 1$ to $\lambda 8$) to be input to the repeater station 1 on the preceding stage abruptly decreases at time t1 owing to an increase in transmission loss in the upstream optical fiber transmission path or the like. In this case, the optical power $P_{w22}$ at the point W22 in the repeater station 1 on the preceding stage decreases after time t1. The optical power $P_{w23}$ at the point W23 is the value obtained by multiplying the optical power $P_{w22}$ at the point W22 by the gain of the optical amplifier 101, and decreases at time t1, but is gradually increased by the optical amplifier 101 subjected to automatic level control (ALC) after time t1.

Of the optical power $P_{w24}$ at the point W24, the optical power in the band in which the four light signals ($\lambda 1$ to $\lambda 4$) belong remains almost constant because the light signals are cut off by the optical fiber grating 104, but the light signals newly outputted from the transmitter 107 are added. In contrast to this, the optical power in the band in which the four light signals ($\lambda 5$ to $\lambda 8$) belong decreases at time t1 and gradually increases after time t1. The optical power $P_{w25}$ at the point W25 is the value obtained by multiplying the optical power $P_{w24}$ at the point W24 by the gain of the optical amplifier 102, and is gradually increased by the optical amplifier 102 subjected to automatic level control after time t1.

When the optical transmission monitoring apparatus 130 provided at the point W24 in the repeater station 1 on the preceding stage detects a decrease in the optical power of the eight light signals ($\lambda 1$ to $\lambda 8$) at time t1, the gains of the optical amplifiers 101 and 102 are controlled by the optical transmission monitoring apparatus 130. The output light from the optical amplifier 101 becomes almost zero after time t2 (>t1) at which the gains are controlled. As a consequence, the respective optical powers of the four light signals ($\lambda 1$ to $\lambda 4$) outputted from the optical amplifier 102 are maintained almost equal to those at time t1.

The optical power $P_{w26}$ at the point W26 in the repeater station 2 on the following stage is the value obtained by multiplying the optical power $P_{w25}$ at the point W25 by the transmission loss in the optical fiber transmission path 40. The optical power $P_{w27}$ at the point W27 is the value obtained by multiplying the optical power $P_{w26}$ at the point W26 by the gain of the optical amplifier 201, and decreases at time t1 but is gradually increased by the optical amplifier 201 subjected to automatic level control after time t1.

Of the optical power $P_{w28}$ at the point W28, the optical power in the band in which the four light signals ($\lambda 1$ to $\lambda 4$) belong remains almost constant because the light signals are cut off by the optical fiber grating 204, but the light signals newly outputted from the transmitter 207 are added. In contrast to this, the optical power in the band in which the four light signals ($\lambda 5$ to $\lambda 8$) belong decreases at time t1 and gradually increases after time t1. The optical power $P_{w29}$ at the point W29 is the value obtained by multiplying the optical power $P_{w28}$ at the point W28 by the gain of the optical amplifier 202, and is gradually increased by the optical amplifier 202 subjected to automatic level control after time t1.

When the optical transmission monitoring apparatus 230 provided at the point W28 in the repeater station 2 on the following stage detects a decrease in the number of light signals at time t1, the gains of the optical amplifiers 201 and 202 are controlled. With this operation, after time t2 (>t1) at which the gains are controlled, the optical powers of the four light signals ($\lambda 1$ to $\lambda 4$) outputted from the optical amplifiers 201 and 202 are maintained almost equal to those before time t1.

The optical transmission system shown in FIG. 24 will be described below, assuming that all the four light signals $\lambda 1$ to $\lambda 4$) to be added by the optical ADM 150 in the repeater station 1 on the preceding stage are not input at time t1 due to a failure or the like in the transmitter 107. In this case, the optical powers $P_{w30}$ and $P_{w31}$ at the points W30 and W31 in the repeater station 1 on the preceding stage remain almost constant before and after time t1.

Of the optical power $P_{w32}$ at the point W32, the optical power in the band in which the four light signals ($\lambda 1$ to $\lambda 4$) belong becomes almost zero because the light signals are cut off by the optical fiber grating 104 and no light signals outputted from the transmitter 107 are newly added after time t1. In contrast to this, the optical power in the band in which the four light signals ($\lambda 5$ to $\lambda 8$) belong remains almost constant before and after time t1. The optical power $P_{w33}$ at the point W33 is the value obtained by multiplying the optical power $P_{w32}$ at the point W32 by the gain of the optical amplifier 102, and decreases with a decrease in the number of light signals at time t1, but is gradually increased by the optical amplifier 102 subjected to automatic level control after time t1.

When the optical transmission monitoring apparatus 130 provided at the point W32 in the repeater station 1 on the preceding stage detects a change in the number of light signals at time t1, the gains of the optical amplifiers 101 and 102 are controlled by the optical transmission monitoring apparatus 130. With this operation, after time t2 (>t1) at which the gains are controlled, the intensities of the four light signals having the wavelengths $\lambda 5$ to $\lambda 8$ outputted from the optical amplifier 202 are maintained almost equal to the values before time t1.

The optical power $P_{w34}$ at the point W34 in the repeater station 2 on the following stage is the value obtained by multiplying the optical power $P_{w33}$ at the point W33 by the transmission loss in the optical fiber transmission path 40. The optical power $P_{w35}$ at the point W35 is the value obtained by multiplying the optical power $P_{w34}$ at the point W34 by the gain of the optical amplifier 201, and temporarily decreases with a decrease in the number of light signals at time t1, but is gradually increased by the optical amplifier 201 subjected to automatic level control after time t1.

Of the optical power $P_{w36}$ at the point W36, the optical power in the band in which the four light signals ($\lambda 1$ to $\lambda 4$) belong remains almost constant because the light signals are cut off by an optical fiber grating 204 but light signals newly outputted from a transmitter 207 are added. In contrast to this, the optical power in the band in which the four light signals ($\lambda 5$ to $\lambda 8$) belong gradually increases after time t1. The optical power $P_{w37}$ at the point W37 is the value obtained by multiplying the optical power $P_{w36}$ at the point W36 by the gain of the optical amplifier 202. The optical powers of the four light signals ($\lambda 1$ to $\lambda 4$) are gradually decreased and the optical powers of the remaining light signals ($\lambda 5$ to $\lambda 8$) are gradually increased by the optical amplifier 202 subjected to automatic level control after time t1.

When the optical transmission monitoring apparatus 230 provided at the point W36 in the repeater station 2 on the following stage detects that the optical powers of the four light signals ($\lambda 1$ to $\lambda 4$) have not varied but the optical powers of the remaining light signals ($\lambda 5$ to $\lambda 8$) have increased at time t1, the gains of the optical amplifiers 201 and 202 are controlled. With this operation, after time t2 (>t1) at which the gains are controlled, the optical powers of the eight light signals ($\lambda 1$ to $\lambda 8$) outputted from the optical amplifiers 201 and 202 are maintained almost equal to the values before time t1.

Figure 26:
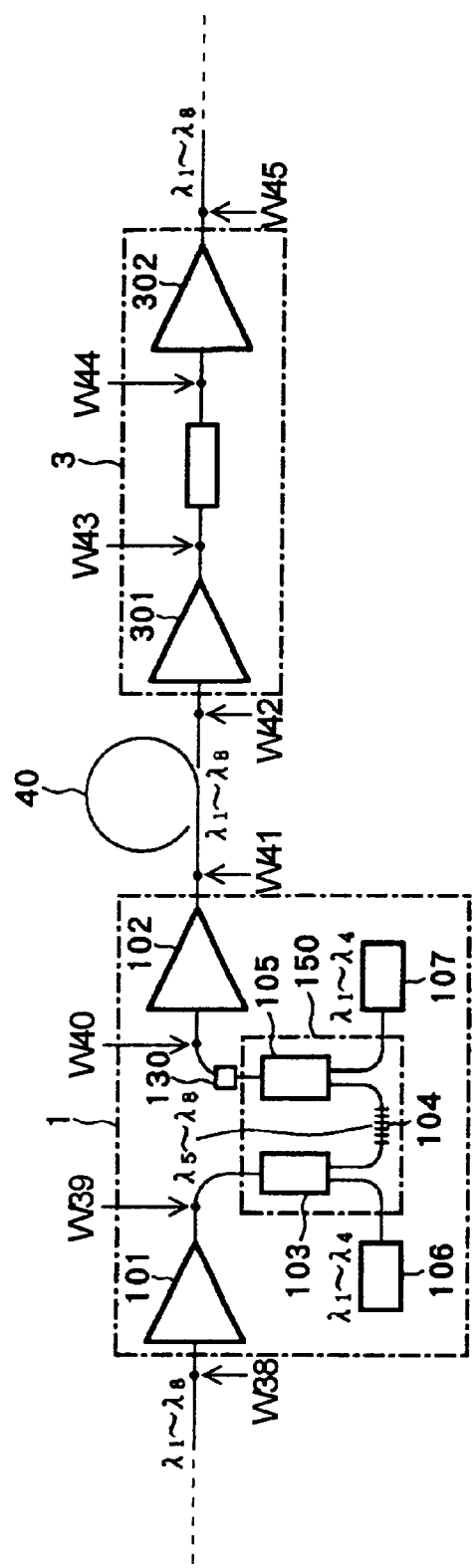
FIG. 26 is a view showing the detailed arrangement (third) of the optical transmission system (second embodiment) in FIG. 20A.
Figure 27A:
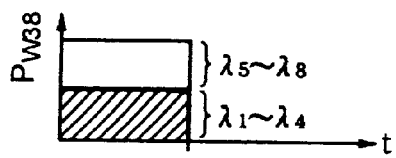
FIGS. 27A to 27H are graphs showing changes in optical power over time at portions W38 to W45 in FIG. 26.
Figure 27B:
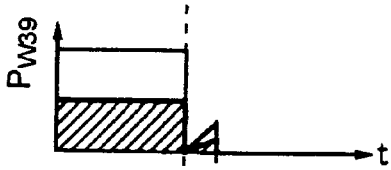
Figure 27C:
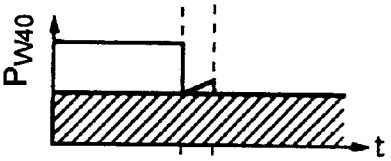
Figure 27D:
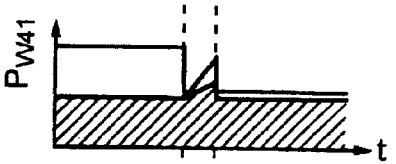
Figure 27E:
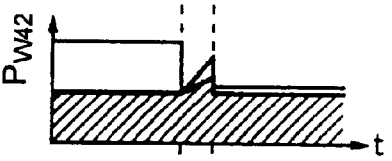
Figure 27F:
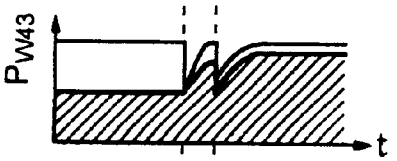
Figure 27G:
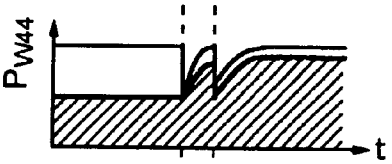
Figure 27H:
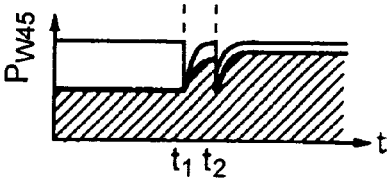

FIG. 26 shows an optical transmission system in which the repeater station 1 having the arrangement shown in FIG. 21B and a repeater station 3 having another arrangement are connected to each other through the optical fiber transmission path 40. FIGS. 27A to 27H are graphs respectively showing changes in the following optical powers over time in the arrangement shown in FIG. 26: optical power $P_{w38}$ at a point W38 near the input terminal of the repeater station 1 on the preceding stage, optical power $P_{w39}$ at a point W39 near the output terminal of the optical amplifier 101 on the preceding stage in the repeater station 1 on the preceding stage, optical power $P_{w40}$ at a point W40 near the input terminal of the optical amplifier 102 on the following stage in the repeater station 1 on the preceding stage, optical power $P_{w41}$ at a point W41 near the output terminal of the repeater station 1 on the preceding stage, optical power $P_{w42}$ at a point W42 near the input terminal of the repeater station on the following stage, optical power $P_{w43}$ at a point W43 near the output terminal of an optical amplifier 301 on the preceding stage in the repeater station 3 on the following stage, optical power $P_{w43}$ at a point W43 near the output terminal of an optical amplifier 301 on the preceding stage in the repeater station 3 on the following stage, optical power $P_{w44}$ at a point W44 near the input terminal of an optical amplifier 302 on the following stage in the repeater station 3 on the following stage, and optical power $P_{w45}$ at a point W45 near the output terminal of the repeater station 3 on the following stage. Referring to these drawings showing changes in optical powers over time, each hatched portion represents the optical power in the region defined by four light signals (λ1 to λ4) to be dropped or added by the optical ADM 150 in the repeater station 1. The optical transmission monitoring apparatus 130 is provided at the point W40 in the repeater station 1 on the preceding stage.

The function of the repeater station 1 on the preceding stage in the optical transmission system in FIG. 26 is the same as that of the repeater station 1 on the preceding stage in the optical transmission system shown in FIG. 22.

The optical power $P_{w42}$ at the point W42 in the repeater station 3 on the following stage is the value obtained by multiplying the optical power $P_{w41}$ at the point W41 by the transmission loss in the optical fiber transmission path 40. The optical power $P_{w43}$ at the point W43 is the value obtained by multiplying the optical power $P_{w42}$ at the point W42 by the gain of the optical amplifier 301, and decreases at time t1 but is gradually increased by the optical amplifier 301 subjected to automatic level control after time t1.

The optical power $P_{w44}$ at the point W44 is the value obtained by multiplying the optical power $P_{w43}$ at the point W43 by the transmission loss between the optical amplifiers 301 and 302. The optical power $P_{w45}$ at the point W45 is the value obtained by multiplying the optical power $P_{w44}$ at the point W44 by the gain of the optical amplifier 302, and temporarily decreases at time t1 but is gradually increased toward a predetermined value by the optical amplifier 302 subjected to automatic level control after time t1. This power decreases at time t2 again, and is gradually increased toward the predetermined value by the optical amplifier 302 subjected to automatic level control after time t2.

As described above, if no optical transmission monitoring apparatus is provided for a repeater station, the total optical power of light outputted from the repeater station is maintained constant, but the optical powers of light signals having the respective wavelengths outputted from the repeater station are not maintained constant. However, the optical transmission monitoring apparatus provided for each repeater station is used to monitor the transmission state by comparing changes in optical power in the first and second wavelength bands which are different wavelength bands in the monitor wavelength band (coinciding with the signal wavelength band in this embodiment) and to discriminate variations in the number of light signals and variations in transmission loss on the basis of the monitoring result. As described above, the optical transmission monitoring apparatus according to the present invention keeps the optical powers of light signals having the respective wavelengths, outputted from each repeater station, constant by properly controlling the gains of the optical amplifiers in each repeater station in accordance with variations in the number of light signals or variations in transmission loss.

Fourth Embodiment of Optical Transmission Monitoring Apparatus

In the optical transmission monitoring apparatus according to each embodiment described above, a change in the number of light signals can be monitored by using light signals as monitoring light signals on condition that this group of monitoring light signals undergoes an increase/decrease in the number of light signals in either the first wavelength band or second wavelength band in the monitor wavelength band. When, however, the light signals in the first and second wavelength bands in the monitor wavelength band increase/decrease by the same number, since the optical powers in both the wavelength bands vary in the same manner, loss variations in the optical transmission path are erroneously detected. An optical transmission monitoring apparatus according to the fourth embodiment has a structure for solving the above problem. That is, this optical transmission monitoring apparatus monitors the optical transmission state on the upstream side by using not only light in the signal wavelength band but also light in another wavelength band.

The optical transmission monitoring apparatus according to the fourth embodiment uses light signals in a wavelength band different from that of light signals as some of monitoring light signals. This makes it possible to eliminate limitations imposed on wavelength selection of light signals to be added/dropped on the upstream side, which are caused by division of light signals used for the above monitoring operation. Unlike the prior art in which a transmission loss or the like is monitored on the basis of only variations in the levels of monitoring light signals prepared independently of light signals, even if level variations occur in the light source itself, which supplies monitoring light signals, level variations due to loss variations in the transmission path can be discriminated from level variations due to the light source without separately preparing a means for transferring information indicating the presence/absence of such variations. In addition, according to the fourth embodiment, even if transmission in the signal wavelength band (transmission of light signals) is interrupted, since variations in the levels of monitoring light signals separately prepared can be regarded as level variations in the optical transmission path, the transmission state can be kept monitored in this state.

Figure 28A:
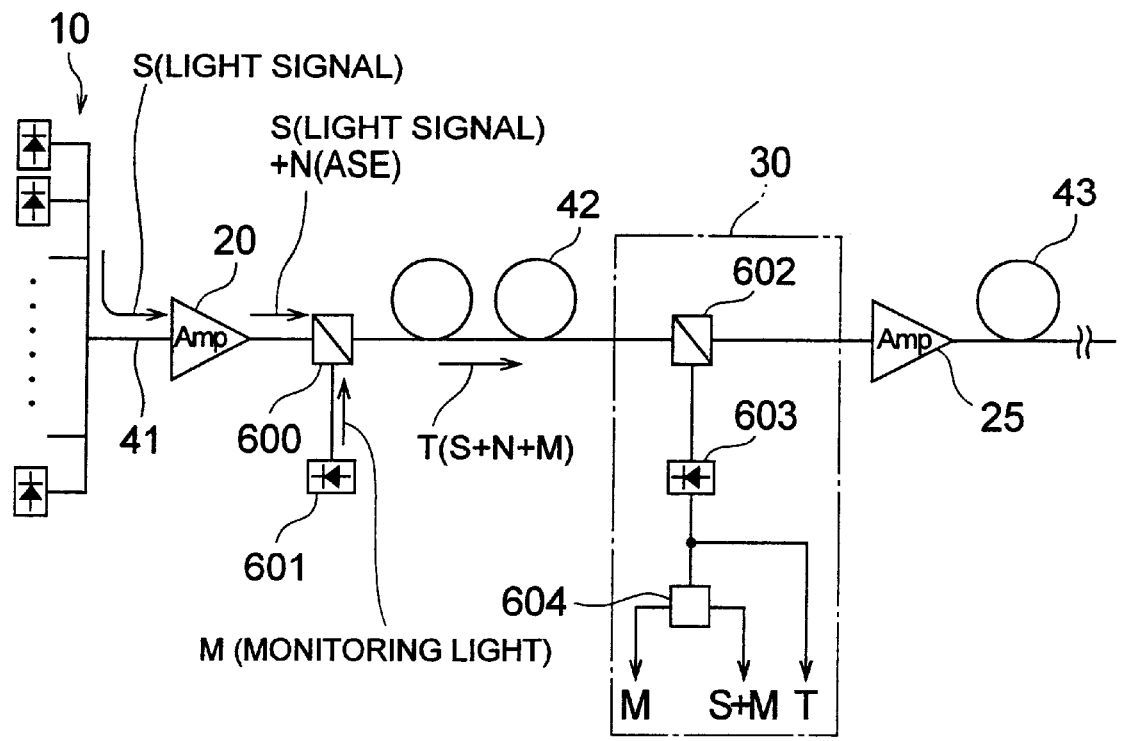
FIG. 28A is a view showing the arrangement of an optical transmission system to which the fourth embodiment of an optical transmission monitoring apparatus according to the present invention is applied.

FIG. 28A is a view showing the arrangement of an optical transmission system to which the optical transmission monitoring apparatus according to the fourth embodiment is applied. In this optical transmission system, light signals S having different wavelengths and outputted from a transmitter 10 reach an optical amplifier 20 through an optical fiber transmission path 41. The optical amplifier 20 optically amplifies the input light signals S altogether. The amplified light in the signal wavelength band (containing noise N such as ASE as well as the light signals S as described in each embodiment) propagates through an optical fiber transmission path 42 and reaches an optical transmission monitoring apparatus 30. Note that a light source 601 and multiplexer 400 are arranged in the optical transmission path between the optical amplifier 20 and optical transmission monitoring apparatus 30. The light source 601 supplies new monitoring light M (to be referred to as M light hereinafter) in a wavelength band different from the signal wavelength band used as part of monitoring light to the optical transmission monitoring apparatus 30 through the optical fiber transmission path 42. The multiplexer 400 multiplexes the M light and light (to be referred to as (S+N) light hereinafter) in the signal wavelength band. An optical amplifier 25 whose gain is controlled by the optical transmission monitoring apparatus 30 is disposed downstream of the optical transmission monitoring apparatus 30. The amplified light outputted from the optical amplifier 25 is sent to an optical fiber transmission path 43.

Unlike the optical transmission monitoring apparatus of each embodiment described above, the optical transmission monitoring apparatus 30 according to the fourth embodiment has an arrangement for monitoring the optical transmission state on the upstream side while detecting variations in the optical powers of at least three types of light (containing different light signals) in the monitor wavelength band.

Figure 28B:
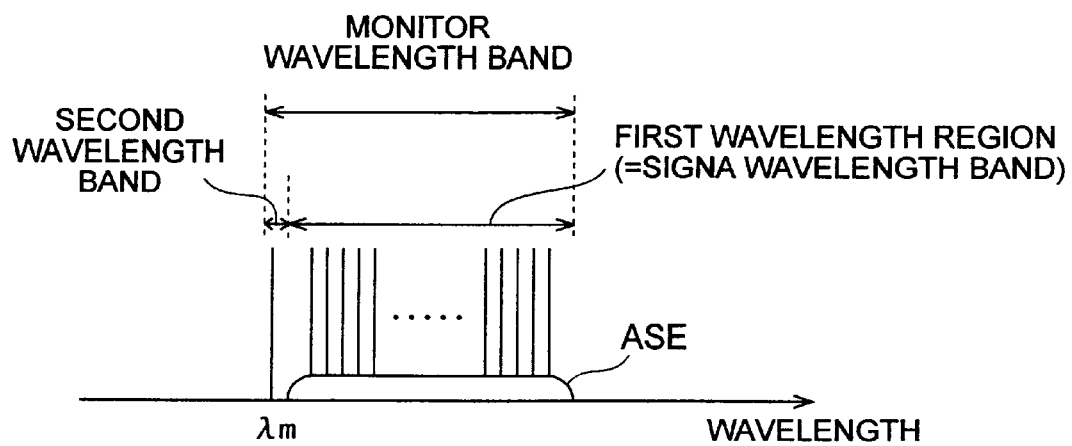
FIG. 28B is a view for explaining the relationship between a monitor wavelength band and signal wavelength band and the relationship between the first and second wavelength bands in the monitor wavelength band.

In the fourth embodiment, as shown in FIG. 28B, light in the signal wavelength band is used as light in the first wavelength band of the monitor wavelength band, and light propagating through an optical transmission path (light supplied from the light source 601) independently of light signals is used as light in the second wavelength band. The optical transmission monitoring apparatus 30 further includes a third detector for detecting the optical power of light containing at least ASE in the first wavelength band. With this arrangement, this optical transmission monitoring apparatus detects the optical power of first light (which may contain ASE in the first wavelength band) containing at least monitoring light signals (light signals) in the first wavelength band by using the first detector, detects the optical power of second light containing at least monitoring light signals in the second wavelength band by using the second detector, and detects the optical power of third light containing at least ASE in the first wavelength band by using the third detector. The monitoring section compares the variation amount of the optical power of the first light per unit time, obtained by the first detector, the variation amount of the optical power of the second light per unit time, obtained by the second detector, and the variation amount of the optical power of the third light per unit time, obtained by the third detector, and identifies the cause of the optical power variations in the optical transmission path on the basis of the comparison result.

Figure 29A:
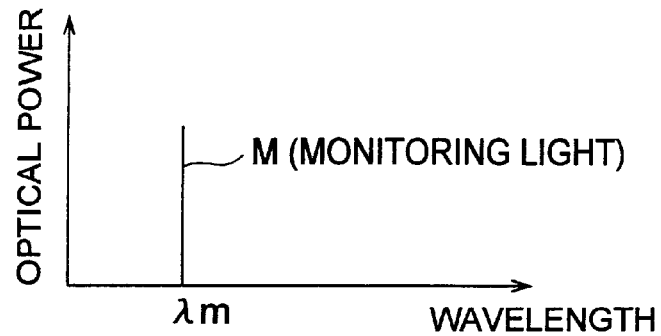
FIGS. 29A to 29C are views showing the optical spectra of light signals detected by the optical transmission monitoring apparatus shown in FIG. 28A.
Figure 29B:
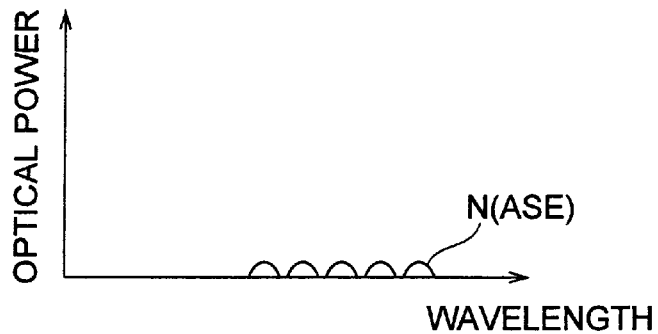
Figure 29C:
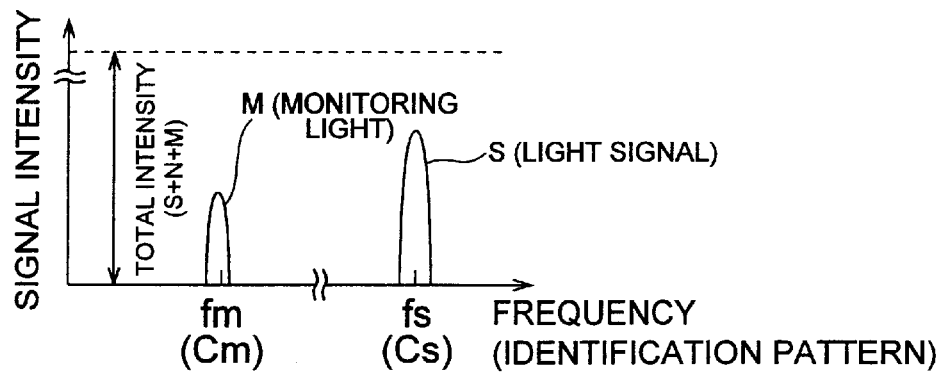

More specifically, in the optical transmission monitoring apparatus 30 according to the fourth embodiment, part of light separated by an optical branching element 602 from light (containing the light signals S, newly supplied monitoring light M, and noise N such as ASE produced in the optical amplifier 20) propagating through the optical fiber transmission-path 42 is used to monitor the transmission state. The separated partial light (containing the light signals S, noise N, and monitoring light M; to be referred to as (S+N+M) light or T light hereinafter) is converted into an electrical signal by a photoelectric conversion element 603. Part of this light is further separated by a separator 604 into the monitoring light M (to be referred to as M light hereinafter) and the light signals S (to be referred to as (S+N) light hereinafter) containing the M light. In the arrangement shown in FIG. 28A, the light separated from the optical fiber transmission path is separated into the T light (corresponding to the third light containing at least ASE in the first wavelength band), the (S+M) light (corresponding to the first light containing at least monitoring light in the first wavelength band), and the M light (corresponding to the second light containing at least monitoring light in the second wavelength band). The monitoring section monitors the optical transmission state by using information about these light signals. FIGS. 29A to 29C are views respectively showing light signals to be monitored, which are optically or electrically separated. FIG. 29A is a view showing the monitoring light (M light) in the second wavelength band which is separated from the light in the monitor wavelength band shown in FIG. 28B. FIG. 29B is a view showing the ASE (N light) separated from the light in the first wavelength band shown in FIG. 29B. FIG. 29C is a view showing the signal intensities of the T light, M light, and S light which are converted into electrical signals.

The respective light signals are separated based on frequencies and may be detected by adding unique code components (Cm, Cs) to the components in advance.

Assume that a signal wavelength band (containing the (S+N) light) is set in the first wavelength band of the monitor wavelength band, a wavelength band including the M light is set in the second wavelength band of the monitor wavelength band (see FIG. 28B), and monitoring is performed by using the two types of light, i.e., the M light in the second wavelength band and the (S+N) light in the first wavelength band. In this case, although loss variations on the transmission path can be detected, a case wherein uniform level variations of signals are caused by gain variations in the optical amplifier 20 located on the upstream side or the like cannot be discriminated from a case wherein the number of light signals in the S light has changed. In the fourth embodiment, in consideration of the fact that ASE (N light) included in the signal wavelength band does not change even with a change in the number of light signals (S light), the optical transmission state is monitored by detecting variations in the optical powers of the three types of light signals containing the N light in the signal wavelength band (the first wavelength band of the monitor wavelength band). Therefore, the first light detected by the first detector may contain at least monitoring light signals (light signals) in the first wavelength band, may be the T light described with reference to FIG. 28A, or may be the (S+N) light.

The monitoring operation of the optical transmission monitoring apparatus according to the fourth embodiment will be described next with reference to FIGS. 30A to 30D (the abscissa representing time t; and the ordinate, the signal intensity). For the sake of simplicity, the first light detected by the first detector contains only monitoring light (S light) in the first wavelength band, the second light detected by the second detector contains only monitoring light (M light) in the second wavelength band, and the third light detected by the third detector contains only ASE (N light) in the first wavelength band. Referring to each of FIGS. 30A to 30D, the solid line represents variations over time in S light signal intensity (which may be the signal intensity of the (S+N) light or T light) in the first wavelength band, which are detected by the first detector; the chain line, variations in M light signal intensity over time in the second wavelength band, which are detected by the second detector; and the dashed line, variations in N light signal intensity over time in the first wavelength band, which are detected by the third detector.

Figure 30A:
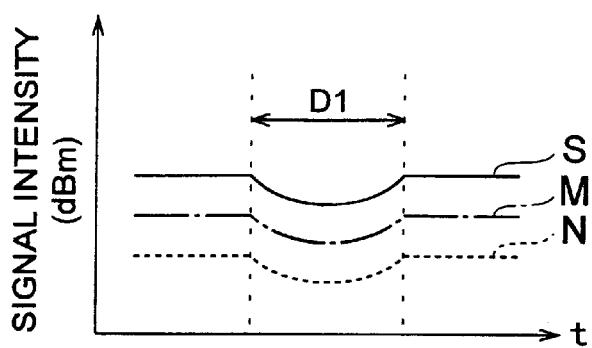
FIGS. 30A to 30D are views for explaining the monitoring operation of the optical transmission monitoring apparatus according to the fourth embodiment (FIG. 28A)
Figure 30B:
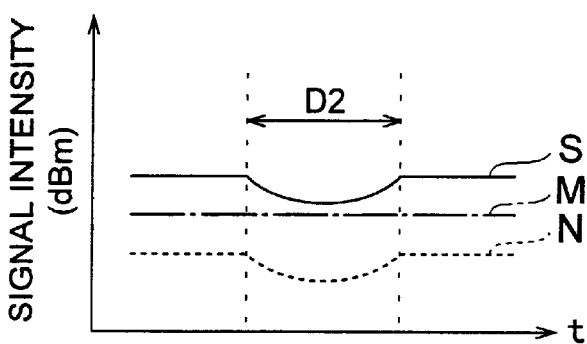

When variations in the signal intensities of all the S light, M light, and N light are detected in a time zone D1 as shown in FIG. 30A, it is determined that loss variations have occurred in the upstream optical transmission path. When variations in the signal intensities of the S light and N light are detected in a time zone D2 but no variation in the signal intensity of the M light is detected (i.e., only optical power variations are detected in the first wavelength band) as shown in FIG. 30B, it is determined that output variations have occurred in the upstream optical amplifier 20.

Figure 30C:
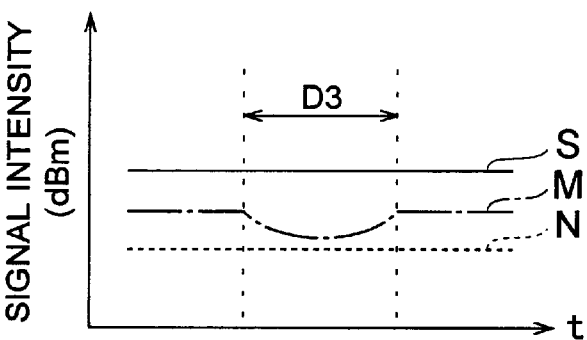
Figure 30D:
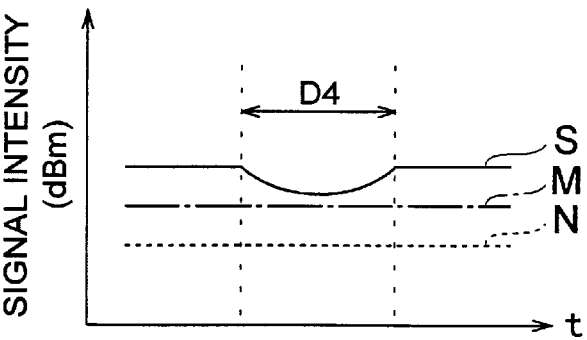

When no variations in the signal intensities of the S light and N light are detected in a time zone D3 but variations in the signal intensity of the M light are detected as shown in FIG. 30C, it is determined that wavelength-dependent loss variations have occurred in the upstream optical transmission path. In order to minimize the influences of wavelength-dependent loss variations, the wavelength of monitoring light in the second wavelength band is preferably set near the first wavelength band in which light signals serving as monitoring light signals belongs. More specifically, when light signals in the first wavelength band is light in a 1.55-μm wavelength band, monitoring light in the second wavelength band is preferably light in a 1.51-μm wavelength band, 1.48-μm wavelength band, or 1.60-μm wavelength band.

when variations in the signal intensity of the S light are detected in a time zone D4 but no variations in the signal intensities of the M light and N light are detected as shown in FIG. 30D, it is determined that the number of light signals propagating through the optical transmission path varied when the S light signal intensity varied.

Figure 31A:
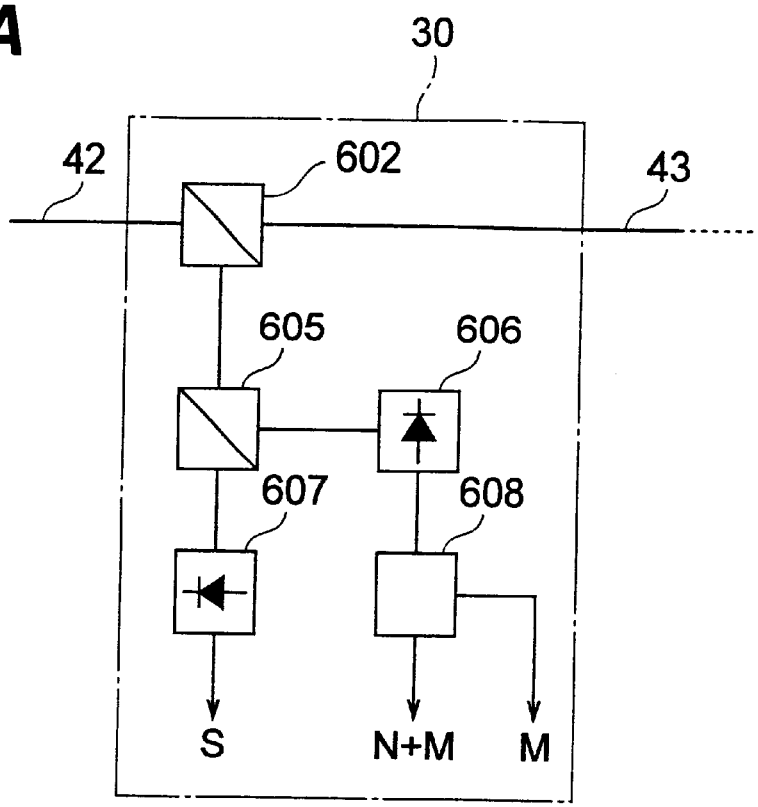
FIG. 31A is a view showing the arrangement of the first modification of the optical transmission monitoring apparatus according to the fourth embodiment.
Figure 31B:
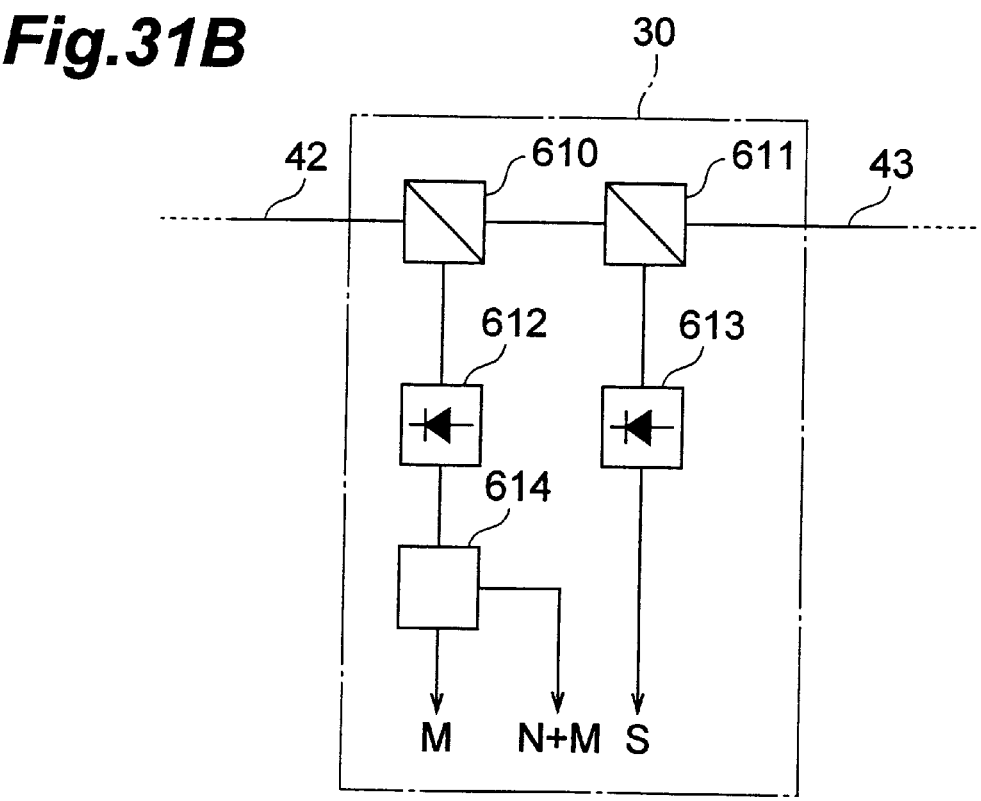
FIG. 31B is a view showing the arrangement of the second modification of the optical transmission monitoring apparatus according to the fourth embodiment.

Note that the structure of the optical transmission monitoring apparatus according to the fourth embodiment is not limited to the one shown in FIG. 28A and may be variously modified, as shown in FIGS. 31A and 31B.

FIG. 31A is a view showing the arrangement of the first modification of the optical transmission monitoring apparatus according to the fourth embodiment. In the optical transmission monitoring apparatus 30 shown in FIG. 31A, part of the light separated by the optical branching element 602 from the T light (containing the S light, M light, and N light) propagating through the optical fiber transmission path 42 is used to monitor the transmission state. The separated T light is further separated into the S light and (M+N) light by an optical branching element 605. These light signals are converted into electrical signals by photoelectric conversion elements 606 and 607. The (M+N) light is further separated into the M light and N light ((M+N) light) containing the M light by an electric separator 608. In the first modification as well, the monitoring section monitors the optical transmission state by using the first light (detected by the first detector) containing at least the S light in the first wavelength band, the second light (detected by the second detector) containing at least the M light in the second wavelength band, and the light (detected by the third detector) containing at least the N light belonging in the first wavelength band.

FIG. 31B shows the arrangement of the second modification of the optical transmission monitoring apparatus according to the fourth embodiment. In the optical transmission monitoring apparatus 30 shown in FIG. 31B, an optical branching element 610 separates the (M+N) light from the T light (containing the S light, M light, and N light) propagating through the optical fiber transmission path 42. An optical branching element 611 then separates only the S light from the T light passing through the optical branching element 610. The separated S light is converted into an electrical signal by a photoelectric conversion element 613. The separated (M+N) light is converted into an electrical signal by a photoelectric conversion element 612 and is further separated into the M light and N light ((M+N) light) containing the M light by an electric conversion element 614. The monitoring section monitors the optical transmission state by using information about the S light, (M+N) light, and M light which are optically or electrically separated.

Fifth Embodiment of Optical Transmission Monitoring Apparatus

The fifth embodiment of an optical transmission monitoring apparatus according to the present invention will be described next. The fifth embodiment uses pilot light of 1-channel in a signal wavelength band as pilot light unlike the fourth embodiment described above.

Figure 32A:
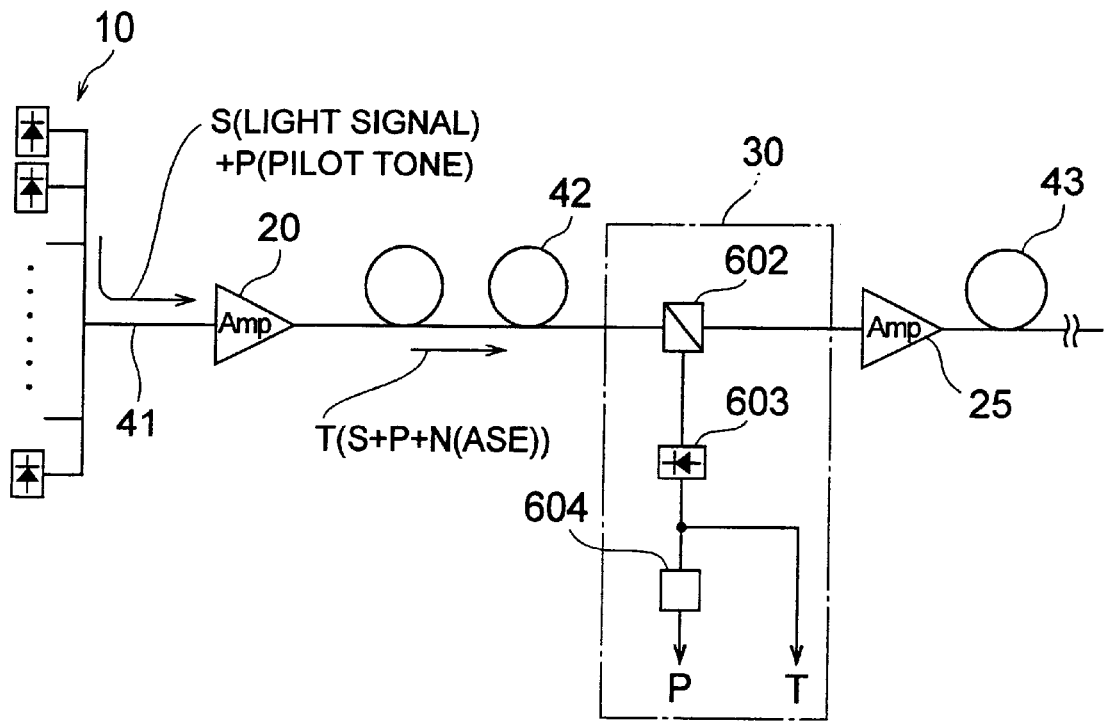
FIG. 32A is a view showing the arrangement of an optical transmission system to which the fifth embodiment of an optical transmission monitoring apparatus according to the present invention is applied.
Figure 32B:
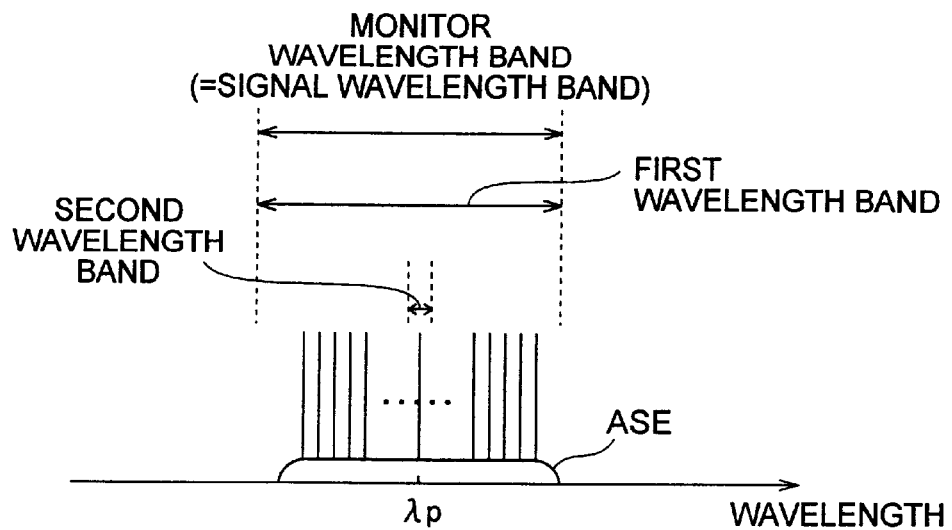
FIG. 32B is a view showing the relationship between a monitoring light wavelength and signal wavelength band and the relationship between the first and second wavelength band in the monitor wavelength band.

In the fifth embodiment, light in the signal wavelength band corresponds to light in the monitor wavelength band, and a wavelength band in which 1-channel pilot light belongs and which is included in the signal wavelength band corresponds to the second wavelength band (the monitor wavelength band is set such that the second wavelength band is included in the first wavelength band, as shown in FIGS. 4C and 32B). The above monitoring section compares the variation amount of the optical power of light signals and noise as a monitoring light signal in the first wavelength band per unit time with the variation amount of the optical power of pilot light in the second wavelength band per unit time, and identifies the cause of variations in optical power in the optical transmission path on the basis of the comparison result. In the fifth embodiment, the optical transmission monitoring apparatus preferably includes a first system for detecting an abnormality in transmission of at least a light signal of 1-channel selected from the light signals in a wavelength band of the second wavelength band which overlaps the first wavelength band, and a second system for reselecting light signals to be selected as monitoring light signals in the second wavelength band from the light signals in a wavelength band of the signal wavelength band which overlaps the first wavelength band on the basis of the detection result obtained by the first system. This is because a channel to be monitored may fail due to some reason or its use may be stopped.

FIG. 32A is a view showing the arrangement of an optical transmission system to which the optical transmission monitoring apparatus according to the fifth embodiment is applied. In this optical transmission system, a transmitter 10 outputs light signals (S light) having different wavelengths and pilot light (to be referred to as P light hereinafter). The S light and P light outputted from the transmitter 10 reach an optical amplifier 20 through an optical fiber transmission path 41. The optical amplifier 20 optically amplifies the input (S+P) light altogether. The amplified light (containing N light such as ASE as well as the (S+P) light, as described in each of the above embodiments) propagates through an optical fiber transmission path 42 and reaches an optical transmission monitoring apparatus 30. An optical amplifier 25 whose gain is controlled by the optical transmission monitoring apparatus 30 is provided downstream of the optical transmission monitoring apparatus 30. The amplified light outputted from the optical amplifier 25 is sent to an optical fiber transmission path 43.

Figure 33A:
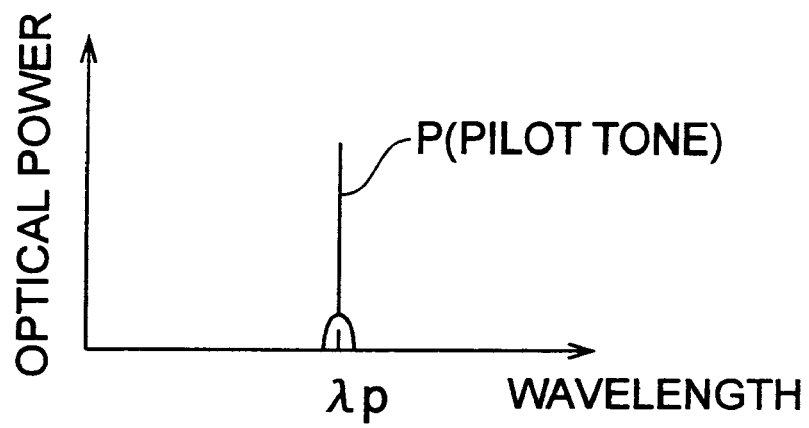
FIGS. 33A and 33B are views showing the optical spectra of light signals detected by the optical transmission monitoring apparatus according to the fifth embodiment.
Figure 33B:
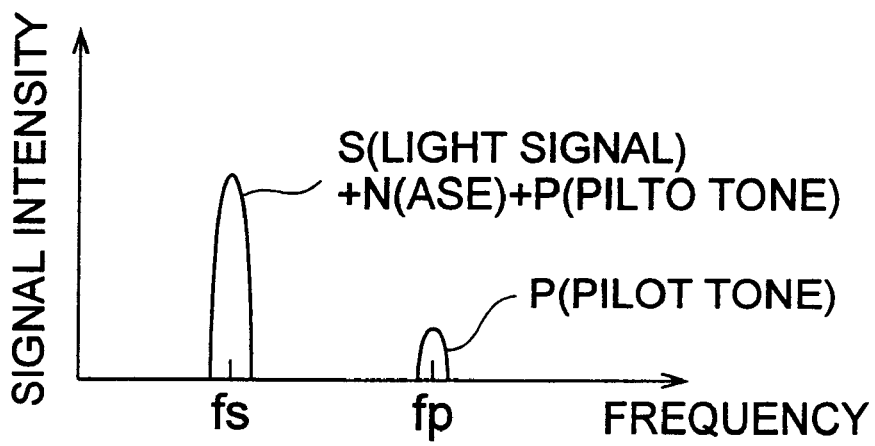

More specifically, in the optical transmission monitoring apparatus 30 according to the fifth embodiment, part of the light separated from the T light (containing the light signals S as monitoring light signals in the first wavelength band, the pilot light P as monitoring light in the second wavelength band, and the noise N such as ASE produced by the optical amplifier 20) propagating through the optical fiber transmission path 42 by an optical branching element 602 is used to monitor the transmission state. Part of the separated T light is converted into an electrical signal by a photoelectric conversion element 603. Part of this light is further separated in to the T light and P light by an electric separator 604. FIG. 33A is a view showing the spectrum of the pilot light P. This pilot light P is optically amplified by the optical amplifier 20 temporarily and hence contains ASE in the second wavelength band. In the electric separator 604, as shown in FIG. 3B, the signal intensities of the T light ((S+P+N) light) and the pilot light are detected while they are separated as pieces of information about frequencies fs and fp. In this manner, the light signal of 1-channel is arbitrarily selected from light signals, and the light signal is used as a monitoring light signal in the first wavelength band, and the selected light signal of 1-channel is used as a monitoring light signal in the second wavelength band, thereby monitoring both the light signals. This makes it possible to prevent the problem posed when division of light signals to be monitored is performed in a fixed manner (Since the monitor wavelength band is divided into the first and second wavelength bands to be monitored, limitations are imposed on drop/add operation for light signals by the upstream optical ADM or the like).

Figure 34A:
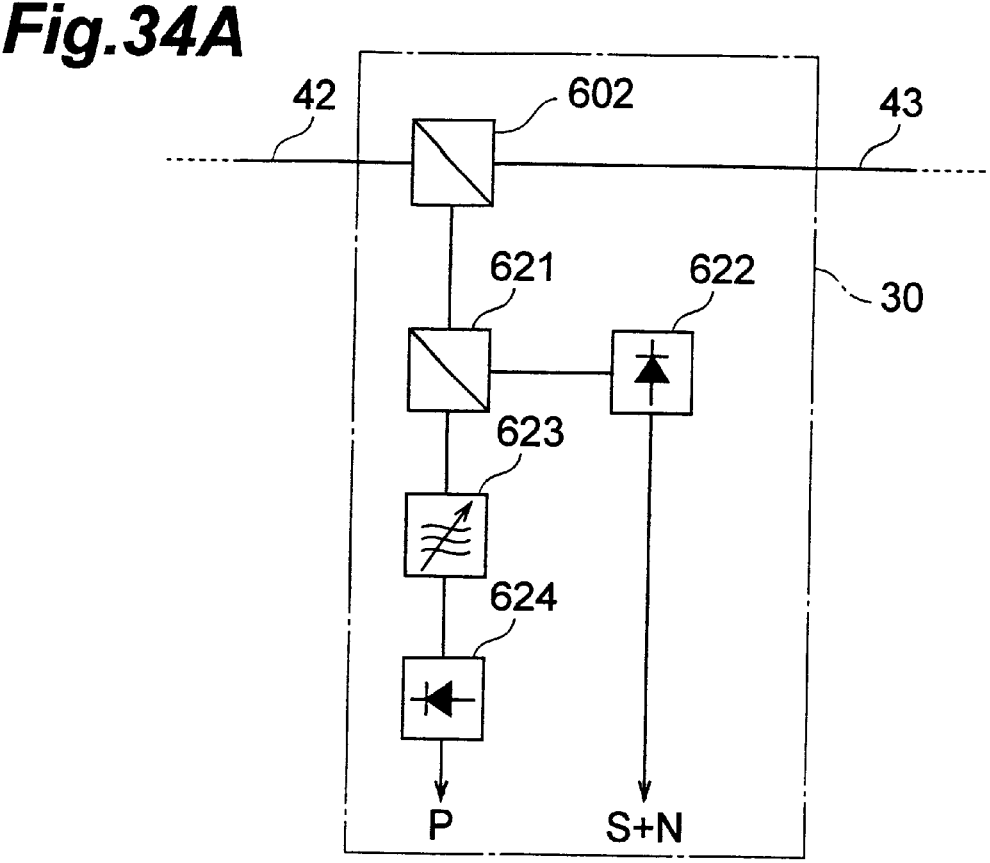
FIG. 34A is a view showing the arrangement of the first modification of the optical transmission monitoring apparatus according to the fifth;embodiment.
Figure 34B:
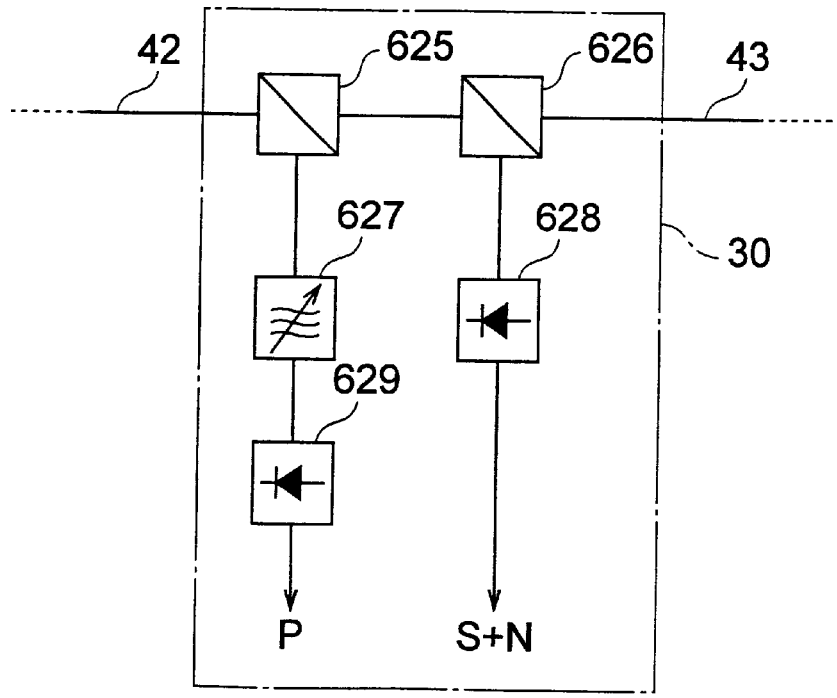
FIG. 34B is a view showing the arrangement of the second modification of the optical transmission monitoring apparatus according to the fifth embodiment.

The structure of the optical transmission monitoring apparatus according to the fifth embodiment is not limited to the one shown in FIG. 32A, and can be variously modified, as shown in FIGS. 34A and 34B.

FIG. 34A is a view showing the arrangement of the first modification of the optical transmission monitoring apparatus according to the fifth embodiment. In the optical transmission monitoring apparatus 30 shown in FIG. 34A, part of the light separated from the T light (containing the S light, P light, and N light) propagating through the optical fiber transmission path 42 by the optical branching element 602 is used to monitor the transmission state. The separated T light is further separated into the P light and (S+N) light by an optical branching element 621. The separated P light passes through a bandpass filter 623, and is converted into an electrical signal by a photoelectric conversion element 624. The separated (S+N) light is converted into an electrical signal by a photoelectric conversion element 622. The monitoring section monitors the optical transmission state by using information about the (S+N) light (the light signals as monitoring light signals detected by the first detector) in the first wavelength band and information about the Plight (monitoring light detected by the second detector) in the second wavelength band.

FIG. 34B is a view showing the arrangement of the second modification of the optical transmission monitoring apparatus according to the fifth embodiment. In the optical transmission monitoring apparatus 30 shown in FIG. 34B, the P light is separated by an optical branching element 625 from the T light propagating through the optical fiber transmission path 42. The (S+N) light is separated from the T light having passed through the optical branching element 625 by an optical branching element 626. The separated P light passes through a bandpass filter 627 and is converted into an electrical signal by a photoelectric conversion element 629. The separated (S+N) light is also converted into an electrical signal by a photoelectric conversion element 628. The optical transmission state is monitored on the basis of the obtained information.

Third Embodiment of optical Transmission System

The third embodiment of the optical transmission system will be described next with reference to FIGS. 35A, 35B, 36, and 37.

Figure 35A:
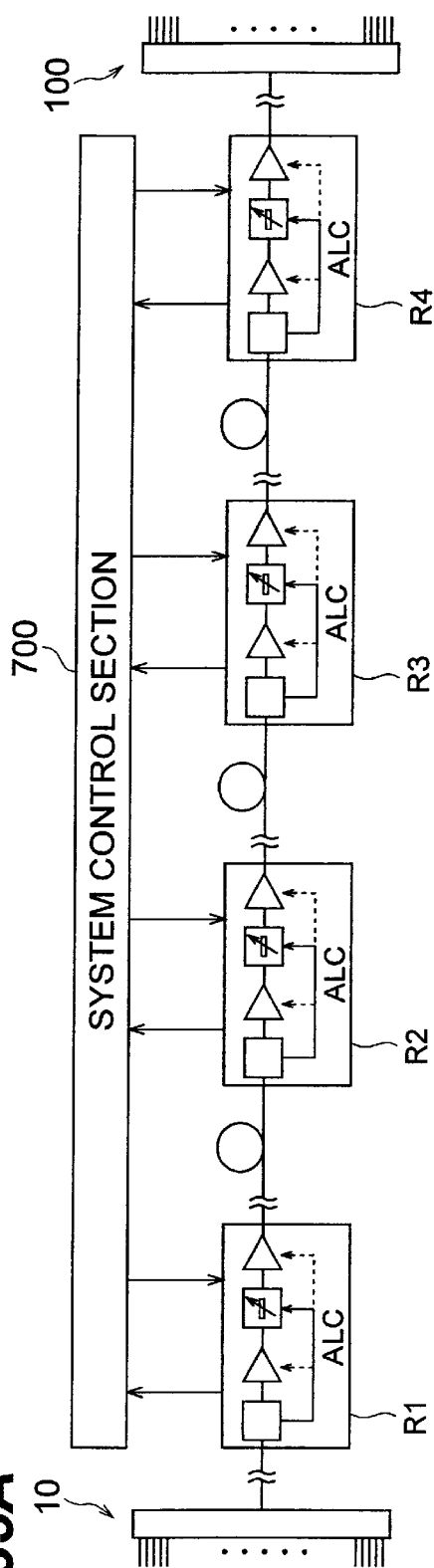
FIG. 35A is a view showing the arrangement of the third embodiment of an optical transmission system to which an optical transmission monitoring apparatus according to the present invention is applied.

As shown in FIG. 35A, the optical transmission system according to the a third embodiment includes at least one or more repeater stations R1 to R4 arranged between a transmitter 10 for light falling in a signal wavelength band and containing one or more light signals having different wavelengths and a receiver 100 for receiving the light. Each of the repeater stations R1 to R4 functions as a section monitoring apparatus including the optical transmission monitoring apparatus according to each embodiment described above. This optical transmission system also includes a system control section 700 for controlling section monitoring in each of the repeater stations R1 to R4 as the overall system.

Figure 35B:
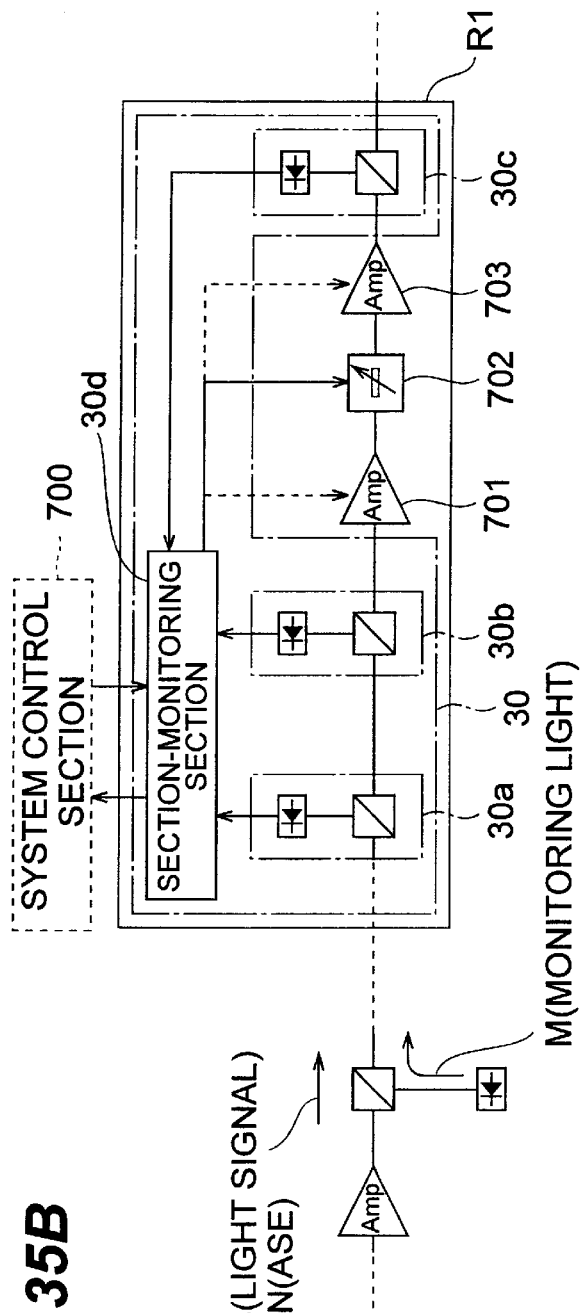
FIG. 35B is a view showing the arrangement of each repeater station (section monitoring apparatus) in FIG. 35A.

FIG. 35B shows the detailed arrangement of each of the section monitoring apparatuses R1 to R4. Each section monitoring apparatus includes a monitoring light detecting section 30a for detecting monitoring light M propagating through a monitoring section (upstream optical fiber transmission path), light signals detecting section 30b for detecting light signals S and noise N such as ASE propagating through the monitoring section, two optical amplifiers 701 and 703, a variable amplifier 702 provided between the optical amplifiers 701 and 703, an output light detecting section 30c for detecting light sent to the downstream optical fiber transmission path, and a section-control section 30d for performing ALC (Automatic Level Control) for the variable amplifier 702 and the two optical amplifiers 701 and 703 on the basis of the detection results from the monitoring light detecting section 30a, signal detecting section 30b, and output light detecting section 30c. The ALC performed by the section-control section 30d is the operation of regarding the optical amplifiers 701 and 703 and variable amplifier 702 as one optical amplification system, regarding the gain based on a loss in the immediately preceding section as the gain of the overall amplification system, and adjusting the gain of the overall optical amplification system to make it constant.

Note that the above optical transmission monitoring apparatus 30 is constituted by the monitoring light detecting section 30a, signal detecting section 30b, output light detecting section 30c, and section-control section 30d. Each of the detecting sections 30a, 30b, and 30c includes an optical branching element for separating a desired light component from propagating light and a photoelectric conversion element for converting the light component separated by the optical branching element into an electrical signal.

In the above arrangement, the attenuation amount of the variable attenuator 702 is preferably equal to or larger than the difference between the maximum and minimum loss variations in the optical transmission path in.a monitoring section. A section-monitoring section 30 performs control on the basis of the predetermined attenuation amount of the variable attenuator 702 and the monitoring result such that the sum of the transmission loss in the monitoring section and the loss in the variable attenuator 702 becomes a predetermined value. This is because the allowable input. signal levels of the optical amplifiers 701 and 703 and transmission unit such as the receiver 100 installed in each section monitoring apparatus may be limited to very narrow ranges. More specifically, when such a transmission unit is to be installed in an optical transmission path exhibiting large loss variations, the unit can be operated while the input signal level is maintained within a narrow allowable range by using the variable attenuator 702 for supplying an attenuation amount equal to or larger than the difference between the maximum and minimum values of loss variations in the optical transmission path. Note that such control by the variable attenuator is performed in the same manner as in the optical amplification system shown in FIG. 11B.

The system control section 700 sequentially receives the information detected by an optical transmission monitoring apparatus 30 and monitors the overall optical transmission path. The optical transmission monitoring apparatus 30 in each section monitoring apparatus can determine loss variations in an optical transmission path and output variations in an optical amplifier installed on the upstream side and monitoring light in a short period of time without transmitting information about these states to an apparatus installed on the downstream side. However, the monitoring precision cannot always be maintained high depending on the wavelength dependency of the optical amplifier, the detection precision for loss variations, and the like. When long-term monitoring is to be performed, in particular, the accumulation of such errors may pose a problem. In addition, when monitoring is performed by using only monitoring light signals in different wavelength bands at the time of interruption of light signals, the monitoring result lacks reliability. In contrast to this, when the monitoring results obtained in the respective repeater stations (section monitoring apparatuses) R1 to R4 are sequentially acquired to monitor the overall optical transmission path, although it takes time, a high-precision monitoring result can be obtained by long-term monitoring unlike short-term monitoring operation by which sufficient precision is difficult to obtain.

The system control section 700 may also include the function of transmitting the information obtained from any of the section monitoring apparatus to another section monitoring apparatus. In this case, even if an optical transmission monitoring apparatus having no monitoring function is installed in an optical transmission path, a desired monitoring effect can be obtained.

When the number of light signals propagating abruptly varies due to a break in an optical transmission path or the like on the upstream side of a section (e.g., a position where an optical ADM is installed) in which the number of light signals is controlled, short-term control is required at the expense of precision. In this state, control (ALC) is preferably performed quickly on the basis of the monitoring result obtained by the optical transmission monitoring apparatus 30 installed in each of the section monitoring apparatuses which are the repeater stations R1 to R4. When, however, loss variations occur in the optical transmission path.at a relatively low speed simultaneously with such variations in the number of light signals, control performed by the above optical transmission monitoring apparatus 30 includes unexpected errors. In the optical transmission system according to the third embodiment, therefore, the optical transmission monitoring apparatus 30 in each of the repeater stations R1 to R4 performs optical transmission control, and the system control section 700 corrects the control operation of each optical transmission monitoring apparatus 30 on the basis of the information obtained from each of the repeater stations R1 to R4. When optical transmission control is performed on the basis of double monitoring results in this manner, a sufficiently accurate control result can be obtained by long-term optical transmission control although the precision of short-term optical transmission control becomes low.

Figure 36:
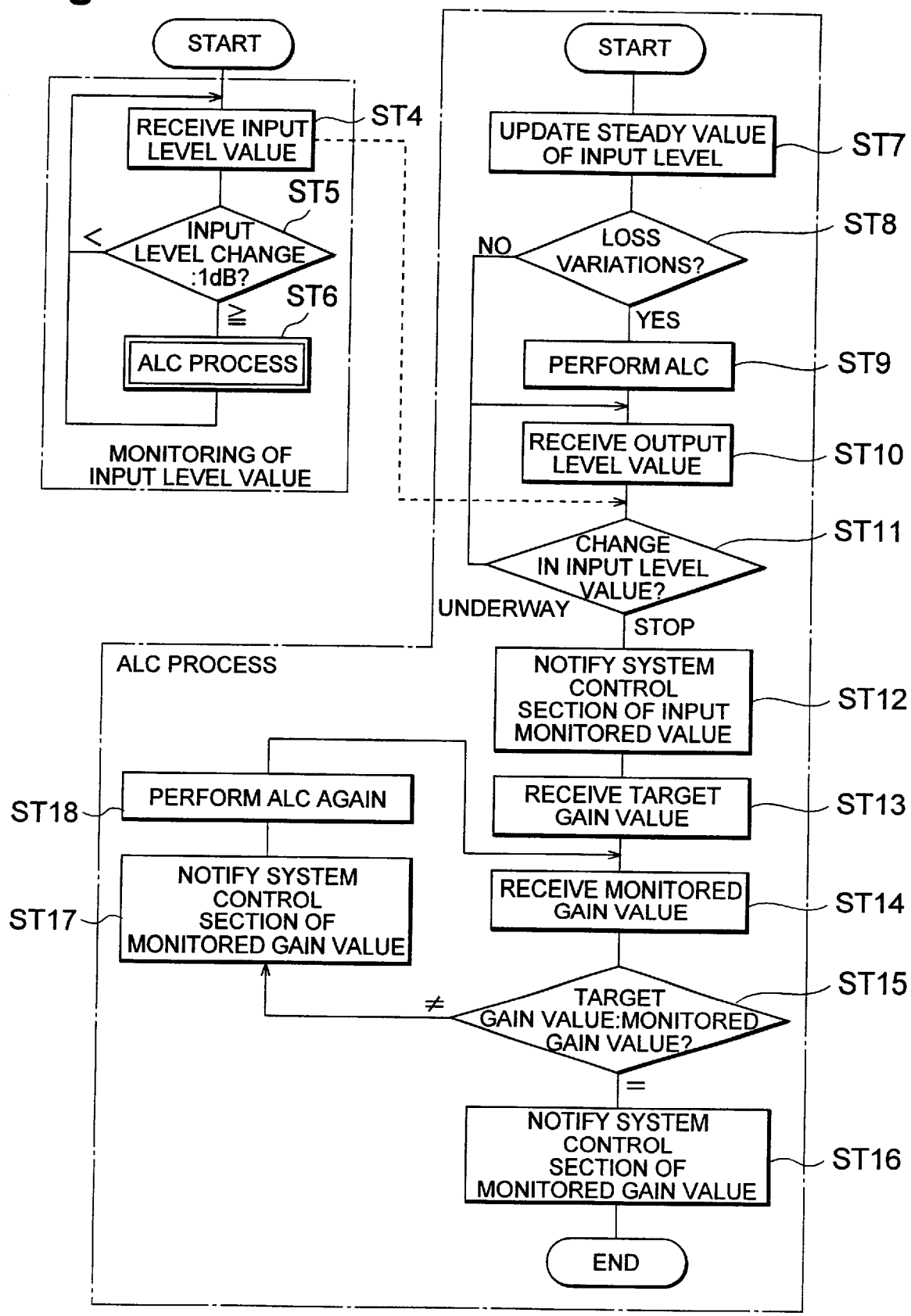

The monitoring operation of the optical transmission system according to the third embodiment based on the above arrangement will be described below with reference to FIGS. 36 and 37. FIG. 36 is a flowchart for explaining the control operation in each of the repeater stations (section monitoring apparatuses) R1 to R4. FIG. 37 is a flow chart for explaining the control operation of the system control section 700. The following description is limited to a case wherein each section monitoring apparatus has the structure shown in FIG. 35B (has the optical transmission monitoring apparatus according to the fourth embodiment shown in FIG. 28A) and uses light signals in a signal wavelength band (corresponding to the first wavelength band in a monitor wavelength band) and light in a wavelength band (corresponding to the second wavelength band in the monitor wavelength band) different from the signal wavelength band as monitoring light.

In each section monitoring apparatus, the input level value of light to be monitored is monitored during a monitoring period. More specifically, a section-monitoring section 30d receives the input level value of monitoring light in the second wavelength band from the monitoring light detecting section 30a and also receives the input level value of monitoring light signals (light signals and ASE) in the first wavelength band from the signal detecting section 30b (step ST4). While receiving detection signals from the monitoring light detecting section 30a and signal detecting section 30b, the section-monitoring section 30d checks whether the input level value has changed by 1 dB or more (step ST5). When the section-monitoring section 30d determines in step ST5 that the input level has changed by 1 dB or more, the flow shifts to an automatic level control (ALC) process (step ST6).

In the ALC process performed by the section-monitoring section 30d, first of all, the steady values of the input levels of monitoring light signals in the first and second wavelength bands as monitoring targets are updated (step ST7). The contents of changes in input level value are then determined (step ST8). In this stage as well, input level values are monitored, and the section-monitoring section sequentially receives the input level values of monitoring light signals in the first and second wavelength bands (steps ST4 to ST6).

When it is determined in step ST8 that the change in input level value is not a loss variation but is a change originating from wavelength dependency, the signal level value (output level value) of output light outputted from the section monitoring apparatus is received from the output light detecting section 30c (step ST10), and it is monitored whether the sequentially received input level values keep changing in level (step ST11). When it is determined that loss variations have occurred, ALC is performed first (step ST9). In ALC, the attenuation amount of the variable attenuator 702 is adjusted to control the optical power of light input to the optical amplifier 703 or adjust the gains of the optical amplifiers 701 and 703. Upon completion of ALC, the signal level value (output level value) of output light outputted from the section monitoring apparatus is received from the output light detecting section 30c (step ST10), and the flow shifts to the monitoring operation of checking whether the sequentially received input level values keep changing in level (step ST11).

Note that output level values are received (step ST10) while input level values keep changing. When input level values stop changing, the section-monitoring section 30d notifies the system control section 700 of the input level value of the self-station, and makes an inquiry about the gain value as the target value (target gain value) of the self-station (step ST12).

Upon receiving the target gain value of the self-station from the system control section 700 (step ST13), the section-monitoring section 30d receives the gain value (monitored gain value) actually obtained in the self-station (step ST14), and compares the obtained monitored gain value with the target gain value notified from the system control section 700 (step ST15). When the monitored gain value does not coincide with the target gain value, the section-monitoring section 30d notifies the system control section 700 of the current monitored gain value (step ST17), and performs ALC again (step ST18). Steps ST17 and ST18 are repeated until the actual monitored gain value of the self-station coincides with the target gain value. When the monitored gain value coincides with the target gain value, the section-monitoring section 30d notifies the system control section 700 of the actual monitored gain value of the self-station (step ST16), and terminates this ALC process.

Upon receiving the input/output level value of light signals from each station sequentially or at the time of notification from ALC (step ST20), the system control section 700 calculates a transmission loss value in each section, and stores the obtained loss value (step ST21).

When the obtained section loss value and a prepared initial value exceed a predetermined allowable value e (step ST22), a section loss abnormality is determined to given a warning to a manager (step ST24).

When the obtained section loss value and the prepared initial value are equal to or less than the predetermined allowable value e (step ST22), the target gain value of each station is calculated on the basis of the optical transmission state of the overall transmission system (step ST23). The system control section 700 notifies the section-monitoring section 30*d* in each station of the calculated target gain value (step ST25), and waits for notification of a monitored gain value from the section-monitoring section 30*d* in each station (step ST26). The system control section 700 then compares the received monitored gain value with the calculated target gain value. When the received monitored gain value does not coincide with the target gain value, the target gain value of a station in which a monitored gain value excess/deficiency has occurred (i.e., a station that has notified the monitored gain value) is corrected (step ST28), and steps ST25 to ST27 are repeated.

When it is determined in step ST27 that the received monitored gain value coincides with the target gain value of a target station, the system control section 700 is kept on standby until a new input monitored value is notified and an inquiry about a target gain value is made (step ST29). When a new input monitored value is notified or an inquiry about a target gain value is made (step ST29), the system control section 700 receives an output monitored value from a station located upstream of the station that has notified or made the inquiry (step ST30), and steps ST21 to ST29 described above are repeated.

As has been described above, according to the present invention, two wavelength bands are set in advance as monitor wavelength bands for monitoring an optical transmission state, and the transmission state of an optical transmission path is monitored while the variation amounts of optical powers of a plurality of types of light containing different light signals are compared with each other. This makes it possible to identify the cause of variations in the optical power of WDM signals by using a simpler structure. In an optical amplification system or optical transmission system to which such an optical transmission monitoring apparatus is applied, proper transmission control can be performed in accordance with the optical transmission state.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transmission monitoring apparatus for monitoring at least a transmission state in an optical transmission path through which light belonging in a signal wavelength band and containing one or more light signals having different wavelengths propagates, comprising:

a first detector for detecting at least one of optical power of one or more monitoring light signals of light in a first wavelength band and optical power of noise of the light in said first wavelength band, in a monitor wavelength band in which light propagating through said optical transmission path and containing said one or more monitoring light signals having different wavelengths belongs;

a second detector for detecting at least one of optical power of one or more monitoring light signals of light in a second wavelength band included in said monitor wavelength band and optical power of noise of light in said second wavelength band; and a monitoring section for comparing a variation amount of optical power per unit time in said first wavelength band, detected by said first detector, with a variation amount of optical power per unit time in said second wavelength band, detected by said second detector, and identifying a cause of a variation of optical power in said optical transmission path on the basis of the comparison result.

2. An optical transmission monitoring apparatus according to claim 1, wherein said monitor wavelength band overlaps said signal wavelength band at least partly.

3. An optical transmission monitoring apparatus according to claim 2, wherein light signals contained in part separated from light in a wavelength band within said signal wavelength band overlapping said monitor wavelength band are used, as said monitoring light signals in said monitor wavelength band.

4. An optical transmission monitoring apparatus according to claim 1, wherein said first wavelength band does not overlap said second wavelength band, in said monitor wavelength band.

5. An optical transmission monitoring apparatus according to claim 4, wherein said first wavelength band overlaps said signal wavelength band at least partly, wherein light signals contained in part separated from light in a wavelength band within said signal wavelength band which overlaps said first wavelength band are used as said monitoring light signals in said first wavelength band, said first detector detects at least optical power of first light containing said monitoring light signals in said first wavelength band, and wherein said second detector detects at least optical power of second light containing said monitoring light signals in said second wavelength band.

6. An optical transmission monitoring apparatus according to claim 5, further comprising a third detector for detecting at least optical power of third light containing noise in said first wavelength band, and wherein said monitoring section compares a variation amount of optical power of said first light per unit time, a variation amount of optical power of said second light per unit time, and a variation amount of optical power of said third light per unit time, and identifies a cause of a variation of optical power in said optical transmission path on the basis of the comparison result.

7. An optical transmission monitoring apparatus according to claim 1, wherein said first wavelength band overlaps said second wavelength band at least partly, in said monitor wavelength band.

8. An optical transmission monitoring apparatus according to claim 7, wherein, in said monitor wavelength band, a bandwidth of said first wavelength band is greater than that of said second wavelength band, and said second wavelength band is included in said first wavelength band.

9. An optical transmission monitoring apparatus according to claim 8, wherein said first wavelength band overlaps said signal wavelength band at least partly, and said light signals contained in part separated from light in a wavelength band within said signal wavelength band which overlaps said first wavelength band are used as said monitoring light signals, wherein at least a light signal of 1-channel selected from the light in the wavelength band within said signal wavelength band overlapping said first wavelength band are used as one of said monitoring light signals in said second wavelength band, and wherein said monitoring section compares a variation amount of optical power of said monitoring light signals and noise in said first wavelength band per unit time with a variation amount of optical power of said monitoring light signals in said second wavelength band per unit time, and identifies a cause of a variation in optical power in said optical transmission path on the basis of the comparison result.

10. An optical transmission monitoring apparatus according to claim 1, wherein at least one first optical amplifier is placed on said optical transmission path, wherein said optical transmission monitoring apparatus is placed at a predetermined position on said optical transmission path where amplified light outputted from said first optical amplifier reaches, and wherein a center wavelength of said first wavelength band and a center wavelength of said second wavelength band are set to coincide with a wavelength at which a gain is substantially equal to an average gain of said first optical amplifier in said signal wavelength band.

11. An optical transmission monitoring apparatus according to claim 9, further comprising:

a first system for detecting an abnormality in transmission of at least a light signal of 1-channel selected from said light signals in a wavelength band within said signal wavelength band overlapping said first wavelength band; and a second system for re-selecting a light signal to be selected as one of said monitoring light signals in said second wavelength band from said light signals in said wavelength band within said signal wavelength band overlapping said first wavelength band on the basis of a detection result obtained by said first system.

12. An optical transmission monitoring apparatus according to claim 10, wherein bandwidths of said first and second wavelength bands are set on the basis of at least one of a difference between an amplification wavelength bald of said first optical amplifier and said monitor wavelength band and the number of said monitoring light signals belonging in said monitor wavelength band.

13. An optical amplification system placed at a predetermined position on an optical transmission path through which light belonging in a predetermined signal wavelength band and containing one or more light signals having different wavelengths propagates, comprising:

a second optical amplifier for amplifying altogether at least light in said signal wavelength band which propagates through said optical transmission path; and said optical transmission monitoring apparatus according to claim 10, which adjusts a gain of said second optical amplifier in accordance with the transmission state in said optical transmission path.

14. An optical amplification system according to claim 13, further comprises a first variable attenuator placed, on said optical transmission path, at least at one of a position where said light signals in said signal wavelength band pass through before reaching said optical transmission monitoring apparatus and a position where said light signals pass through after passing through said optical transmission monitoring apparatus and attenuating said light signals by a predetermined amount, and said monitoring section of said optical transmission monitoring apparatus adjusts an attenuation amount of said first variable attenuator in accordance with the transmission state in said optical transmission path.

15. A method of controlling said optical amplification system according to claim 13, comprising the steps of:

detecting a variation amount of optical power per unit time regarding to at least one of optical power of one or more monitoring light signals of light in a first wavelength band included in a monitor wavelength band and optical power of noise of the light in said first wavelength band, in said monitor wavelength band in which light propagating through said optical transmission path and containing one or more monitoring light signals having different wavelengths belongs, and;

detecting a variation amount of optical power per unit time regarding to at least one of optical power of one or more monitoring light signals of light in a second wavelength band included in said monitor wavelength band and optical power of noise of the light in said second wavelength band; and comparing the detected variation amount of optical power per unit time in said first wavelength band with the detected variation amount of optical power per unit time in said second wavelength band, determining an increase/decrease in the number of wavelength channels in said light signals on the basis of the comparison result, and adjusting a gain of said second optical amplifier at the time that there is no increase/decrease in the number of wavelength channels in said light signals.

16. An optical transmission system comprising, at least, one or more repeater stations placed at a predetermined position on an optical transmission path through which at least light belonging in a signal wavelength band and containing one or more light signals having different wavelengths propagates, where each of said repeater stations has the same structure as that of said optical transmission monitoring apparatus according to claim 10.

17. An optical transmission system according to claim 16, wherein each of said repeater stations further comprises a third optical amplifier for amplifying altogether light belonging in said signal wavelength band and propagating through said optical transmission path, and wherein said monitoring section of said optical transmission monitoring apparatus adjusts a gain of said second optical amplifier in accordance with the transmission state in said optical transmission path.

18. An optical transmission system according to claim 16, wherein each of said repeater stations further comprises a second variable attenuator for attenuating light signals in said signal wavelength band by a predetermined amount, and wherein said monitoring section of said optical transmission monitoring apparatus adjusts said second variable attenuator in accordance with the transmission state in said optical transmission path.

19. An optical transmission system according to claim 16, wherein each of said repeater stations further comprises a system control section for monitoring an optical power variation in said overall optical transmission system on the basis of a variation amount of optical power per unit time regarding to part separated from light in said monitor wavelength band which has reached one of said repeater stations and a variation amount of optical power per unit time regarding to part separated from light in said monitor wavelength band which is outputted from one of said repeater stations.

20. An optical transmission system according to claim 19, wherein said system control section corrects control performed by said monitoring section of said optical transmission monitoring apparatus in each of said repeater stations on the basis of a variation amount of optical power of input/output light in each of said repeater stations.

21. An optical transmission system according to claims 16, further comprising an optical input/output element for dropping some light signals from said light signals propagating through said optical transmission path and adding new light signals.

22. An optical transmission system according to claim 21, wherein part of said light signals to be dropped or added by said optical input/output element belongs in one of said first and second wavelength bands.

23. An optical transmission monitoring method of monitoring at least a transmission state in an optical transmission path through which light belongs in a signal wavelength band and containing one or more light signals having different wavelength spropagates, comprising the step of:

detecting at least optical power of one or more monitoring light signals in a first wavelength band included in a monitor wavelength band in which light propagating through said optical transmission path and containing said one or more monitoring light signals having different wavelengths belongs, and optical power of noise of the light in said first wavelength band;

detecting at least one of optical power of one or more monitoring light signals in a second wavelength band included in said monitor wavelength band and optical power of noise of the light in said second wavelength band;

comparing a variation amount of the detected optical power per unit time in said first wavelength band with a variation amount of the detected optical power per unit time in said second wavelength band; and identifying a cause of a variation in optical power in said optical transmission path.

* * * * *